(12) United States Patent
Kim

(10) Patent No.: US 12,182,349 B2
(45) Date of Patent: Dec. 31, 2024

(54) TOUCH DISPLAY DEVICE AND DISPLAY PANEL FOR IMPROVING SENSING AND IMAGE QUALITY

(71) Applicant: LG Display Co., Ltd., Seoul (KR)

(72) Inventor: CheolSe Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/227,055

(22) Filed: Jul. 27, 2023

(65) Prior Publication Data

US 2024/0085999 A1    Mar. 14, 2024

(30) Foreign Application Priority Data

Sep. 13, 2022    (KR) .................. 10-2022-0114902

(51) Int. Cl.
  *G06F 3/041*    (2006.01)
  *G09G 3/3258*   (2016.01)
  *G06F 3/044*    (2006.01)

(52) U.S. Cl.
  CPC .......... *G06F 3/0412* (2013.01); *G09G 3/3258* (2013.01); *G06F 3/044* (2013.01); *G09G 2300/0828* (2013.01)

(58) Field of Classification Search
  CPC .... G06F 3/0412; G06F 3/044; G06F 3/04166; G06F 3/0446; G06F 3/0416; G06F 3/046; G09G 3/3258; G09G 2300/0828; G09G 2300/0819; G09G 2330/028; G09G 3/3233; G02F 1/13338; H10K 50/844; H10K 59/40
  See application file for complete search history.

(56) References Cited

U.S. PATENT DOCUMENTS

| | | | |
|---|---|---|---|
| 2017/0031524 A1* | 2/2017 | Shin | G06F 3/04166 |
| 2018/0059855 A1* | 3/2018 | Gwon | G06F 3/04166 |
| 2020/0210010 A1* | 7/2020 | Kim | G09G 3/3233 |

* cited by examiner

*Primary Examiner* — Rodney Amadiz
(74) *Attorney, Agent, or Firm* — Birch, Stewart, Kolasch & Birch, LLP

(57) ABSTRACT

A touch display device can include a display panel including a plurality of data lines, a plurality of gate lines, a plurality of subpixels, and a plurality of touch electrodes, each of the plurality of subpixels including a light emitting element and a driving transistor; and a signal conversion circuit configured to supply a driving signal to the plurality of subpixels in the display panel or a driving circuit connected to the display panel. Also, the driving signal can have a signal waveform corresponding to a signal waveform of a first power signal or a signal waveform of a second power signal.

18 Claims, 22 Drawing Sheets

Bottom emission

TOUCH DISPLAY DEVICE AND DISPLAY PANEL FOR IMPROVING SENSING AND IMAGE QUALITY

CROSS-REFERENCE TO RELATED APPLICATION

This application claims priority under 35 U.S.C. § 119(a) to Korean Patent Application No. 10-2022-0114902, filed in the Republic of Korea on Sep. 13, 2022, the entirety of which is hereby incorporated by reference for all purposes as if fully set forth herein.

BACKGROUND

Field

Embodiments of the disclosure relate to a touch display device, a display panel, and a signal conversion circuit.

Description of Related Art

As information society develops, various types of display devices for displaying images are being developed. Further, touch technology development is in progress to apply a touch-based input method that allows users to intuitively and conveniently input information or commands to display devices.

As such, to apply a touch-based input method to a display device, a touch panel including a touch sensor should be separately manufactured and combined with the display panel. This method has the disadvantages of increasing the size or thickness of the device and complicating the manufacturing process. Accordingly, a technology for embedding a touch sensor within a display panel without separately manufacturing a touch panel is being developed.

Designing and manufacturing a touch sensor-embedded display panel have considerable technical difficulty. Further, when a touch sensor including a plurality of touch electrodes is embedded in a display panel, the touch sensor is positioned fairly close to the adjacent display driving electrode or dummy data line and the parasitic capacitance between the touch sensor and display driving electrode or the parasitic capacitance between the touch sensor and the dummy data line can increase, causing decrease in touch sensitivity and can impair image quality. Also, voltage variations of the power signals during a touch driving period can impair image quality and touch sensing accuracy during the touch driving period.

SUMMARY OF THE DISCLOSURE

Embodiments of the disclosure can provide a touch display device, a display panel, and a signal conversion circuit that can precisely and effectively prevent or reduce formation of a parasitic capacitance between the driving pattern (e.g., electrode or line for display driving or non-sensing touch electrode) and the touch electrode embedded in the display panel in a load-free driving method suitable for a self-luminous type display panel.

Embodiments of the disclosure can provide a touch display device, a display panel, and a signal conversion circuit that can maintain the signal difference (voltage difference) between various load-free driving signals constant to prevent the parasitic capacitance between the touch electrode and the driving pattern.

Embodiments of the disclosure can provide a touch display device, a display panel, and a signal conversion circuit that can effectively and precisely generate various load-free driving signals to prevent the parasitic capacitance between the touch electrode and the driving pattern even without various power sources.

A touch display device according to embodiments of the disclosure can include a display panel including a plurality of data lines, a plurality of gate lines, a plurality of subpixels, and a plurality of touch electrodes, each of the plurality of subpixels including a light emitting element and a driving transistor and a signal conversion circuit configured to supply a driving signal having a signal waveform corresponding to either a first power signal or a second power signal applied to the plurality of subpixels to the display panel or a driving circuit connected to the display panel. That is, a signal conversion circuit is configured to supply a driving signal to the display panel or a driving circuit connected to the display panel. The driving signal has a signal waveform corresponding to a signal waveform of a first power signal or a signal waveform of a second power signal, and the first power signal and the second power signal are applied to the plurality of subpixels.

Each of the plurality of subpixels can include a light emitting element and a driving transistor. The first power signal can be supplied to the driving transistor or other transistor included in each of a plurality of sub-pixels, and the second power signal can be supplied to the light emitting element.

The touch display device according to embodiments of the disclosure can further include a power supply circuit configured to output the first power signal and the second power signal.

The power supply circuit can be configured to output a first reference power voltage having a constant first voltage level as the first power signal and output a second reference power voltage having a constant second voltage level as the second power signal during a display driving period.

The power supply circuit can be configured to output a first modulation power signal whose voltage level varies with respect to the first reference power voltage, as the first power signal, and output a second modulation power signal whose voltage level varies with respect to the second reference power voltage, as the second power signal during a touch driving period.

A voltage variation pattern in each high-level signal section included in the driving signal can correspond to a voltage variation pattern included in each high-level signal section included in the first modulation power signal or the second modulation power signal.

A voltage variation pattern in each low-level signal section included in the driving signal can correspond to a voltage variation pattern included in each low-level signal section included in the first modulation power signal or the second modulation power signal.

The voltage variation pattern in each high-level signal section included in the first modulation power signal or the second modulation power signal can be a voltage drop pattern, and the voltage variation pattern in each low-level signal section included in the first modulation power signal or the second modulation power signal can be a voltage rise pattern.

The signal conversion circuit can be configured to output a reference driving voltage having a constant voltage level, as the driving signal, during the display driving period.

The signal conversion circuit can be configured to output a modulation driving signal whose voltage level varies with respect to the reference driving voltage, as the driving signal, during the touch driving period.

An amplitude of the modulation driving signal can correspond to an amplitude of either the first modulation power signal or the second modulation power signal.

The signal conversion circuit can include an adder circuit configured to output a driving signal. The adder circuit can be configured to receive either the first power signal or the second power signal as a first input signal and the reference driving voltage as a second input signal and output the driving signal as an output signal.

The power supply circuit can output the first power signal and the second power signal using a switch. In this situation, the power supply circuit can include a first power conversion switch for outputting a first reference power voltage or a first modulation power signal as the first power signal and a second power conversion switch for outputting a second reference power voltage or a second modulation power signal as the second power signal.

The power supply circuit can output the first power signal and the second power signal using a choke. In this situation, the power supply circuit can include a reference power supply circuit, a power conversion circuit, and a modulation control circuit.

The reference power supply circuit can be configured to output the first reference power voltage and the second reference power voltage. The power conversion circuit can be configured to output the first power signal having a signal waveform corresponding to a signal waveform of a first modulation control signal with respect to a first voltage level of the first reference power voltage, as the first power signal, or output the second power signal having a signal waveform corresponding to a signal waveform of a second modulation control signal with respect to a second voltage level of the second reference power voltage. A modulation control circuit can be configured to supply the first modulation control signal and the second modulation control signal to the power conversion circuit.

The power conversion circuit can include a first input node to which the first reference power voltage is input, a second input node to which the second reference power voltage is input, a first output node from which the first power signal is output, a second output node from which the second power signal is output, at least one control node of a first control node to which the first modulation control signal is input and a second control node to which the second modulation control signal is input, and a choke including a first coil connected between the first input node and the first output node and a second coil connected between the second input node and the second output node.

The power conversion circuit can be configured to convert the first power signal at the first output node according to the first modulation control signal at the first control node, or convert the second power signal at the second output node according to the second modulation control signal at the second control node.

A display panel according to embodiments of the disclosure can include a plurality of subpixels, a plurality of data lines connected to the plurality of subpixels, a plurality of scanning gate lines connected to the plurality of subpixels, a first power line for supplying a first power signal to the plurality of subpixels, a second power line for supplying a second power signal to the plurality of subpixels, a plurality of touch electrodes, and a plurality of touch lines connected to the plurality of touch electrodes.

While a touch electrode driving signal whose voltage level varies is supplied to at least one of the plurality of touch electrodes, e.g., during the touch driving period, voltages of the first power signal and the second power signal can vary.

A scanning gate signal supplied to at least one of the plurality of scanning gate lines can have the same voltage variation pattern as a voltage variation pattern of the first power signal or the second power signal, or a data signal supplied to at least one of the plurality of data lines has the same voltage variation pattern as a voltage variation pattern of the first power signal or the second power signal.

During the touch driving period, the data signal, the scanning gate signal, and the touch electrode driving signal can have the same voltage variation pattern as the voltage variation pattern of the first power signal or the second power signal.

A signal conversion circuit according to embodiments of the disclosure can include an input terminal to which either a first power signal or a second power signal applied to a plurality of subpixels disposed on a display panel is input, a reference driving power supply unit outputting a reference driving voltage having a constant voltage level, and an adder circuit configured to output a driving signal having a signal waveform corresponding to a power signal input to the input terminal based on a voltage level of the reference driving voltage.

The signal waveform of the power signal input to the input terminal can differ depending on a driving mode. The driving mode can be a display driving mode or a touch driving mode.

Effects of the Disclosure

According to embodiments of the disclosure, it is possible to precisely and effectively prevent or reduce formation of a parasitic capacitance between the driving pattern (e.g., electrode or line for display driving or non-sensing touch electrode) and the touch electrode embedded in the display panel in a load-free driving method suitable for a self-luminous type display panel, thereby enhancing touch sensitivity.

According to embodiments of the disclosure, it is possible to maintain the signal difference (voltage difference) between various load-free driving signals constant to prevent the parasitic capacitance between the touch electrode and the driving pattern, thereby enhancing touch sensitivity and preventing display screen distortion.

According to embodiments of the disclosure, it is possible to prevent reduction in touch sensitivity due to signal distortion and display screen distortion by intentionally causing the same signal distortion for different load-free driving signals even when signal distortion occurs in each of a first power signal and a second power signal during a touch driving period as various load-free driving signals are generated using either the first power signal or second power signal where much current consumes during signal supply.

According to embodiments of the disclosure, it is possible to effectively and precisely generate various load-free driving signals for preventing the parasitic capacitance between the touch electrode and the driving pattern even without various power sources.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION OF THE EMBODIMENTS

Figure 1:
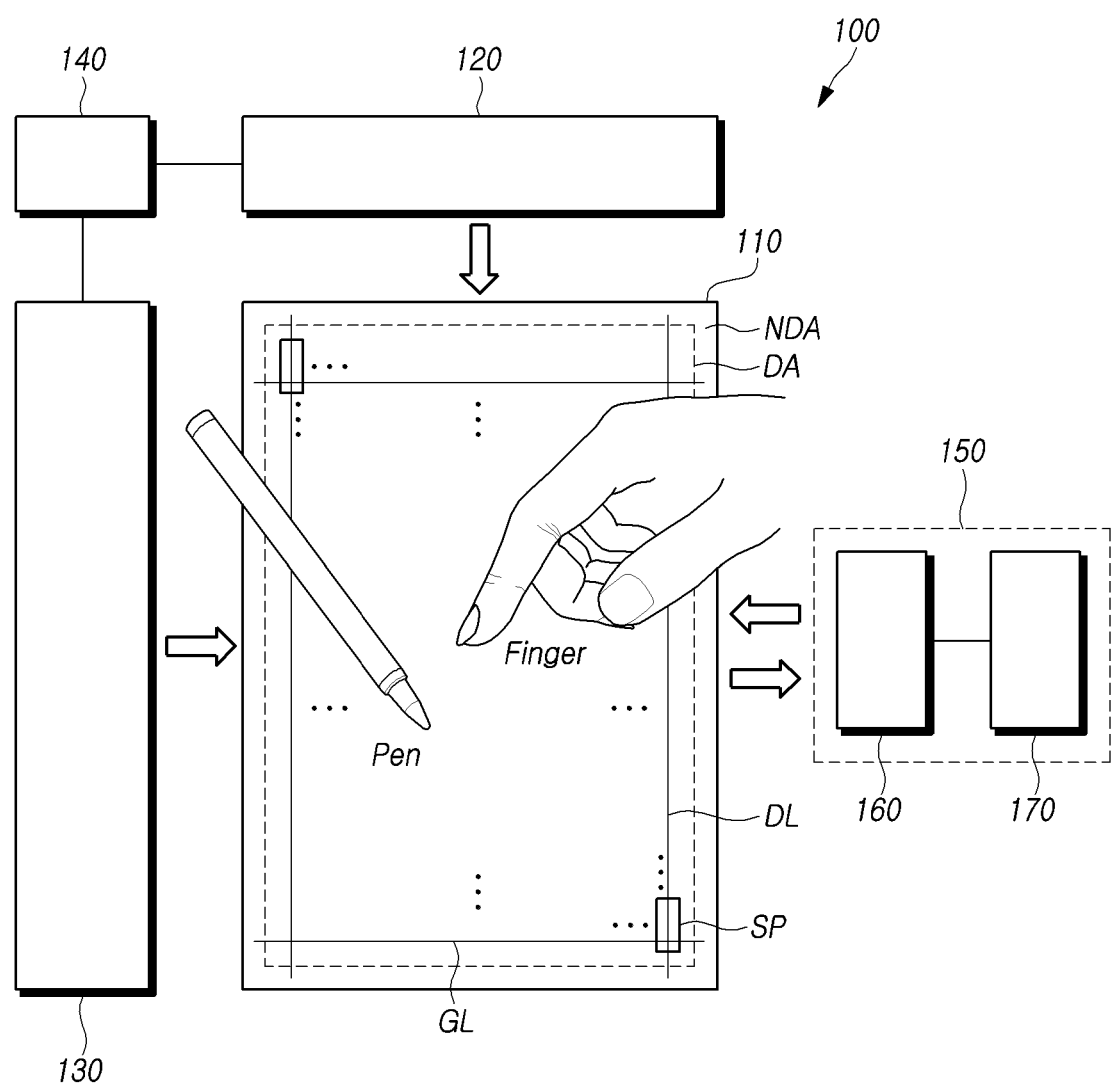
FIG. 1 is a view illustrating a system configuration of a touch display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description can make the subject matter in some embodiments of the disclosure rather unclear. The terms such as "including," "having," "containing," "constituting" "make up of," and "formed of" used herein are generally intended to allow other components to be added unless the terms are used with the term "only". As used herein, singular forms are intended to include plural forms unless the context clearly indicates otherwise.

Terms, such as "first," "second," "A," "B," "A," or "B" can be used herein to describe elements of the disclosure. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element can be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors e.g., process factors, internal or external impact, noise, etc.) even when a relevant description is not specified. Further, the term "may" fully encompasses all the meanings of the term "can".

The features of various embodiments of the present disclosure can be partially or entirely coupled to or combined with each other and can be interlocked and operated in technically various ways, and the embodiments can be carried out independently of or in association with each other.

Hereinafter, various embodiments of the disclosure are described in detail with reference to the accompanying drawings.

FIG. 1 is a view illustrating a system configuration of a touch display device 100 according to embodiments of the disclosure. Referring to FIG. 1, a touch display device 100 can include a display panel 110 and display driving circuits, as components for displaying images.

The display driving circuits are circuits for driving the display panel 110 and can include a data driving circuit 120, a gate driving circuit 130, and a display controller 140.

The display panel 110 can include a display area DA in which images are displayed and a non-display area NDA in which no image is displayed.

The non-display area NDA can be an outer area of the display area DA and can be referred to as a bezel area. The whole or part of the non-display area NDA can be an area visible from the front surface of the touch display device 100 or an area that is bent and not visible from the front surface of the touch display device 100.

The display panel 110 can include a plurality of subpixels SP. The display panel 110 can further include various types of signal lines to drive the plurality of subpixels SP.

The touch display device 100 according to embodiments of the disclosure can be a liquid crystal display device or a self-emission display device in which the display panel 110 emits light by itself (e.g., no backlight unit is needed). When the touch display device 100 according to the embodiments of the disclosure is a self-emission display device, each of the plurality of subpixels SP can include a light emitting element.

For example, the touch display device 100 according to embodiments of the disclosure can be an organic light emitting diode display in which the light emitting element is implemented as an organic light emitting diode (OLED). As another example, the touch display device 100 according to embodiments of the disclosure can be an inorganic light emitting display device in which the light emitting element is implemented as an inorganic material-based light emitting diode. As another example, the touch display device 100 according to embodiments of the disclosure can be a quantum dot display device in which the light emitting element is implemented as a quantum dot which is self-emission semiconductor crystal.

The structure of each of the plurality of subpixels SP can vary according to the type of the touch display device 100. For example, when the touch display device 100 is a self-emission display device in which the subpixels SP emit light by themselves, each subpixel SP can include a light emitting element that emits light by itself, one or more transistors, and one or more capacitors.

For example, various types of signal lines can include a plurality of data lines DL transferring data signals (also referred to as data voltages or image signals) and a plurality of gate lines GL transferring gate signals (also referred to as scanning signals).

The plurality of data lines DL and the plurality of gate lines GL can cross each other. Each of the plurality of data lines DL can be disposed while extending in a first direction. Each of the plurality of gate lines GL can be disposed while extending in a second direction.

Here, the first direction can be a column direction and the second direction can be a row direction. The first direction can be the row direction, and the second direction can be the column direction.

The data driving circuit 120 is a circuit for driving the plurality of data lines DL, and can output data signals to the plurality of data lines DL. The gate driving circuit 130 is a circuit for driving the plurality of gate lines GL, and can output gate signals to the plurality of gate lines GL. The display controller 140 is a device for controlling the data driving circuit 120 and the gate driving circuit 130 and can control driving timings for the plurality of data lines DL and driving timings for the plurality of gate lines GL.

The display controller 140 can supply a data driving control signal to the data driving circuit 120 to control the data driving circuit 120 and can supply a gate driving control signal to the gate driving circuit 130 to control the gate driving circuit 130.

The data driving circuit 120 can supply data signals to the plurality of data lines DL according to the driving timing control of the display controller 140. The data driving circuit 120 can receive digital image data from the display controller 140 and can convert the received image data into analog data signals and output them to the plurality of data lines DL.

The gate driving circuit 130 can supply gate signals to the plurality of gate lines GL according to the timing control of the display controller 140. The gate driving circuit 130 can receive a first gate voltage corresponding to a turn-on level voltage and a second gate voltage corresponding to a turn-off level voltage, along with various gate driving control signals (e.g., start signal and reset signal), generate gate signals, and supply the generated gate signals to the plurality of gate lines GL. For example, the first gate voltage can be higher than the second gate voltage. Alternatively, the second gate voltage can be higher than the first gate voltage.

For example, the data driving circuit 120 can be connected with the display panel 110 by a tape automated bonding (TAB) method or connected to a bonding pad of the display panel 110 by a chip on glass (COG) or chip on panel (COP) method or can be implemented by a chip on film (COF) method and connected with the display panel 110.

The gate driving circuit 130 can be connected with the display panel 110 by TAB method or connected to a bonding pad of the display panel 110 by a COG or COP method or can be connected with the display panel 110 according to a COF method. Alternatively, the gate driving circuit 130 can be formed in a gate in panel (GIP) type, in the non-display area NDA of the display panel 110. The gate driving circuit 130 can be disposed on the substrate or can be connected to the substrate. In other words, the gate driving circuit 130 that is of a GIP type can be disposed in the non-display area NDA of the substrate. The gate driving circuit 130 that is of a chip-on-glass (COG) type or chip-on-film (COF) type can be connected to the substrate.

In addition, at least one of the data driving circuit 120 and the gate driving circuit 130 can be disposed in the display area DA of the display panel 110. For example, at least one of the data driving circuit 120 and the gate driving circuit 130 can be disposed not to overlap with the subpixels SP or to overlap with all or some of the subpixels SP.

The data driving circuit 120 can be connected to one side (e.g., an upper or lower side) of the display panel 110. Depending on the driving scheme or the panel design scheme, data driving circuits 120 can be connected with both the sides (e.g., both the upper and lower sides) of the display panel 110, or two or more of the four sides of the display panel 110.

The gate driving circuit 130 can be connected to one side (e.g., a left or right side) of the display panel 110. Depending on the driving scheme or the panel design scheme, gate driving circuits 130 can be connected with both the sides (e.g., both the left and right sides) of the display panel 110, or two or more of the four sides of the display panel 110.

The display controller 140 can be implemented as a separate component from the data driving circuit 120, or the display controller 140 and the data driving circuit 120 can be integrated into an integrated circuit (IC).

The display controller 140 can be a timing controller used in typical display technology, a control device that can perform other control functions as well as the functions of the timing controller, or a control device other than the timing controller, or can be a circuit in the control device. The display controller 140 can be implemented as various circuits or electronic components, such as an integrated circuit (IC), a field programmable gate array (FPGA), an application specific integrated circuit (ASIC), or a processor.

The display controller 140 can be mounted on a printed circuit board or a flexible printed circuit and can be electrically connected with the data driving circuit 120 and the gate driving circuit 130 through the printed circuit board or the flexible printed circuit.

The display controller 140 can transmit/receive signals to/from the data driving circuit 120 according to one or more predetermined interfaces. The interface can include, e.g., a low voltage differential signaling (LVDS) interface, an embedded clock point-point interface (EPI), and a serial peripheral interface (SPI).

To provide a touch sensing function as well as an image display function, the touch display device 100 according to embodiments of the disclosure can include a touch panel and a touch sensing circuit 150 that senses the touch panel to detect whether a touch occurs by a touch object, such as a finger or pen, or the position of the touch.

The touch sensing circuit 150 can include a touch driving circuit 160 that drives and senses the touch panel and generates and outputs touch sensing data and a touch controller 170 that can detect an occurrence of a touch or the position of the touch using touch sensing data (e.g., sensed touch coordinates).

The touch panel can include a plurality of touch electrodes as touch sensors. The touch panel can further include a plurality of touch lines for electrically connecting the plurality of touch electrodes and the touch driving circuit 160. The touch panel or touch electrode is also referred to as a touch sensor.

The touch panel can exist outside or inside the display panel 110. When the touch panel exists outside the display panel 110, the touch panel is referred to as an external type of touch panel. When the touch panel is of the external type, the touch panel and the display panel 110 can be separately manufactured or can be combined during an assembly process. The external-type touch panel can include a substrate and a plurality of touch electrodes on the substrate. When the touch panel exists inside the display panel 110, the touch panel is referred to as an internal type of touch panel or an embedded touch panel. When the touch panel is of the internal type, the touch panel can be formed within the display panel 110 during a manufacturing process of the display panel 110.

The touch driving circuit 160 can supply a touch driving signal to at least one of the plurality of touch electrodes and can sense at least one of the plurality of touch electrodes to generate touch sensing data.

The touch sensing circuit 150 can perform touch sensing in a self-capacitance sensing scheme or a mutual-capacitance sensing scheme.

When the touch sensing circuit 150 performs touch sensing in the self-capacitance sensing scheme, the touch sensing circuit 150 can perform touch sensing based on capacitance between each touch electrode and the touch object (e.g., finger or pen).

According to the self-capacitance sensing scheme, each of the plurality of touch electrodes can serve both as a driving touch electrode and as a sensing touch electrode. The touch driving circuit 160 can drive all or some of the plurality of touch electrodes and sense all or some of the plurality of touch electrodes.

When the touch sensing circuit 150 performs touch sensing in the mutual-capacitance sensing scheme, the touch sensing circuit 150 can perform touch sensing based on capacitance between the touch electrodes.

According to the mutual-capacitance sensing scheme, the plurality of touch electrodes are divided into driving touch electrodes and sensing touch electrodes. The touch driving circuit 160 can drive the driving touch electrodes and sense the sensing touch electrodes.

As described above, the touch sensing circuit 150 can perform touch sensing in a self-capacitance sensing scheme and/or a mutual-capacitance sensing scheme. However, for convenience of description, it is assumed below that the touch sensing circuit 150 performs touch sensing using a self-capacitance sensing scheme.

The touch driving circuit 160 and the touch controller 170 included in the touch sensing circuit 150 can be implemented as separate devices or as a single device.

The touch driving circuit 160 and the data driving circuit 120 can be implemented as separate devices or as a single device.

The touch display device 100 can further include a power supply circuit for supplying various types of power to the display driver integrated circuit and/or the touch sensing circuit 150.

The touch display device 100 according to embodiments of the disclosure can be a mobile terminal, such as a smart phone or a tablet, or a monitor or television (TV) in various sizes but, without limited thereto, can be a display in various types and various sizes capable of displaying information or images.

Figure 2:
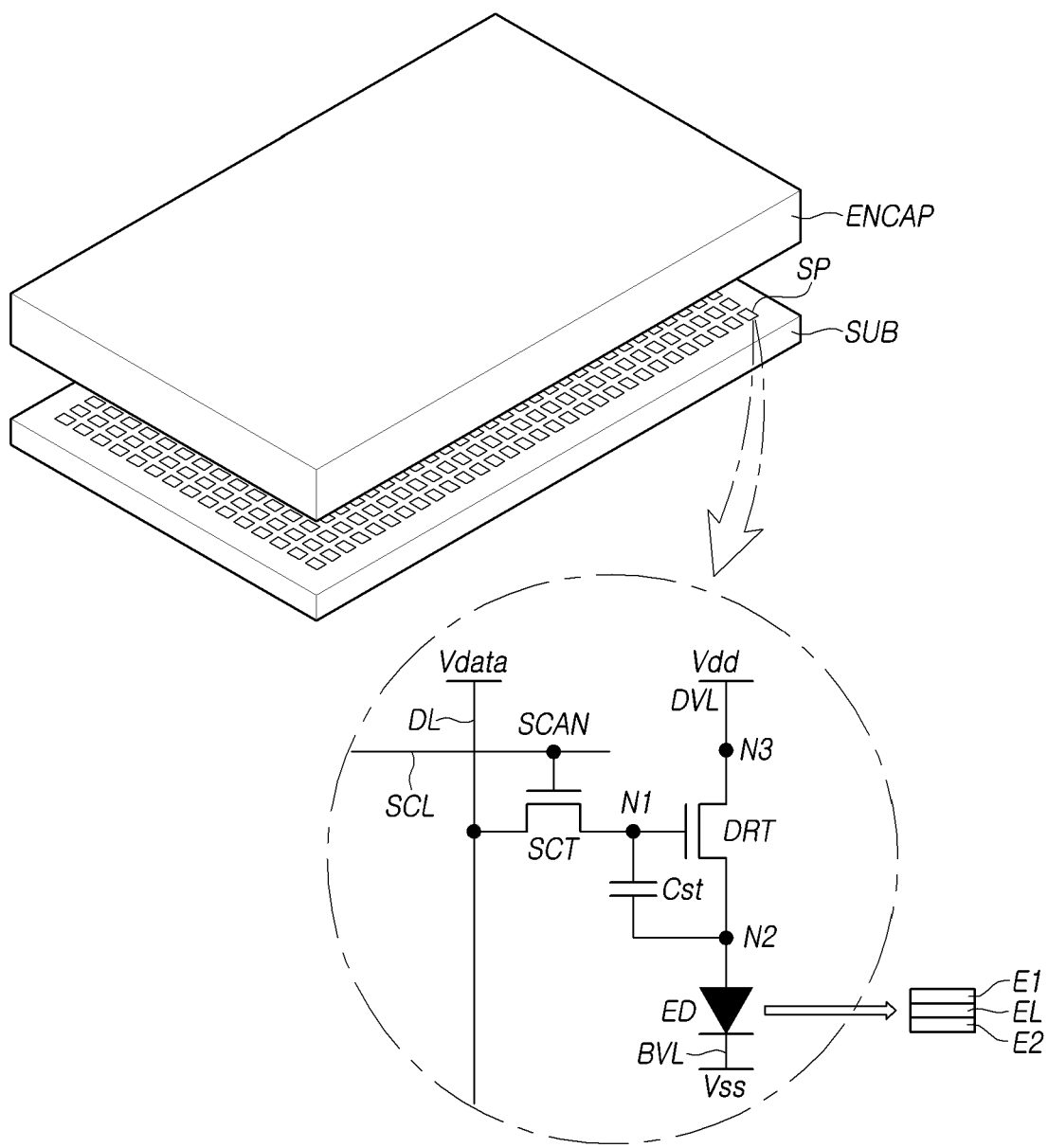
FIG. 2 is a view schematically illustrating a structure of a display panel of a touch display device according to embodiments of the disclosure.

FIG. 2 is a view schematically illustrating a structure of a display panel 100 of a touch display device 100 according to embodiments of the disclosure.

Referring to FIG. 2, the display panel 110 can include a plurality of subpixels SP formed on the substrate SUB. Each of the plurality of subpixels SP can include a light emitting element ED and a driving transistor DRT for driving the light emitting element ED.

Each of the plurality of subpixels SP can further include a scanning transistor SCT for transferring the data voltage Vdata to the first node N1 of the driving transistor DRT and a storage capacitor Cst for maintaining a constant voltage during one frame.

The driving transistor DRT can include the first node N1 to which the data signal Vdata can be applied, a second node N2 electrically connected with the light emitting element ED, and a third node N3 to which a first power signal Vdd is applied from a first power line DVL. The first node N1 in the driving transistor DRT can be a gate node, the second node N2 can be a source node or a drain node, and the third node N3 can be the drain node or the source node.

The light emitting element ED can include a first electrode E1, a light emitting layer EL, and a second electrode E2. The first electrode E1 can be disposed in each subpixel SP and can be electrically connected to the second node N2 of the driving transistor DRT of each subpixel SP. The second electrode E2 is commonly disposed in the plurality of subpixels SP, and the second power signal Vss can be applied through the second power line BVL. The first electrode E1 is referred to as a pixel electrode, and the second electrode E2 is referred to as a common electrode.

For example, the first electrode E1 can be an anode electrode. The second electrode E2 can be a cathode electrode. Conversely, the first electrode E1 can be a cathode electrode and the second electrode E2 can be an anode electrode. In the following, for convenience of description, it is assumed that the first electrode E1 is an anode electrode and the second electrode E2 is a cathode electrode. Accordingly, the first electrode E1 can be referred to as an anode electrode, and the second electrode E2 can be referred to as a cathode electrode. The second power signal Vss applied to the second electrode E2 is a type of display driving voltage.

For example, the light emitting element ED can be an organic light emitting diode (OLED), an inorganic light emitting diode, or a quantum dot light emitting element. In this situation, when the light emitting element ED is an organic light emitting diode, the light emitting layer EL of the light emitting element ED can include an organic light emitting layer including an organic material.

The scanning transistor SCT is connected between the first node N1 of the driving transistor DRT and the corresponding data line DL, and can control the voltage state of the first node N1 of the driving transistor DRT.

The scanning transistor SCT can control the connection between the first node N1, which is the gate node of the driving transistor DRT, and the corresponding data line DL among the plurality of data lines DL according to the scanning gate signal SCAN supplied from the corresponding scanning gate line SCL among the plurality of scanning gate lines SCL, which are a type of the gate line GL.

The drain node or the source node of the scanning transistor SCT can be electrically connected to the corresponding data line DL. The source node or drain node of the scanning transistor SCT can be electrically connected to the first node N1 of the driving transistor DRT. The gate node of the scanning transistor SCT can be electrically connected to the scanning gate line SCL, which is a type of the gate line GL, to receive the scanning gate signal SCAN.

The scanning transistor SCT can be turned on by the scanning gate signal SCAN of the turn-on level voltage, and can transmit the data signal Vdata supplied from the corresponding data line DL to the first node N1 of the driving transistor DRT.

The scanning transistor SCT is turned on by the scanning gate signal SCAN of the turn-on level voltage and turned off by the scanning gate signal SCAN of the turn-off level voltage. Here, when the scanning transistor SCT is of the n type, the turn-on level voltage can be a high-level voltage, and the turn-off level voltage can be a low-level voltage. When the scanning transistor SCT is of the p type, the turn-on level voltage can be a low-level voltage, and the turn-off level voltage can be a high-level voltage.

The storage capacitor Cst can be electrically connected between the first node N1 and second node N2 of the driving transistor DRT.

The capacitor Cst can be an external capacitor intentionally designed to be outside of the driving transistor DRT, but not a parasitic capacitor (e.g., Cgs or Cgd) which is an internal capacitor that can be present between the first node N1 and the second node N2 of the driving transistor DRT.

Each of the driving transistor DRT and the scanning transistor SCT can be an n-type transistor or a p-type transistor.

As illustrated in FIG. 2, each subpixel SP can have a 2T (transistor) 1C (capacitor) structure which includes two transistors DRT and SCT and one capacitor Cst as shown in FIG. 2 and, in some situations, each subpixel SP can further include one or more transistors or one or more capacitors.

Since circuit elements (especially the light emitting element ED) in each subpixel SP are vulnerable to external moisture or oxygen, the display panel 110 can further include an encapsulation layer ENCAP. The encapsulation layer ENCAP can prevent external moisture or oxygen from penetrating into circuit elements (especially the light emitting element ED).

The encapsulation layer ENCAP can be disposed on the second electrode E2. The encapsulation layer ENCAP can have a single layer structure or can have a multilayer structure including several sub-encapsulation layers. For example, the encapsulation layer ENCAP can have a multilayer structure in which an inorganic encapsulation layer, an organic encapsulation layer, and an inorganic encapsulation layer are stacked.

Figure 3:
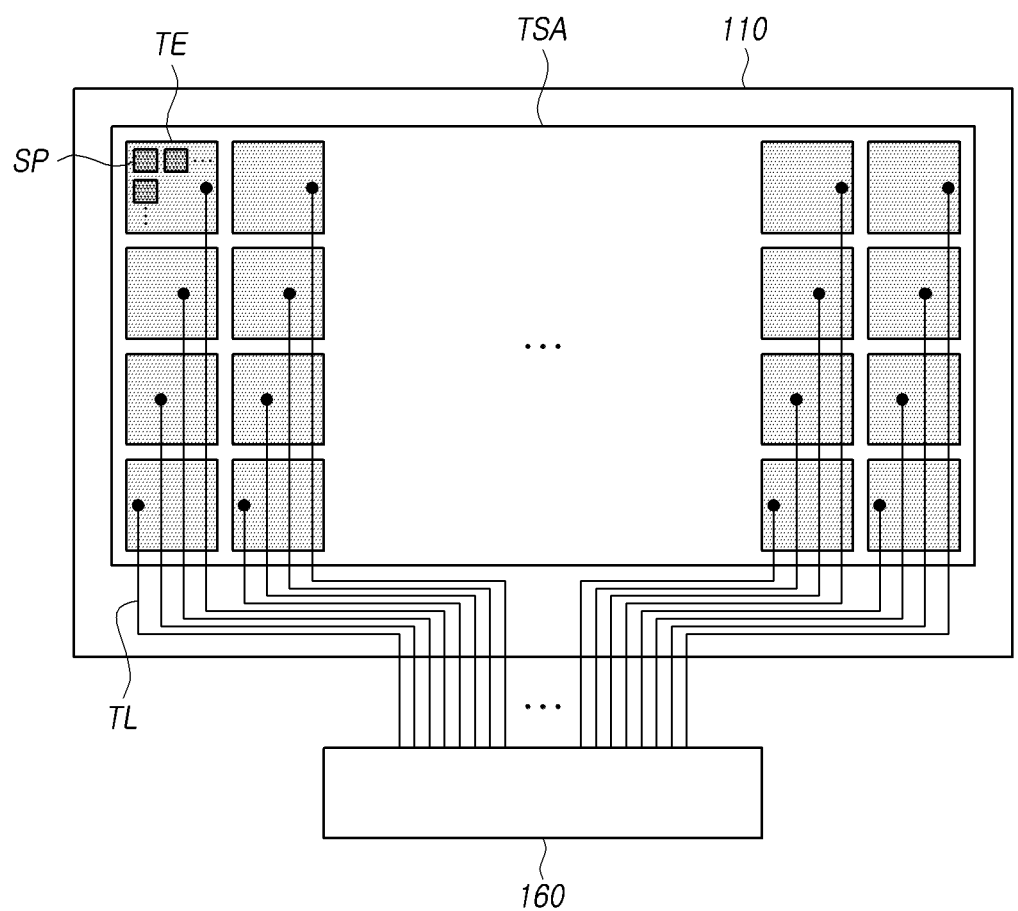
FIG. 3 is a view schematically illustrating a touch sensor structure of a touch display device according to embodiments of the disclosure.

FIG. 3 is a view schematically illustrating a touch sensor structure of a touch display device 100 according to embodiments of the disclosure.

Referring to FIG. 3, the display panel 110 of the touch display device 100 can have a built-in touch panel. A touch panel embedded in the display panel 110 is also referred to as an embedded touch panel, an in-cell type touch panel, or an on-cell type touch panel.

Referring to FIG. 3, when the display panel 110 of the touch display device 100 according to embodiments of the disclosure has a built-in touch panel, the display panel 110 can include a touch sensor disposed in the touch sensing area TSA.

The touch sensor can include a plurality of touch electrodes TE separated from each other and disposed in the touch sensing area TSA. For example, the touch electrodes can be formed from electrodes in the subpixels, such as being divided from the common electrode, but embodiments are not limited thereto The touch sensor can further include a plurality of touch lines TL for electrically connecting each of the plurality of touch electrodes TE to the touch driving circuit 160. The touch lines TL are also referred to as touch routing lines.

According to the example of FIG. 3, each of the plurality of touch electrodes TE can be disposed apart from each other. In this situation, the plurality of touch electrodes TE may not overlap each other in a vertical direction.

Alternatively, the plurality of touch electrodes TE can include touch electrodes TE in the first direction and touch electrodes TE in the second direction different from the first direction. In this situation, the touch electrodes TE in the first direction and the touch electrodes TE in the second direction can cross each other.

According to the example of FIG. 3, one or more touch lines TL can be connected to each of a plurality of touch electrodes TE. Each touch line TL can electrically connect the corresponding touch electrode TE to the touch driving circuit 160. Also, each individual touch electrode TE can be connected to its own touch line TL, or one touch line TL can be connected to a same group of touch electrodes TE, in order to reduce wiring and save space.

Each touch line TL can overlap with one or more touch electrodes TE.

Referring to FIG. 3, for example, among the touch electrodes TE disposed in the first column, the first touch electrodes TE disposed in the first row can be electrically connected to the first touch line TL. The first touch line TL can overlap with some touch electrodes TE other than the first touch electrodes TE among the touch electrodes TE disposed in the first column without being electrically connected.

Referring to FIG. 3, for example, when the touch display device 100 senses a touch based on self-capacitance, the touch driving circuit 160 can supply a touch driving signal to at least one of the plurality of touch electrodes TE and can sense the touch electrode TE to which the touch driving signal is supplied.

Each of the plurality of touch electrodes TE can be an electrode without an opening or a mesh-type electrode having a plurality of openings.

Each of the plurality of touch electrodes TE can be an opaque electrode or a transparent electrode. Alternatively, each of the plurality of touch electrodes TE can include an opaque electrode and a transparent electrode.

Each of the plurality of touch electrodes TE can be disposed in an area where two or more subpixels SP are formed. Unlike this, each of the plurality of touch electrodes TE can be positioned in an area that does not overlap with the subpixel SP.

The sensing value for the touch electrode TE to which the touch driving signal is supplied can be a value corresponding to capacitance or a change in capacitance in the touch electrode TE to which the touch driving signal is supplied. The capacitance in the touch electrode TE to which the touch driving signal is supplied can be a capacitance between the touch electrode TE to which the touch driving signal is supplied and a touch object, such as a finger.

As described above, in the touch display device 100 according to embodiments of the disclosure, when a touch sensor including a plurality of touch electrodes TE is embedded in the display panel 110, when patterns such as electrodes and lines related to driving of the display are formed during a manufacturing process of the display panel 110, the touch electrodes TE and the touch lines TL can also be formed.

Figure 4:
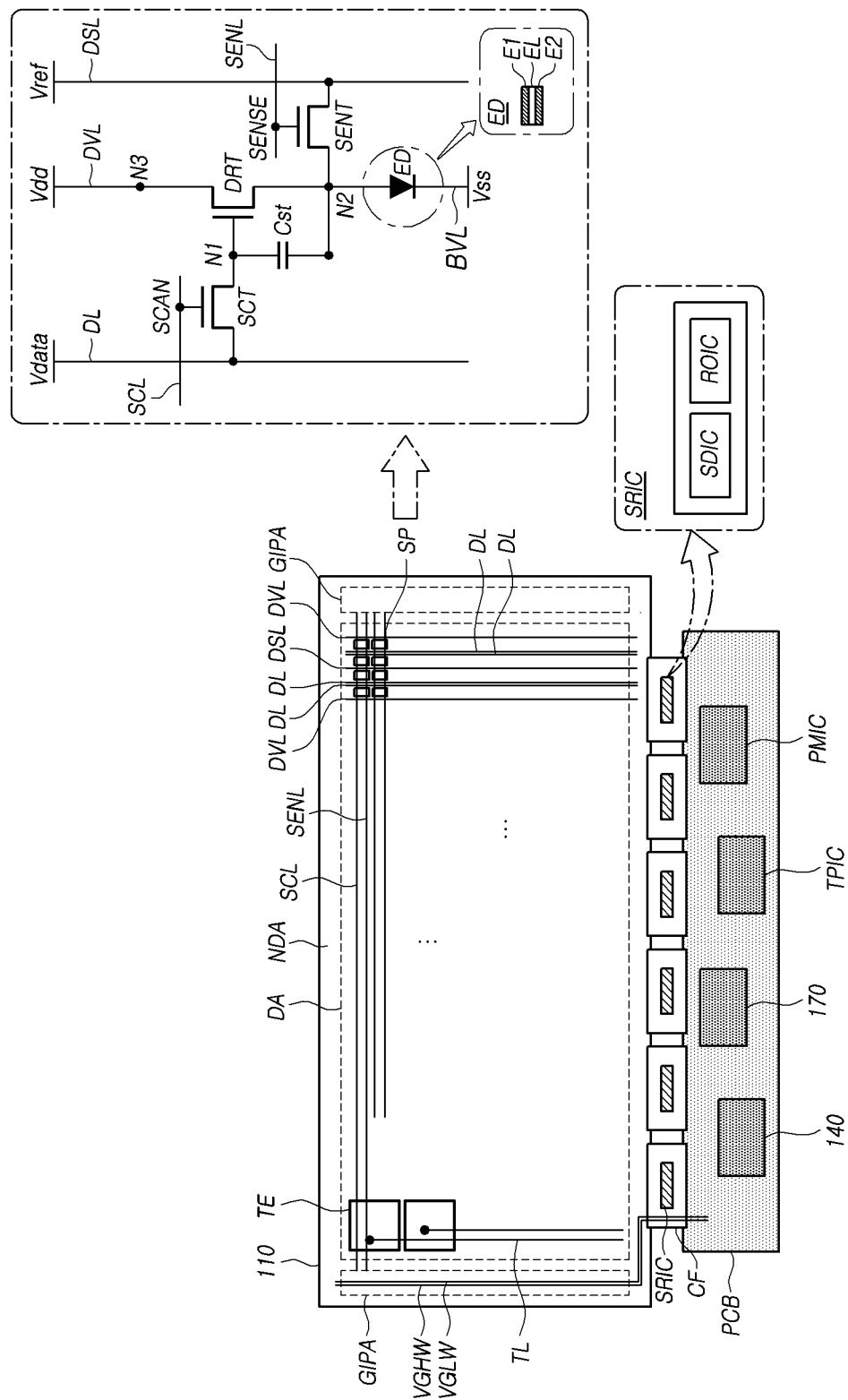
FIG. 4 is a view illustrating an example touch display device according to embodiments of the disclosure.

FIG. 4 is a view illustrating an example touch display device 100 according to embodiments of the disclosure.

Referring to FIG. 4, a touch display device 100 according to embodiments of the disclosure can include a display panel 110 and a printed circuit board (PCB) on which a plurality of circuit components 140, 170, TPIC, and PMIC are mounted.

Referring to FIG. 4, each of the plurality of subpixels SP disposed on the display panel 100 can further include a sensing transistor SENT connected to the second node N2 of the driving transistor DRT, as compared to the subpixel SP of FIG. 2.

The sensing transistor SENT can be connected between the second node N2 of the driving transistor DRT and the display sensing line DSL, and can control a voltage state of the second node N2 of the driving transistor DRT.

The sensing transistor SENT can control the connection between the first electrode E1 of the light emitting element ED and the corresponding display sensing line DSL among the plurality of display sensing lines DSL according to the sensing gate signal SENSE supplied from the corresponding sensing gate line SENL among the plurality of sensing gate lines SENL which are a type of the gate line GL. Here, the first electrode E1 of the light emitting device ED can be electrically connected to the second node N2 of the driving transistor DRT. The sensing gate signal SENSE can be the same as or different from the scanning gate signal SCAN.

The drain node or the source node of the sensing transistor SENT can be electrically connected to the display sensing line DSL. The source node or the drain node of the sensing transistor SENT can be electrically connected to the second node N2 of the driving transistor DRT, and can be electrically connected to the first electrode E1 of the light emitting element ED. The gate node of the sensing transistor SENT can be electrically connected to the sensing gate line SENL, which is a type of the gate line GL, to receive the sensing gate signal SENSE.

The sensing transistor SENT can be turned on to apply the reference voltage Vref supplied from the display sensing line DSL to the second node N2 of the driving transistor DRT.

The sensing transistor SENT is turned on by the sensing gate signal SENSE of the turn-on level voltage, and is turned off by the sensing gate signal SENSE of the turn-off level voltage. When the sensing transistor SENT is of the n type, the turn-on level voltage can be a high-level voltage, and the turn-off level voltage can be a low-level voltage. When the sensing transistor SENT is of the p type, the turn-on level voltage can be a low-level voltage, and the turn-off level voltage can be a high-level voltage.

Referring to FIG. 4, the display panel 110 can include signal supply components. For example, the display panel 110 can include a plurality of data lines DL for supplying data signals Vdata to the plurality of subpixels SP, a plurality of scanning gate lines SCL for supplying scanning gate signals SCAN to the plurality of subpixels SP, a plurality of sensing gate lines SENL for supplying sensing gate signals SENSE to the plurality of subpixels SP, a plurality of display sensing lines DSL for supplying a reference voltage Vref to the plurality of subpixels SP, and a plurality of first power lines DVL for supplying a first power signal Vdd to the plurality of subpixels SP. Further, the display panel 110 can further include a second power line BVL for supplying the second power signal Vss to the second electrode E2.

Referring to FIG. 4, when the gate driving circuit 130 is implemented as a gate in panel (GIP) type, the non-display area NDA of the display panel 110 can include a panel-embedded gate driving circuit area GIPA in which the gate driving circuit 130 of the GIP type is disposed. In this situation, the display panel 110 can further include a first gate voltage line VGHW and a second gate voltage line VGLW disposed in the non-display area NDA.

Referring to FIG. 4, the first gate voltage Vgh can be transferred to the gate driving circuit 130 disposed in the embedded gate driving circuit area GIPA through the first gate voltage line VGHW. The second gate voltage Vgl can be transferred to the gate driving circuit 130 disposed in the embedded gate driving circuit area GIPA through the second gate voltage line VGLW. In embodiments of the present disclosure, the first gate voltage Vgh can be a high-level gate voltage, and the second gate voltage Vgl can be a low-level gate voltage as a voltage lower than the first gate voltage Vgh.

Referring to FIG. 4, the gate driving circuit 130 disposed in the embedded gate driving circuit area GIPA can generate a gate signal such as a scanning gate signal SCAN and a sensing gate signal SENSE using the first gate voltage Vgh and the second gate voltage Vgl.

Referring to FIG. 4, the display panel 110 can include a plurality of touch electrodes TE and can include a plurality of touch lines TL electrically connected to the plurality of touch electrodes TE.

Referring to FIG. 4, the touch display device 100 can include a display controller 140, a touch controller 170, a touch power integrated circuit (TPIC), and a power management integrated circuit (PMIC).

For example, the display controller 140, the touch controller 170, the touch power integrated circuit TPIC, and the power management integrated circuit PMIC can be mounted on the printed circuit board PCB.

For example, when the data driving circuit 120 is implemented as a plurality of source driver integrated circuits SDIC and the touch driving circuit 310 is implemented as a plurality of readout integrated circuits ROIC, one or more source driver integrated circuits SDIC and one or more readout integrated circuits ROIC can be integrated and implemented as one source and readout integrated circuit SRIC.

In this situation, the touch display device 100 according to embodiments of the disclosure can include a plurality of source and readout integrated circuits SRIC, and each of the plurality of source and readout integrated circuits SRIC can include one or more source driver integrated circuits SDIC and one or more readout integrated circuits ROIC.

Each of the plurality of source and readout integrated circuits SRIC can be implemented as a chip on film (COF) type. In other words, each of the plurality of source and readout integrated circuits SRIC can be mounted on the circuit film CF connected between the display panel 110 and the printed circuit board PCB.

The power management integrated circuit PMIC can provide the reference display driving voltage to the touch power integrated circuit TPIC. For example, the reference display driving voltage can include one or more of a first reference power voltage, a second reference power voltage, a first reference gate voltage, a second reference gate voltage, and a reference base voltage. The reference display driving voltage can be voltages having a constant voltage level.

Figure 5:
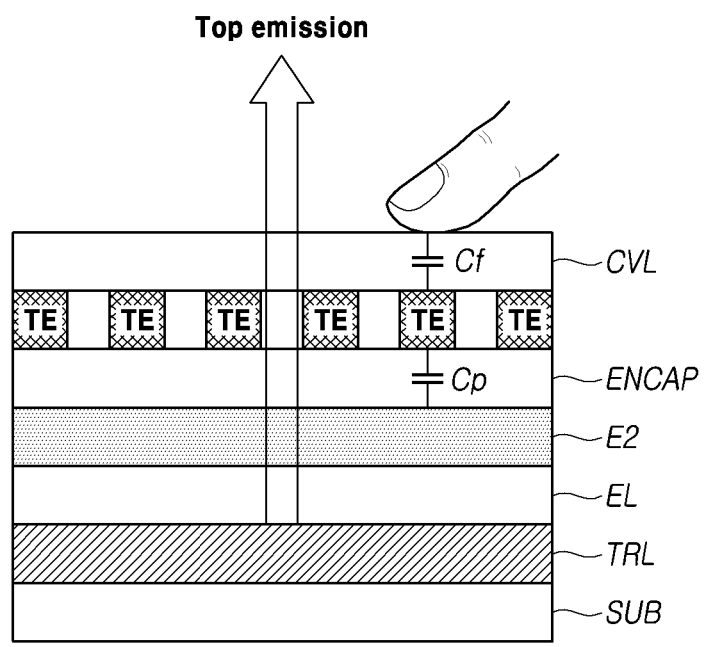
FIGS. 5, 6, and 7 are cross-sectional views illustrating a touch sensor-embedded display panel in a touch display device according to embodiments of the disclosure.
Figure 6:
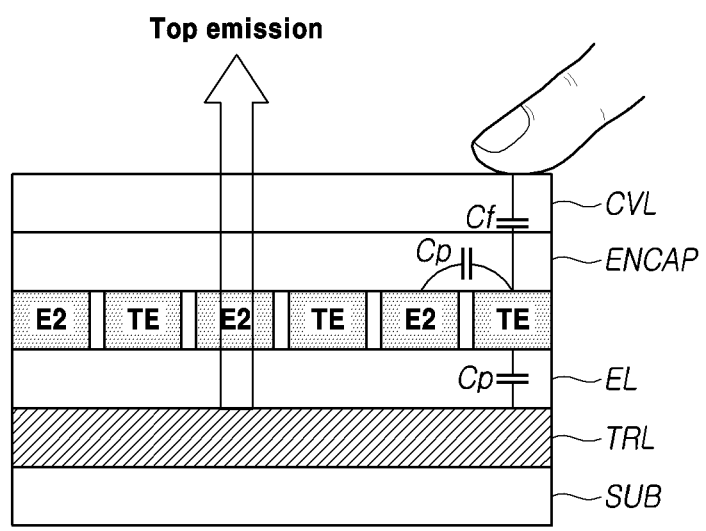
Figure 7:
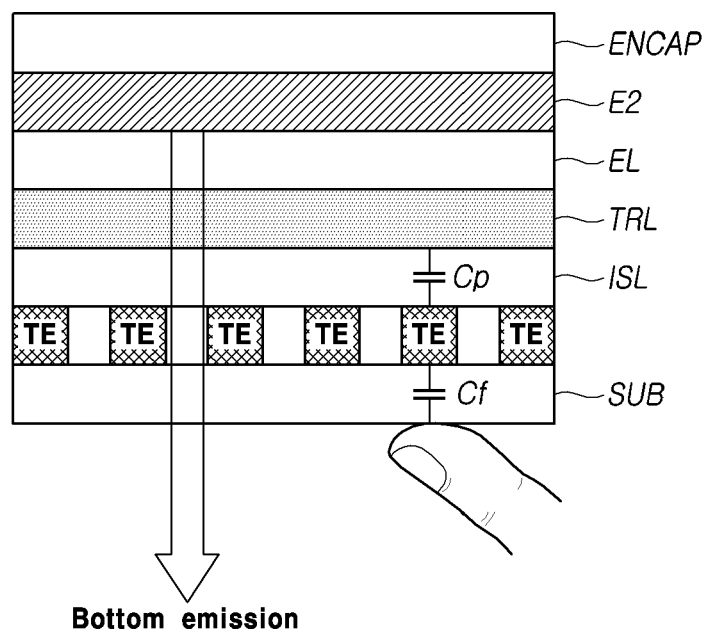

FIGS. 5 to 7 are cross-sectional views of a display panel 110 in which a touch sensor is embedded within a touch display device 100 according to embodiments of the disclosure.

Referring to FIGS. 5 to 7, the display panel 110 can include a substrate SUB, a transistor forming layer TRL on the substrate SUB, a light emitting layer EL on the transistor forming layer TRL, a second electrode E2 on the light emitting layer EL, and an encapsulation layer ENCAP on the second electrode E2.

Referring to FIGS. 5 to 7, driving transistors DRT, scanning transistors SCT, and sensing transistors SENT can be disposed in the transistor forming layer TRL. Also, the first electrodes E1 connected to the second nodes N2 of the driving transistors DRT can be disposed in the transistor forming layer TRL. Various signal lines DL, GL, DVL, and DSL can also be disposed in the transistor forming layer TRL.

Referring to FIGS. 5 to 7, the light emitting layer EL can be disposed in an area of each of the plurality of subpixels SP and can be positioned on the first electrode E1. The second electrode E2 can be an electrode to which the second power signal Vss corresponding to the common voltage is applied.

As illustrated in FIGS. 5 and 6, the display panel 110 can have a top emission structure that emits light in a direction opposite to the substrate SUB. When the display panel 110 has a top emission structure, the first electrodes E1 disposed on the transistor forming layer TRL can be a reflective metal, and the second electrode E2 can be a transparent electrode. When the display panel 110 has a top emission structure, the display panel 110 can include a cover layer CVL on the touch electrodes TE.

As illustrated in FIG. 7, the display panel 110 can have a bottom emission structure that emits light toward the substrate SUB. When the display panel 110 has a bottom emission structure, the first electrodes E1 disposed on the transistor forming layer TRL can be a transparent metal, and the second electrode E2 can be a reflective metal and the substrate SUB can be made of a transparent material.

Hereinafter, a structure in which a touch sensor is embedded in the display panel 110 is described in more detail with reference to FIGS. 5 to 7.

Referring to FIG. 5, when a touch sensor is embedded within the display panel 110 having the top emission structure, the touch sensor can be disposed on the encapsulation layer ENCAP. In other words, a plurality of touch electrodes TE included in the touch sensor embedded in the display panel 110 can be disposed on the encapsulation layer ENCAP.

When the plurality of touch electrodes TE embedded in the display panel 110 are disposed on the encapsulation layer ENCAP, the display panel 110 can include one second electrode E2 as a common electrode. A plurality of touch electrodes TE disposed on the encapsulation layer ENCAP can overlap with the second electrode E2 disposed under the encapsulation layer ENCAP.

When the touch display device 100 performs self-capacitance-based touch sensing, the touch display device 100 can sense a touch based on the finger capacitance Cf formed between the touch electrode TE and the user's finger.

In this situation, the parasitic capacitance Cp can be formed between the touch electrode TE and the second electrode E2. Here, the finger capacitance Cf is a capacitor required for touch sensing, but the parasitic capacitance Cp is an unnecessary capacitance that reduces touch sensitivity.

Referring to FIG. 6, when a touch sensor is embedded within the display panel 110 having the top emission structure, the touch sensor can be disposed under the encapsulation layer ENCAP. In other words, a plurality of touch electrodes TE included in the touch sensor embedded in the display panel 110 can be disposed under the encapsulation layer ENCAP.

When the touch sensor embedded in the display panel 110 is disposed under the encapsulation layer ENCAP, the display panel 110 can include a plurality of second electrodes E2 as a common electrode, and the plurality of touch electrodes TE can be positioned on the side surfaces of the plurality of second electrodes E2. In other words, each of the plurality of touch electrodes TE can be positioned between the plurality of second electrodes E2.

The plurality of touch electrodes TE can be formed of the same metal material as the plurality of second electrodes E2. For example, the cathode metal can be patterned to form a plurality of touch electrodes TE and a plurality of second electrodes E2.

The plurality of touch electrodes TE can overlap with one or more of at least one first electrode E1, at least one data line DL, and at least one gate line GL.

When the touch display device 100 performs self-capacitance-based touch sensing, a finger capacitance Cf can be formed between the touch electrode TE and the user's finger. In this situation, the parasitic capacitance Cp can be formed between the touch electrode TE and the second electrode E2. The parasitic capacitance Cp can be formed between the touch electrode TE and the electrode or a line of the transistor forming layer TRL.

The electrode or line formed in the transistor forming layer TRL can include one or more of a first electrode E1, a data line DL, a gate line GL, a first power line DVL, a second power line BVL, a display sensing line DSL, and the like. The electrode or line formed in the transistor forming layer TRL can include a pixel electrode material, a source drain material, a gate material, or the like.

Referring to FIG. 7, when a touch sensor is embedded in the display panel 110 having a bottom emission structure, the touch sensor can be disposed under the second electrode E2. In other words, a plurality of touch electrodes TE included in the touch sensor embedded in the display panel 110 can be disposed under the second electrode E2.

Referring to FIG. 7, when a plurality of touch electrodes TE embedded in the display panel 110 are disposed under the second electrode E2, the plurality of touch electrodes TE can be disposed under the transistor forming layer TRL. In this situation, the insulating layer ISL can be disposed between the plurality of touch electrodes TE and the transistor forming layer TRL.

Alternatively, when the plurality of touch electrodes TE embedded in the display panel 110 are disposed under the second electrode E2, the plurality of touch electrodes TE can be disposed on the transistor forming layer TRL or above the transistor forming layer TRL. For example, the plurality of touch electrodes TE can be formed of the same material as the plurality of first electrodes E1. In other words, the plurality of touch electrodes TE can be disposed on the same layer as the plurality of first electrodes E1 and forming during a same manufacturing process.

Figure 8:
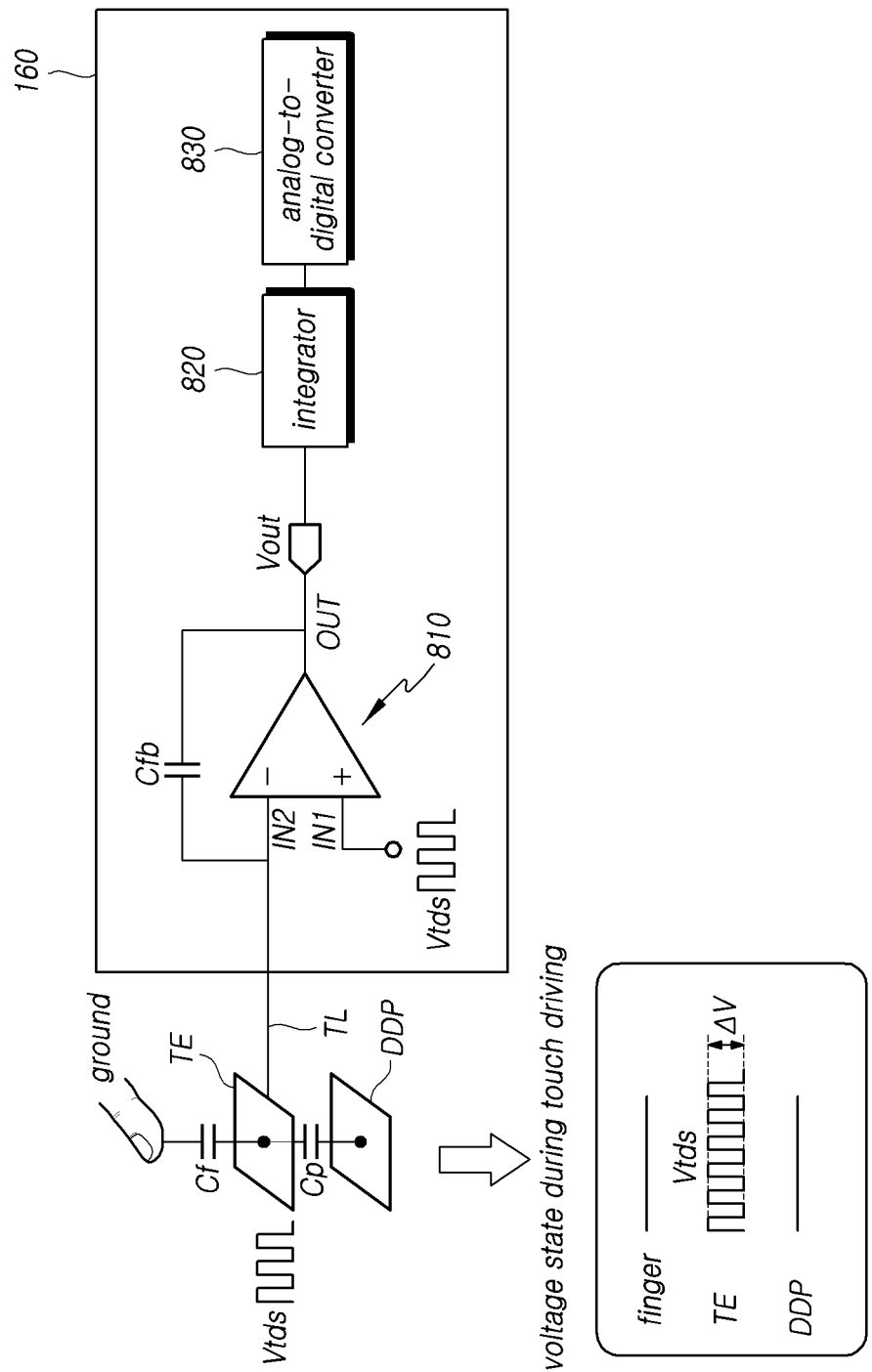
FIG. 8 is a diagram illustrating a touch sensing situation and a touch sensing principle in a touch display device according to embodiments of the disclosure.

FIG. 8 is a diagram illustrating a touch sensing situation and a touch sensing principle in the touch display device 100 according to embodiments of the disclosure.

Referring to FIG. 8, the touch driving circuit 160 can include a charge amplifier 810, an integrator 820, and an analog-to-digital converter 830.

The charge amplifier 810 can include a first input node IN1 to which the touch driving signal Vtds is input, a second input node IN2 electrically connected to the touch line TL, and an output node OUT to which the output signal Vout is output. A feedback capacitor Cfb can be connected between the second input node IN2 and the output node OUT of the charge amplifier 810.

In embodiments of the disclosure, the touch driving signal Vtds is a type of "touch electrode driving signal" applied to the touch electrode TE, and is a touch electrode driving signal applied to the touch electrode TE during a touch driving period for touch sensing.

The touch electrode driving signal applied to the touch electrode TE can include a touch electrode driving signal applied to the touch electrode TE during a touch driving period for touch sensing and a touch electrode driving signal applied to the touch electrode TE during a display driving period for image displaying.

The voltage level of the touch driving signal Vtds can vary over time. The touch driving signal Vtds can have a predetermined frequency and amplitude ΔV.

The touch driving signal Vtds input to the first input node IN1 of the charge amplifier 810 can be output through the second input node IN2 of the charge amplifier 810, and the touch driving signal Vtds output to the second input node IN2 of the charge amplifier 810 can be applied to the touch electrode TE through the touch line TL.

During touch driving for touch sensing, as the touch driving signal Vtds is applied to the touch electrode TE, a finger capacitance Cf can be formed between the touch electrode TE and the finger. Here, the finger can be grounded.

When the finger capacitance Cf is formed between the touch electrode TE and the finger, the touch electrode TE can form a parasitic capacitance with the display driving pattern DDP positioned around the touch electrode TE.

The display driving pattern DDP can include various electrodes or various lines involved in driving the display on the display panel 110.

During touch driving for touch sensing, the display driving pattern DDP can be different from the electrical state (voltage level variation state) of the touch electrode TE. For example, during touch driving for touch sensing, the display driving pattern DDP can have a constant voltage level.

During touch driving for touch sensing, the feedback capacitor Cfb can be charged with electric charge. The amount of charge charged to the feedback capacitor Cfb can vary depending on whether a finger is present around the touch electrode TE.

The output signal Vout of the charge amplifier 810 can correspond to the amount of charge stored in the feedback capacitor Cfb. The integrator 820 can integrate the output signal Vout to output an integral value. The analog-to-digital converter 830 can generate a sensing value by converting the output value (analog value) of the integrator 820 into a digital value.

The sensing value generated by the analog-to-digital converter 830 of the touch driving circuit 160 can be transmitted as sensing data. The touch controller 170 can receive the sensing data and determine whether there is a touch or touch coordinates based on the sensing data.

The amount of charge stored in the feedback capacitor Cfb in the touch driving circuit 160 can correspond to the product of the total capacitance formed on the touch electrode TE and the voltage applied to the touch electrode TE.

The total capacitance formed on the touch electrode TE can be the sum of the finger capacitance Cf and the parasitic capacitance Cp, and the voltage applied to the touch electrode TE can correspond to the amplitude ΔV of the touch driving signal Vtds. Accordingly, the amount of charge charged to the feedback capacitor Cfb can be "(Cf+Cp)×ΔV".

Since the amount of charge charged to the feedback capacitor Cfb is limited, when the parasitic capacitance Cp increases, the finger capacitance Cf becomes relatively small, and thus the touch sensitivity can decrease and touch sensing accuracy can be impaired.

When the touch electrodes TE are embedded in the display panel 110, the touch electrode TE and the display driving pattern DDP become very close to each other, and thus the capacitance (the parasitic capacitance Cp) between the touch electrode TE and the display driving pattern DDP can become very large (see FIGS. 5 to 7). Accordingly, the touch sensitivity can be lowered.

In addition, when touch driving is performed under a very large parasitic capacitance Cp, power consumption can increase. Further, due to the coupling capacitor Cp formed between the touch electrode TE and the display driving pattern DDP, the display driving-related signal can be distorted, and thus the image quality can be deteriorated and a user's viewing experience can be impaired. Further, when the display driving and the touch driving are simultaneously performed, the touch electrode TE and the display driving pattern DDP can be influenced by each other by the parasitic capacitance Cp, and thus image quality and touch performance can be simultaneously deteriorated and impaired.

Figure 9:
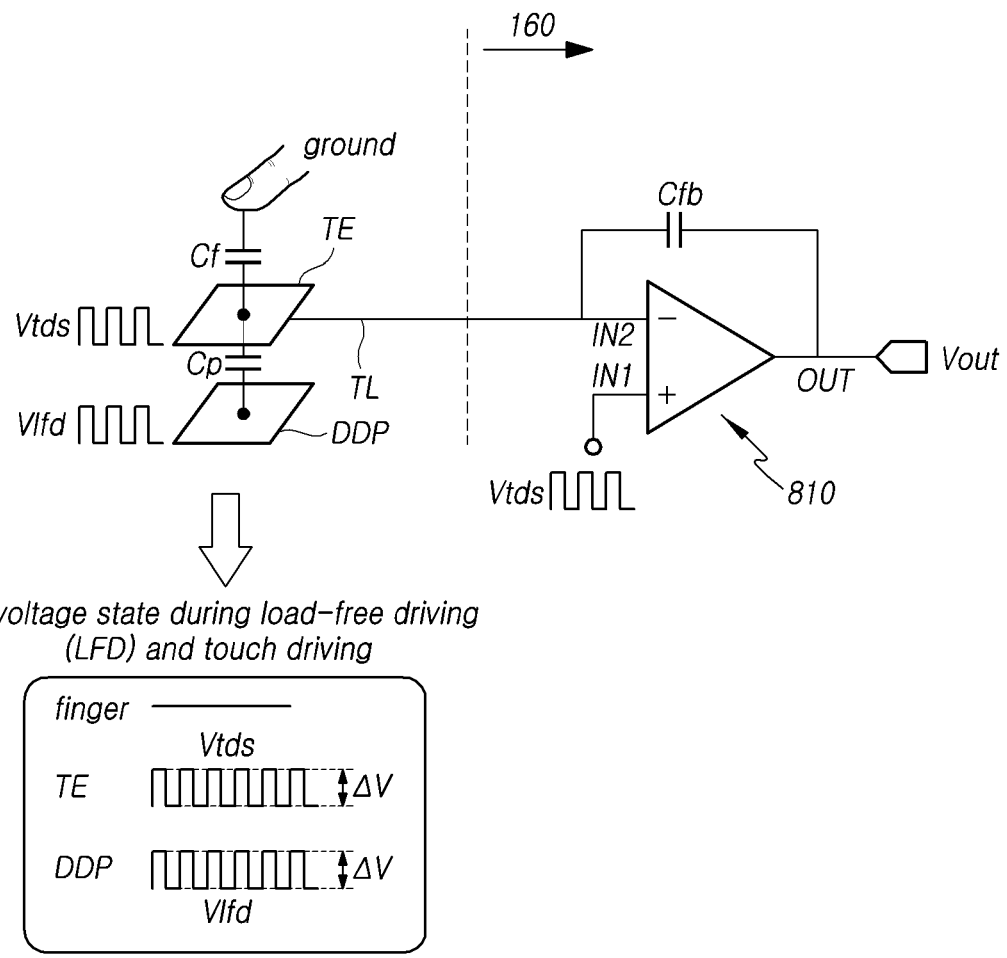
FIG. 9 is a diagram illustrating a touch sensing situation to which load-free driving is applied in a touch display device according to embodiments of the disclosure.

FIG. 9 is a diagram illustrating a touch sensing situation to which Load-Free Driving (LFD) is applied in the touch display device 100 according to embodiments of the disclosure.

Referring to FIG. 9, when performing touch driving by supplying a touch driving signal Vtds to the touch electrode TE to sense a touch, the touch display device 100 can perform load-free driving to reduce the load of the touch electrode TE.

Referring to FIG. 9, the load of the touch electrode TE can be a factor that causes a decrease in touch sensitivity, and can be caused by unnecessary capacitance and resistance formed in the touch electrode TE. The unnecessary capacitance formed on the touch electrode TE can include a parasitic capacitance Cp formed between the touch electrode TE and the display driving pattern DDP.

Referring to FIG. 9, when the touch display device 100 supplies the touch driving signal Vtds to at least one of the plurality of touch electrodes TE during the touch driving period, the touch display device 100 can supply a load-free driving signal Vlfd corresponding to the touch driving signal Vtds in signal characteristics (e.g., frequency, amplitude, phase, etc.) to the display driving pattern DDP.

Supplying the load-free driving signal Vlfd corresponding to the signal characteristics in the touch driving signal Vtds to the display panel 110 is referred to as "load-free driving (LFD)".

The load-free driving signal Vlfd and the touch driving signal Vtds can have signal characteristics corresponding to each other. For example, the load-free driving signal Vlfd and the touch driving signal Vtds can have the same frequency. Also, the load-free driving signal Vlfd and the touch driving signal Vtds can have the same amplitude ΔV. The load-free driving signal Vlfd and the touch driving signal Vtds can be in-phase with each other.

Accordingly, since there is no voltage difference between the touch driving signal Vtds and the load-free driving signal Vlfd, the parasitic capacitance Cp at the touch electrode TE can be reduced or removed. As described above, as the parasitic capacitance Cp is reduced or removed by the load-free driving, the finger capacitance Cf is increased, and thus the touch sensitivity can be enhanced and image quality can be preserved.

When the load-free driving is performed, the amount of charge charged to the feedback capacitor Cfb can be determined by the finger capacitance Cf and the amplitude ΔV of the touch driving signal Vtds without the influence of the parasitic capacitance Cp.

In the touch driving situation of FIG. 9, the electrical state of each of the touch electrode TE, the display driving pattern DDP, and the touch driving signal Vtds can be a state in which the voltage level changes over time, and the finger is grounded.

The amount of charge stored in the feedback capacitor Cfb can be expressed as the product of the voltage variation value at the touch electrode TE and the finger capacitance Cf. Here, the voltage variation at the touch electrode TE can correspond to the amplitude ΔV of the touch driving signal Vtds.

When the load-free driving is performed, the touch driving circuit 160 can read only the amount of charge stored in the finger capacitance Cf regardless of the parasitic capacitance Cp, and thus touch sensitivity can be enhanced.

In addition, the touch display device 100 according to embodiments of the disclosure can perform display driving and touch driving in different time periods. This driving method is called a time division driving method.

Alternatively, the touch display device 100 according to embodiments of the disclosure can simultaneously perform display driving and touch driving. This driving method is referred to as a simultaneous driving method or a time free driving method.

Hereinafter, for convenience of description, it is assumed that the touch display device 100 according to embodiments of the disclosure performs display driving and touch driving in different time periods (e.g., a time division driving method).

In addition, the display panel 110 of the touch display device 100 according to embodiments of the disclosure can be a self-luminous display panel that includes a plurality of light emitting elements ED and emits light by itself (e.g., no backlight unit is needed). In this situation, unlike the liquid crystal display panel operating based on the voltage, the display panel 110 can perform a light emitting operation based on the current flowing through the light emitting element ED. In other words, the touch display device 100 according to embodiments of the disclosure can display an image in a current driving method.

Accordingly, the touch display device 100 according to embodiments of the disclosure can perform load-free driving on the display driving pattern DDP according to the current-based light emitting operation characteristics of the display panel 110 that emits light by itself.

In the touch display device 100 according to embodiments of the disclosure, load-free driving suitable for current-based light emitting operation characteristics is referred to as "current-based load-free driving".

Hereinafter, a reason why current-based load-free driving is required is described with reference to FIGS. 10 and 11, and current-based load-free driving according to embodiments of the disclosure is then described in more detail with reference to FIGS. 12 to 22.

Figure 10:
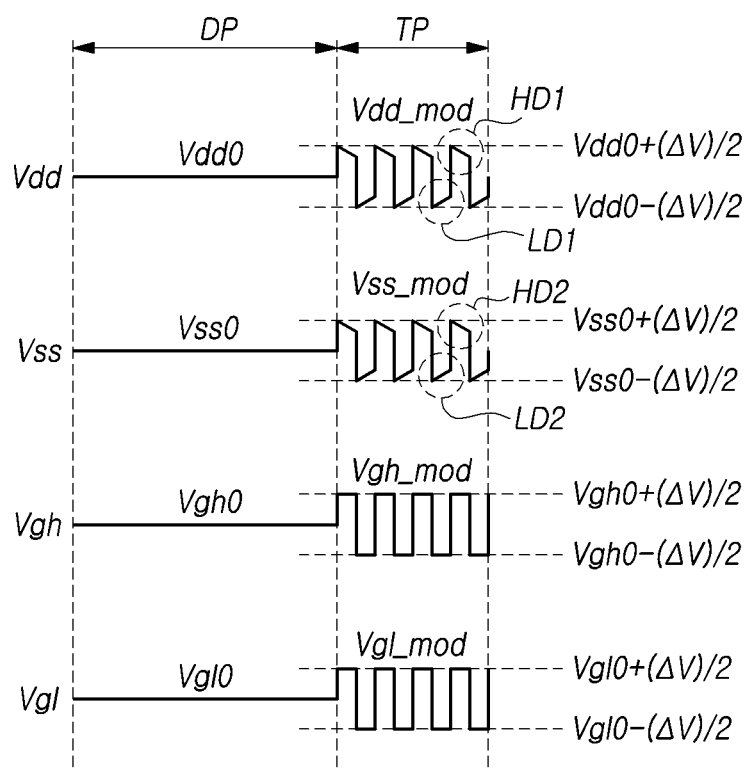
FIG. 10 illustrates a first power signal, a second power signal, a first gate voltage, and a second gate voltage in a touch display device according to embodiments of the disclosure.

FIG. 10 illustrates a first power signal Vdd, a second power signal Vss, a first gate voltage Vgh, and a second gate voltage Vgl in the touch display device 100 according to embodiments of the disclosure.

Referring to FIG. 10, a first power signal Vdd and a second power signal Vss are power signals for displaying an image, and can be common voltages for driving a plurality of subpixels SP.

The first power signal Vdd can be supplied to the plurality of subpixels SP through the first power line DVL, and can be supplied to the driving transistor DRT of each of the plurality of subpixels SP. The first power signal Vdd can be applied to the third node N3 of the driving transistor DRT in the subpixel SP.

The second power signal Vss can be supplied to the plurality of subpixels SP through the second power line BVL, and can be supplied to the light emitting element ED of each of the plurality of subpixels SP. More specifically, the second power signal Vss can be applied to the second electrode E2 of the first electrode E1 and the second electrode E2 included in the light emitting element ED in the subpixel SP. For example, the second electrode E2 can be a cathode electrode. In this situation, the second power signal Vss can be a cathode voltage.

The first power signal Vdd can have a voltage level higher than a voltage level of the second power signal Vss. However, the respective signal waveforms of the first power signal Vdd and the second power signal Vss can correspond to each other. For example, the respective signal waveforms of the first power signal Vdd and the second power signal Vss can be the same regardless of the driving mode (a display driving mode or a touch driving mode). For example, the signal waveform can include a voltage variation pattern, which means a pattern in which a voltage fluctuates. Further, the voltage variation pattern can include one or more of a voltage variation width (a voltage variation magnitude) and a voltage variation speed.

Referring to FIG. 10, during the display driving period DP, the first power signal Vdd can be a first reference power voltage Vdd0 having a predetermined first voltage level, and the second power signal Vss can be a second reference power voltage Vss0 having a predetermined second voltage level.

Referring to FIG. 10, for load-free driving during the touch driving period TP, the first power signal Vdd can be a first modulation power signal Vdd_mod of a signal type in which a voltage level is varied with respect to the first reference power voltage Vdd0, and the second power signal Vss can be a second modulation power signal Vss_mod of a signal type in which a voltage level is varied with respect to the second reference power voltage Vss0.

Here, the first modulation power signal Vdd_mod which is the first power signal Vdd and the second modulation power signal Vss_mod which is the second power signal Vss can be a type of load-free driving signal Vlfd.

Referring to FIG. 10, during the touch driving period TP, the first modulation power signal Vdd_mod, which is the first power signal Vdd, can alternately include a high-level signal section and a low-level signal section, and the second modulation power signal Vss_mod can alternately include a high-level signal section and a low-level signal section.

Referring to FIG. 10, the gate driving circuit 130 can receive the first gate voltage Vgh and the second gate voltage Vgl, generate a gate signal using the first gate voltage Vgh and the second gate voltage Vgl, and output the gate signal to the gate line GL. Here, the gate signal can include a scanning gate signal SCAN, and the gate line GL can include a scanning gate line SCL.

Referring to FIG. 10, when the gate driving circuit 130 is disposed in the embedded gate driving circuit area GIPA of the display panel 110, the first gate voltage Vgh can be transferred to the gate driving circuit 130 disposed in the embedded gate driving circuit area GIPA through the first gate voltage line VGHW, and the second gate voltage Vgl can be transferred to the gate driving circuit 130 disposed in the embedded gate driving circuit area GIPA through the second gate voltage line VGLW.

Referring to FIG. 10, during the display driving period DP, the first gate voltage Vgh can be a first reference gate voltage Vgh0 having a constant voltage level, and the second gate voltage Vgl can be a second reference gate voltage Vgl0 having a constant voltage level.

Referring to FIG. 10, in order to prevent or remove the parasitic capacitance between the touch electrode TE and the gate line GL during the touch driving period TP, the second gate voltage vgl of the gate signal applied to the gate line GL during the touch driving period TP should be the second modulation gate voltage Vgl_mod of which the voltage level is varied with respect to the second reference gate voltage Vgl0 of which the voltage level is varied. Further, since the first gate voltage line VGHW to which the first gate voltage Vgh is transferred and the second gate voltage line VGLW to which the second gate voltage Vgl is transferred are disposed adjacent to each other in the embedded gate driving circuit area GIPA of the display panel 110, the second gate voltage line VGLW can be affected by the first gate voltage line VGHW, and thus the second modulation gate voltage Vgl_mod applied to the second gate voltage line VGLW during the touch driving period TP can be changed to an unwanted voltage state (e.g., a state in which a voltage level or amplitude is unwantedly changed). Accordingly, it is necessary to maintain a constant voltage difference between the first gate voltage Vgh and the second gate voltage Vgl during the touch driving period TP. In other words, during the touch driving period TP, the first gate voltage Vgh can be a first modulation gate voltage Vgh_mod of which a voltage level is varied with a predetermined amplitude ΔV with respect to the first reference gate voltage Vgh0, and the second gate voltage Vgl can be a second modulation gate voltage Vgl_mod of which a voltage level is varied with a predetermined amplitude ΔV with respect to the second reference gate voltage Vgl0.

Referring to FIG. 10, the first modulation gate voltage Vgh_mod can alternately include a high-level signal section and a low-level signal section. The second modulation gate voltage Vgl_mod can alternately include a high-level signal section and a low-level signal section.

Referring to FIG. 10, in the display panel 110, the first power signal Vdd can be supplied to the plurality of sub-pixels SP through the first power line DVL, the second power signal Vss can be supplied to the plurality of sub-pixels SP through the second power line BVL, the first gate voltage Vgh can be transferred to the gate driving circuit 130 through the first gate voltage line VGHW, and the second gate voltage Vgl can be transferred to the gate driving circuit 130 through the second gate voltage line VGLW.

The display panel 110 of the touch display device 100 according to embodiments of the disclosure is a self-luminous display panel, and a light emitting element ED, such as an organic light emitting element OLED, is driven by a current driving method.

During the display driving period DP, the current for driving the display on the display panel 110 of the self-emission type can be driven as a driving current from the driving transistor DRT to the light emitting element ED to allow the light emitting element ED to emit light.

The current flow path for display driving can include a first power line DVL to which the first power signal Vdd is applied, a driving transistor DRT, a light emitting element ED, and a second power line BVL to which the second power signal Vss is applied. Accordingly, while the light emitting device ED is driven, the same current can flow through the first power line DVL and the second power line BVL.

Meanwhile, one frame time can include an active period and a blank period, the display driving period DP can be included in the active period, and the touch driving period TP can be included in the blank period. Accordingly, during the touch driving period TP after the display driving period DP, the flow of the current flowing for the display driving during the display driving period DP can remain the same during the touch driving period TP.

Accordingly, due to the characteristics of the display panel 110 of the self-luminous type, the respective signal waveforms of the first power signal Vdd and the second power signal Vss can correspond to each other during the display driving period DP and the touch driving period TP. More specifically, during the display driving period DP, the respective signal waveforms of the first power signal Vdd and the second power signal Vss can be signal waveforms of a DC voltage type having a constant voltage level. During the touch driving period TP, the respective signal waveforms of the first power signal Vdd and the second power signal Vss can be signal waveforms of an AC voltage type in which a voltage level swings, and can have the same voltage variation pattern.

Further, due to the characteristics of the display panel 110 of the self-emission type, a larger amount of current flows through the first power line DVL to which the first power signal Vdd is applied and the second power line BVL to which the second power signal Vss is applied as compared to other signal lines. The other signal lines can include the data line DL to which the data signal Vdata is applied, the first gate voltage line VGHW to which the first gate voltage Vgh is applied, and the second gate voltage line VGLW to which the second gate voltage Vgl is applied.

During the touch driving period TP, the voltage level in each high-level signal section and the voltage level in each low-level signal section in the first modulation power signal Vdd_mod, which is the first power signal Vdd, can remain constant, and the voltage level in each high-level signal section and the voltage level in each low-level signal section in the second modulation power signal Vss_mod, which is the second power signal Vss, can remain constant.

However, as described above, because the amount of current flowing through the first power line DVL and the second power line BVL is higher than the amount of current flowing through other signal lines due to the characteristics of the display panel 110 of the self-luminous type, a greater signal delay can occur in the first power line DVL and the second power line BVL than in the other signal lines.

Accordingly, as illustrated in FIG. 10, signal distortions HD1 and LD1 of the first power signal Vdd in the first power line DVL can occur, and signal distortions HD2 and LD2 of the second power signal Vss in the second power line BVL can occur. For example, signals on the first power signal Vdd in the first power line DVL are effectively trying to play catch up and have diagonal signal distortions, rather than crisp square wave forms (e.g., HD1, LD1, HD2, LD2).

Referring to FIG. 10, in the first modulation power signal Vdd_mod, which is the first power signal Vdd in the touch driving period TP, the voltage level in each high-level signal section and the voltage level in each low-level signal section can be varied.

Here, in the first modulation power signal Vdd_mod, which is the first power signal Vdd in the touch driving period TP, the variation in voltage level in each high-level signal section corresponds to the signal distortion HD1 in each high-level signal section, and the variation in voltage level in each low-level signal section corresponds to the signal distortion LD1 in each low-level signal section.

In the second modulation power signal Vss_mod, which is the second power signal Vss in the touch driving period TP, the voltage level in each high-level signal section and the voltage level in each low-level signal section can be varied.

Here, in the second modulation power signal Vss_mod, which is the second power signal Vss in the touch driving period TP, the variation in voltage level in each high-level signal section corresponds to the signal distortion HD2 in each high-level signal section, and the variation in voltage level in each low-level signal section corresponds to the signal distortion LD2 in each low-level signal section.

Referring to FIG. 10, in the first modulation power signal Vdd_mod which is the first power signal Vdd, the maximum voltage Vdd0+($\Delta$V)/2 in the high-level signal section can be a value obtained by adding half of the specific amplitude $\Delta$V to the first reference power voltage Vdd0, and the minimum voltage Vdd0−($\Delta$V)/2 in the low-level signal section can be a value obtained by subtracting half of the specific amplitude $\Delta$V from the first reference power voltage Vdd0. Here, the specific amplitude $\Delta$V can be the amplitude $\Delta$V of the touch driving signal Vtds.

Referring to FIG. 10, in the first modulation power signal Vdd_mod, the intermediate voltage between the maximum voltage Vdd0+($\Delta$V)/2 in the high-level signal section and the minimum voltage Vdd0−($\Delta$V)/2 in the low-level signal section can be the first reference power voltage Vdd0.

Referring to FIG. 10, in the second modulation power signal Vss_mod which is the second power signal Vss, the maximum voltage Vss0+($\Delta$V)/2 in the high-level signal section can be a value obtained by adding half of the specific amplitude $\Delta$V to the second reference power voltage Vss0, and the minimum voltage Vss0−($\Delta$V)/2 in the low-level signal section can be a value obtained by subtracting half of the specific amplitude $\Delta$V from the second reference power voltage Vss0. Here, the specific amplitude $\Delta$V can be the amplitude $\Delta$V of the touch driving signal Vtds. For example, according to an embodiment, a changing signal equal to the touch driving signal Vtds can be modulated on top of each of the first power signal Vdd and the second power signal Vss in order to create the first modulation power signal Vdd_mod and the second modulation power signal Vss_mod, respectively.

Referring to FIG. 10, in the second modulation power signal Vss_mod, the intermediate voltage between the maximum voltage Vss0+($\Delta$V)/2 in the high-level signal section and the minimum voltage Vss0−($\Delta$V)/2 in the low-level signal section can be the second reference power voltage Vss0 (e.g., Vss0 can be a bias voltage for the second modulation power signal Vss_mod).

As described above, due to the characteristics of the display panel 110, because the amount of current flowing through the first power line DVL and the second power line BVL is greater than that of the first gate voltage line VGHW and the second gate voltage line VGLW, a greater signal delay can occur in the first power line DVL and the second power line BVL than in the first gate voltage line VGHW and the second gate voltage line VGLW.

Conversely, due to the characteristics of the display panel 110, because the amount of current flowing through the first gate voltage line VGHW and the second gate voltage line VGLW is smaller than that of the first power line DVL and the second power line BVL, a smaller signal delay can occur in the first gate voltage line VGHW and the second gate voltage line VGLW than in the first power line DVL and the second power line BVL.

Accordingly, signal distortions HD1 and LD1 of the first power signal Vdd can occur in the first power line DVL, and signal distortions HD2 and LD2 of the second power signal Vss can occur in the second power line BVL.

However, there may be little or no signal distortion of the first gate voltage Vgh in the first gate voltage line VGHW, and there can be little or no signal distortion of the second gate voltage Vgl in the second gate voltage line VGLW (e.g., Vgh and Vgl can have crisp square wave forms with little to no distortion).

Accordingly, during the touch driving period TP, the voltage level Vgh0+($\Delta$V)/2 in each high-level signal section and the voltage level Vgh0−($\Delta$V)/2 in each low-level signal section can be maintained constant in the first modulation gate voltage Vgh_mod which is the first gate voltage Vgh.

Likewise, the voltage level Vgl0+($\Delta$V)/2 in each high-level signal section and the voltage level Vgl0−($\Delta$V)/2 in each low-level signal section can remain constant at the second modulation gate voltage Vgl_mod which is the second gate voltage Vgl during the touch driving period TP.

When the signal distortions HD1 and LD1 of the first power signal Vdd and the signal distortions HD2 and LD2 of the second power signal Vss occur, a signal difference between the first and second power signals Vdd and Vss and other signals can occur, thereby deteriorating touch sensing performance and causing display screen distortion that can impair image quality.

A phenomenon in which a signal difference between the first and second power signals Vdd and Vss and other signals occurs due to signal distortions HD1, LD1, HD2, and LD2 of the first and second power signals Vdd and Vss consuming a large amount of current is described again with reference to FIG. 11. For convenience of description, the second gate voltage Vgl of the first gate voltage Vgh and the second gate voltage Vgl is taken as an example, and the second power signal Vss of the first power signal Vdd and the second power signal Vss is taken as an example.

As described above, because of the impedance (e.g., resistance, inductance, or capacitance) on the flow path of the current for driving the display, as illustrated in FIG. 10, during the touch driving period TP, in the first modulation power signal Vdd_mod which is the first power signal Vdd, each high-level signal section can have a voltage drop pattern (e.g., a voltage variation pattern in which the voltage drops), and each low-level signal section can have a voltage rise pattern (e.g., a voltage variation pattern in which the voltage rises). Similarly, during the touch driving period TP, in the second modulation power signal Vss_mod, which is the second power signal Vss, each high-level signal section can have a voltage drop pattern (e.g., a voltage variation pattern in which a voltage drops), and each low-level signal section can have a voltage rise pattern (e.g., a voltage variation pattern in which a voltage rises).

Also, as illustrated in FIG. 10, during the touch driving period TP, the voltage drop pattern (e.g., including the voltage drop width or the voltage drop speed) of each high-level signal section included in the first modulation power signal Vdd_mod which is the first power signal Vdd and the voltage drop pattern (e.g., including the voltage drop width or the voltage drop speed) of each high-level signal section included in the second modulation power signal Vss_mod which is the second power signal Vs can correspond to each other, and the voltage rise pattern (e.g., including the voltage rise width or the voltage rise speed) of each low-level signal section included in the first modulation power signal Vdd_mod which is the first power signal Vdd and the voltage rise pattern (e.g., including the voltage rise width or the voltage rise speed) of each low-level signal section included in the second modulation power signal Vss_mod which is the second power signal Vss can correspond to each other.

The characteristics of the above-described voltage variation patterns of the first and second power signals Vdd and Vss can occur, in particular, when there is a choke CK to be described below with reference to FIG. 20 on the flow path of the current for display driving.

However, the first and second power signals Vdd and Vss are not limited to the above-described voltage variation patterns (the voltage drop pattern in the high-level signal section and the voltage rise pattern in the low-level signal section) of the first and second power signals Vdd and Vss, and the first and second power signals Vdd and Vss can have various voltage variation patterns according to impedance characteristics on the current flow path for display driving.

For example, in each of the first and second power signals Vdd and Vss, the high-level signal section can have a voltage rise pattern in which a voltage rises, and the low-level signal section can have a voltage drop pattern in which a voltage drops.

As another example, in each of the first and second power signals Vdd and Vss, a high-level signal section can have a voltage variation pattern in which a voltage rise pattern and a voltage drop pattern are mixed, and a low-level signal section can have a voltage variation pattern in which a voltage rise pattern and a voltage drop pattern are mixed.

For another example, in each of the first and second power signals Vdd and Vss, the high-level signal section can have a voltage variation pattern in which a peak voltage is generated, and the low-level signal section can have a voltage variation pattern in which a peak voltage is generated. Here, the peak voltage can be randomly generated.

As described above, although the first and second power signals Vdd and Vss have various voltage variation patterns, the voltage variation pattern of the first power signal Vdd and the voltage variation pattern of the second power signal Vss can be the same as each other.

Figure 11:
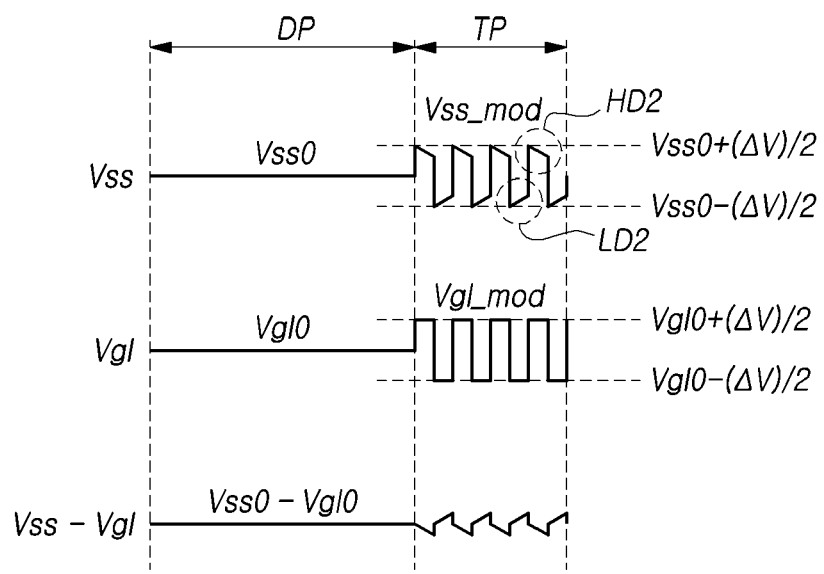
FIG. 11 illustrates a difference between a second power signal and a second gate voltage in a touch display device according to embodiments.

FIG. 11 illustrates a difference between a second power signal Vss and a second gate voltage Vgl in the touch display device 100 according to embodiments of the disclosure.

Referring to FIG. 11, because the amount of current flowing through the second power line BVL is greater than the amount of current flowing through the second gate voltage line VGLW, a greater signal delay can occur in the second power line BVL than in the second gate voltage line VGLW.

Accordingly, signal distortions HD2 and LD2 of the second power signal Vss in the second power line BVL can occur. However, the signal distortion of the second gate voltage Vgl in the second gate voltage line VGLW may not occur.

Referring to FIG. 11, during the display driving period DP, the second power signal Vss is the second reference power voltage Vss0, and the second gate voltage Vgl is the second reference gate voltage Vgl0.

Accordingly, during the display driving period DP, the difference Vss−Vgl between the second power signal Vss and the second gate voltage Vgl can be the difference Vss0−Vgl0 between the second reference power voltage Vss0 and the second reference gate voltage Vgl0, and can be a constant value.

The reason why the difference Vss−Vgl between the second power signal Vss and the second gate voltage Vgl is constant during the display driving period DP is that, during the display driving period DP, the second power signal Vss is the second reference power voltage Vss0, which is a DC (direct current) voltage having a constant voltage level, and the second gate voltage Vgl is the second reference gate voltage Vgl0, which is a DC (direct current) voltage having a constant voltage level.

Referring to FIG. 11, when the voltage level of the second power signal Vss varies during the touch driving period TP, signal distortions HD2 and LD2 can occur. Accordingly, during the touch driving period TP, the second power signal Vss can be a second modulation power signal Vss_mod that alternately includes a high-level signal section in which a voltage level changes and a low-level signal section in which a voltage level changes.

In other words, during the touch driving period TP, in the second modulation power signal Vss_mod, the voltage level in each high-level signal section can be changed (HD2), and the voltage level in each low-level signal section can be changed (LD2).

During the touch driving period TP, in the second modulation power signal Vss_mod, the maximum voltage in each high-level signal section can be a value (Vss0+(ΔV)/2) obtained by adding half of the amplitude ΔV of the touch driving signal Vtds to the second reference power voltage Vss0.

During the touch driving period TP, in the second modulation power signal Vss_mod, the minimum voltage in each low-level signal section can be a value Vss0−(ΔV)/2 obtained by subtracting half of the amplitude ΔV of the touch driving signal Vtds from the second reference power voltage Vss0.

Referring to FIG. 11, during the touch driving period TP, the second gate voltage Vgl can be a second modulation gate voltage Vgl_mod that alternately includes a high-level signal section having a constant voltage level and a low-level signal section having a constant voltage level.

In other words, during the touch driving period TP, in the second modulation gate voltage Vgl_mod, the voltage level in each high-level signal section may not change, and the voltage level in each low-level signal section may not change. Meanwhile, even if the voltage level in each high-level signal section changes in the second modulation gate voltage Vgl_mod during the touch driving period TP, it can have a slight change smaller than the voltage level variation width in each high-level signal section of the second modulation power signal Vss_mod. Further, even if the voltage level in each low-level signal section changes in the second modulation gate voltage Vgl_mod during the touch driving period TP, it can have a slight change smaller than the voltage level variation width in each low-level signal section of the second modulation power signal Vss_mod.

During the touch driving period TP, in the second modulation gate voltage Vgl_mod, a constant voltage of each high-level signal section can be a value (Vgl0+(ΔV)/2) obtained by adding half of the amplitude ΔV of the touch driving signal Vtds to the second reference gate voltage Vgl0. For example, the second reference gate voltage Vgl0 can be added as a voltage bias to the touch driving signal Vtds to generate the second modulation gate voltage Vgl_mod, but embodiments are not limited thereto.

During the touch driving period TP, in the second modulation gate voltage Vgl_mod, a constant voltage of each low-level signal section can be a value Vgl0−(ΔV)/2 obtained by subtracting half of the amplitude ΔV of the touch driving signal Vtds from the second reference gate voltage Vgl0.

Referring to FIG. 11, in the second modulation power signal Vss_mod, which is the second power signal Vss, the voltage level in each high-level signal section and the voltage level in each low-level signal section change during the touch driving period TP, and thus the difference Vss−Vgl between the second power signal Vss and the second gate voltage Vgl is not constant.

This signal difference can cause a deviation in the parasitic capacitance Cp during touch driving, which can cause a decrease in touch sensitivity. Further, the signal distortions HD2 and LD2 of the second power signal Vss generated during the touch driving period TP can affect the display driving, and thus the display screen distortion can be generated and image quality can be impaired.

Referring back to FIGS. 10 and 11, since the display panel 110 is a self-luminous display panel such as an OLED panel driven by a current driving method, a large amount of current flows through the first power line DVL to which the first power signal Vdd is applied and the second power line BVL to which the second power signal Vss is applied.

Accordingly, when the voltage level of the first power signal Vdd swings and the voltage level of the second power signal Vss swings for load-free driving, signal distortions HD1 and LD1 of the first power signal Vdd and signal distortions HD2 and LD2 of the second power signal Vss can occur. These signal distortions HD1, LD1, HD2, and LD2 can cause a decrease in touch sensitivity and a distortion of a display screen and image quality and touch sensing can both be impaired.

Accordingly, the touch display device 100 according to embodiments of the disclosure can provide current-based load-free driving that does not distort the displayed image and does not impair touch sensitivity even when signal distortions HD1 and LD1 of the first power signal Vdd and signal distortions HD2 and LD2 of the second power signal Vss occur.

A current-based load-free driving system (I-LFDS) included in the touch display device 100 according to embodiments of the disclosure and a current-based load-free driving method according to embodiments of the disclosure are described below.

FIGS. 12 to 15 briefly illustrate a current-based load-free driving system (I-LFDS) of the touch display device 100 according to embodiments of the disclosure.

Referring to FIGS. 12 to 15, the current-based load-free driving system I-LFDS of the touch display device 100 according to embodiments of the disclosure can include a signal conversion circuit 1200 configured to perform signal conversion processing on various driving signals Vdrv to be supplied to the display panel 110 or a driving circuit connected to the display panel 110.

Referring to FIGS. 12 to 15, the signal conversion circuit 1200 can generate and output a driving signal Vdrv suitable for the driving mode.

Referring to FIGS. 12 to 15, the driving mode can include a display driving mode for image displaying and a touch driving mode for touch sensing.

Referring to FIGS. 12 to 15, the driving period in which the driving mode is the display driving mode is referred to as the display driving period DP, and the driving period in which the driving mode is the touch driving mode is referred to as the touch driving period TP.

Referring to FIGS. 12 to 15, the display driving period DP and the touch driving period TP can be defined by a touch synchronization signal Tsync.

For example, the touch synchronization signal Tsync can alternately include a first state signal section SS1 defining the display driving period DP and a second state signal section SS2 defining the touch driving period TP.

For example, in the touch synchronization signal Tsync, the first state signal section SS1 and the second state signal section SS2 can have different voltage levels. For example, the first state signal section SS1 can be a high-level voltage section, and the second state signal section SS2 can be a low-level voltage section. For another example, the first state signal section SS1 can be a low-level voltage section, and the second state signal section SS2 can be a high-level voltage section.

Referring to FIGS. 12 to 15, the signal conversion circuit 1200 can receive a touch synchronization signal Tsync and can generate and output a driving signal Vdrv suitable for the display driving mode, or can generate and output a driving signal Vdrv suitable for the touch driving mode, based on the touch synchronization signal Tsync.

Referring to FIGS. 12 to 15, when the touch synchronization signal Tsync is the first state signal section SS1, the signal conversion circuit 1200 can output a reference driving voltage Vdrv0 in the form of a DC voltage having a constant voltage level.

Referring to FIGS. 12 to 15, when the touch synchronization signal Tsync is the second state signal section SS2, the signal conversion circuit 1200 can output a modulation driving signal Vdrv_mod in the form of an AC voltage in which a voltage level swings.

Referring to FIGS. 12 to 15, the driving signal Vdrv suitable for the display driving mode can be a reference driving voltage Vdrv0 in the form of a DC voltage (direct current voltage) having a constant voltage level.

Referring to FIGS. 12 to 15, for example, the reference driving voltage Vdrv0 can include a reference touch electrode driving signal Vte0, which is a touch electrode driving signal Vte applied to the touch electrode TE for touch sensing.

Referring to FIGS. 12 to 15, for example, the reference driving voltage Vdrv0 is a driving voltage used to drive the display driving pattern DDP, and can include a first reference gate voltage Vgh0, a second reference gate voltage Vgl0, and a reference gamma voltage Vgma0.

During the display driving period DP, the first reference gate voltage Vgh0 can be supplied to the gate driving circuit 130 through the first gate voltage line VGHW, and the second reference gate voltage Vgl0 can be supplied to the gate driving circuit 130 through the second gate voltage line VGLW. Here, the gate driving circuit 130 can be an embedded gate driving circuit formed on or in the display panel 130.

During the display driving period DP, the gate driving circuit 130 can generate a gate signal generated based on the first reference gate voltage Vgh0 and the second reference gate voltage Vgl0, and output the gate signal to the gate line GL disposed on the display panel 110. Here, the gate signal can include a scanning gate signal SCAN, and the gate line GL can include a scanning gate line SCL.

Referring to FIGS. 12 to 15, a driving signal Vdrv suitable for the touch driving mode can be a modulation driving signal Vdrv_mod of an AC voltage type (e.g., AC voltage) in which a voltage level swings.

Referring to FIGS. 12 to 15, for example, the modulation driving signal Vdrv_mod can include a modulation touch electrode driving signal Vte_mod which is a touch electrode driving signal Vte applied to the touch electrode TE.

The modulation touch electrode driving signal Vte_mod, which is a touch electrode driving signal Vte applied to the touch electrode TE, can be a touch driving signal Vtds supplied to the touch electrode TE to be sensed.

The modulation touch electrode driving signal Vte_mod, which is the touch electrode driving signal Vte applied to the touch electrode TE, can be a load-free driving signal Vlfd supplied to the touch electrode TE, which is not a sensing target.

Figure 12:
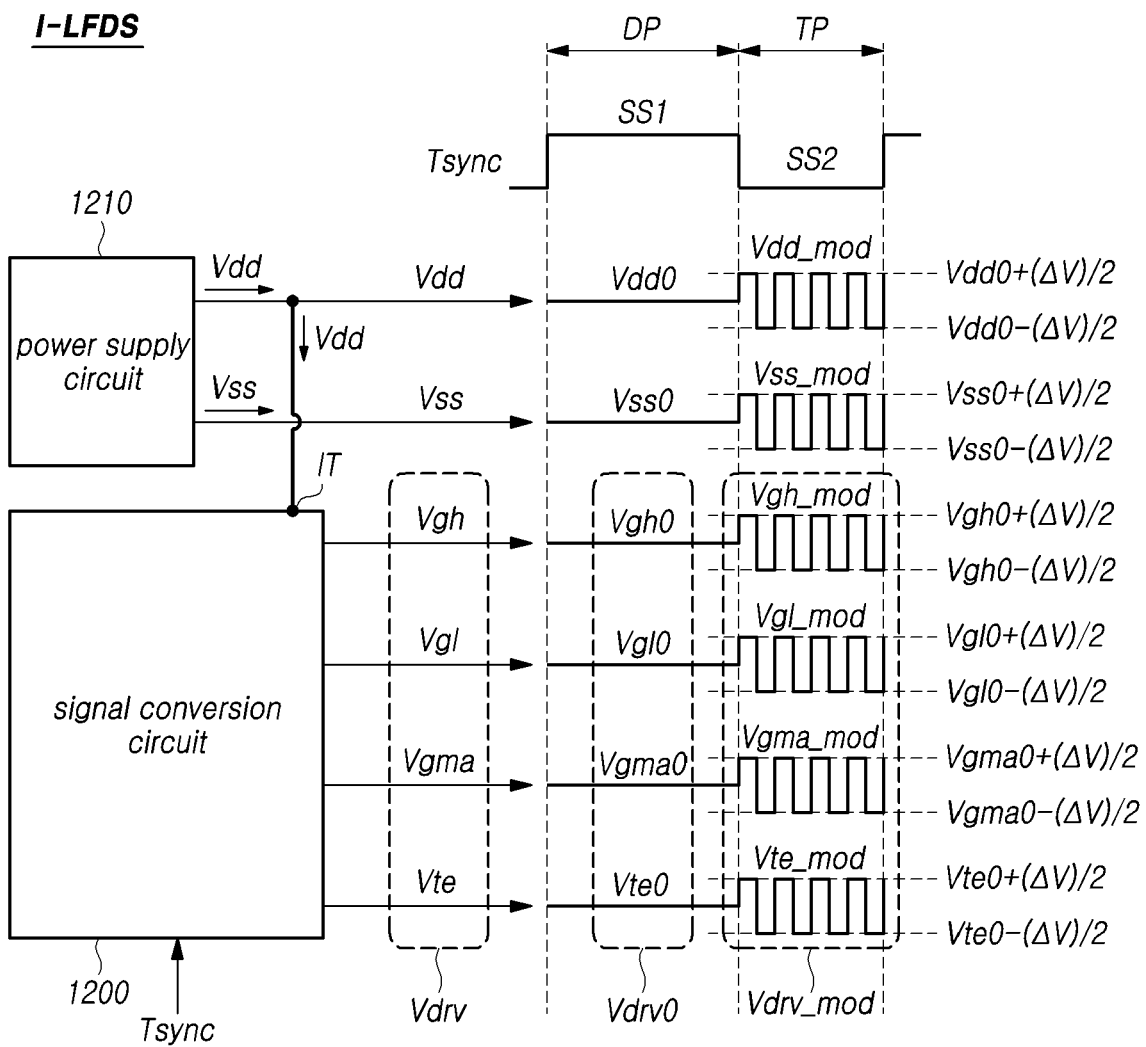
FIGS. 12, 13, 14, and 15 briefly illustrate a current-based load-free driving system of a touch display device according to embodiments of the disclosure.

As illustrated in FIG. 12, during the touch driving period TP, the intermediate voltage between the maximum high-level voltage and the minimum low-level voltage of the modulation driving signal Vdrv_mod can be the reference driving voltage Vdrv0. In other words, the modulation driving signal Vdrv_mod can have a desired amplitude ΔV as the voltage level varies in the positive direction and the negative direction from the intermediate voltage (e.g., center voltage or bias voltage) between the maximum high-level voltage and the minimum low-level voltage.

As another example, during the driving period TP, the minimum low-level voltage of the modulation driving signal Vdrv_mod can be the reference driving voltage Vdrv0. In other words, the voltage level of the modulation driving signal Vdrv_mod can be changed by a desired amplitude ΔV with the minimum low-level voltage taken as the minimum voltage.

As another example, during the driving period TP, the maximum high-level voltage of the modulation driving signal Vdrv_mod can be the reference driving voltage Vdrv0. In other words, the voltage level of the modulation driving signal Vdrv_mod can be changed by a desired amplitude ΔV with the maximum high-level taken as the maximum voltage.

Referring to FIGS. 12 to 15, for example, the modulation driving signal Vdrv_mod can be a load-free driving signal Vlfd used to drive the display driving pattern DDP.

Referring to FIGS. 12 to 15, for example, the load-free driving signal Vlfd used to drive the display driving pattern DDP can include a first modulation gate voltage Vgh_mod, a second modulation gate voltage Vgl_mod, and a modulation gamma voltage Vgma_mod.

During the touch driving period TP, the first modulation gate voltage Vgh_mod can be supplied to the gate driving circuit 130 through the first gate voltage line VGHW, and the second modulation gate voltage Vgl_mod can be supplied to the gate driving circuit 130 through the second gate voltage line VGLW. Here, the gate driving circuit 130 can be an embedded gate driving circuit formed on the display panel 130.

During the touch driving period TP, the gate driving circuit 130 can generate a gate signal having the second modulation gate voltage Vgl_mod and output the gate signal to the gate line GL disposed on the display panel 110. Here, the gate signal can include a scanning gate signal SCAN, and the gate line GL can include a scanning gate line SCL.

Referring to FIGS. 12 to 15, the signal conversion circuit 1200 can be configured to generate and output a driving signal Vdrv suitable for the driving mode by using at least one of the first power signal Vdd and the second power signal Vss.

In other words, the signal conversion circuit 1200 can be configured to output a driving signal Vdrv having a signal waveform corresponding to one of the first power signal Vdd and the second power signal Vss to the display panel 110 or a driving circuit connected to the display panel 110. In other words, the driving signal Vdrv output by the signal conversion circuit 1200 is generated based on at least one of the first power signal Vdd or the second power signal Vss.

The first power signal Vdd and the second power signal Vss can be common power sources applied to a plurality of subpixels SP. For example, the first power signal Vdd can be supplied to the driving transistor DRT, and the second power signal Vss can be supplied to the light emitting device ED.

Referring to FIGS. 12 to 15, the signal conversion circuit 1200 can include an input terminal IT capable of receiving at least one of the first power signal Vdd and the second power signal Vss.

Figure 13:
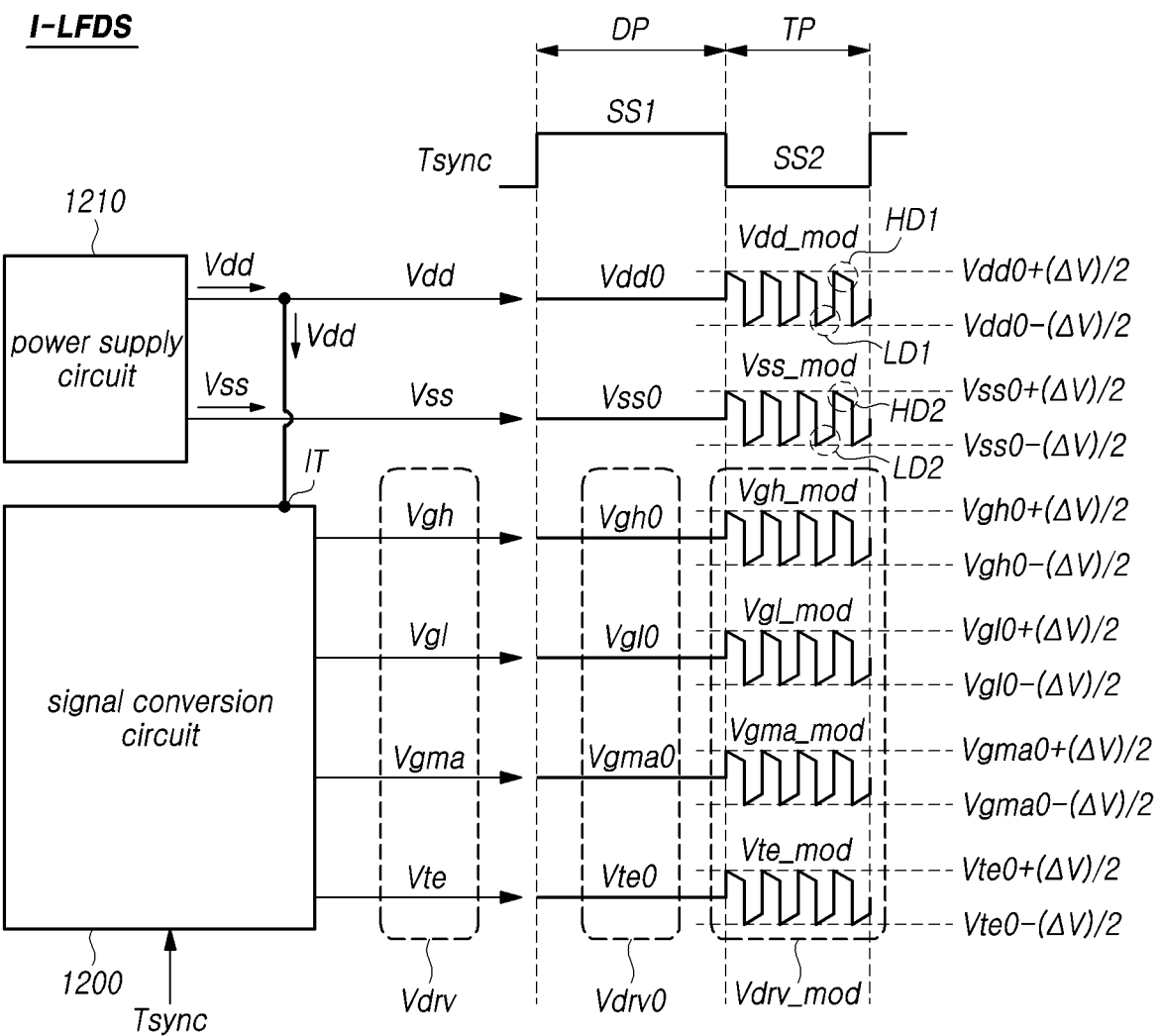

Referring to FIGS. 12 and 13, the signal conversion circuit 1200 can be configured to receive the first power signal Vdd through the input terminal IT to generate and output a driving signal Vdrv suitable for the driving mode.

Figure 14:
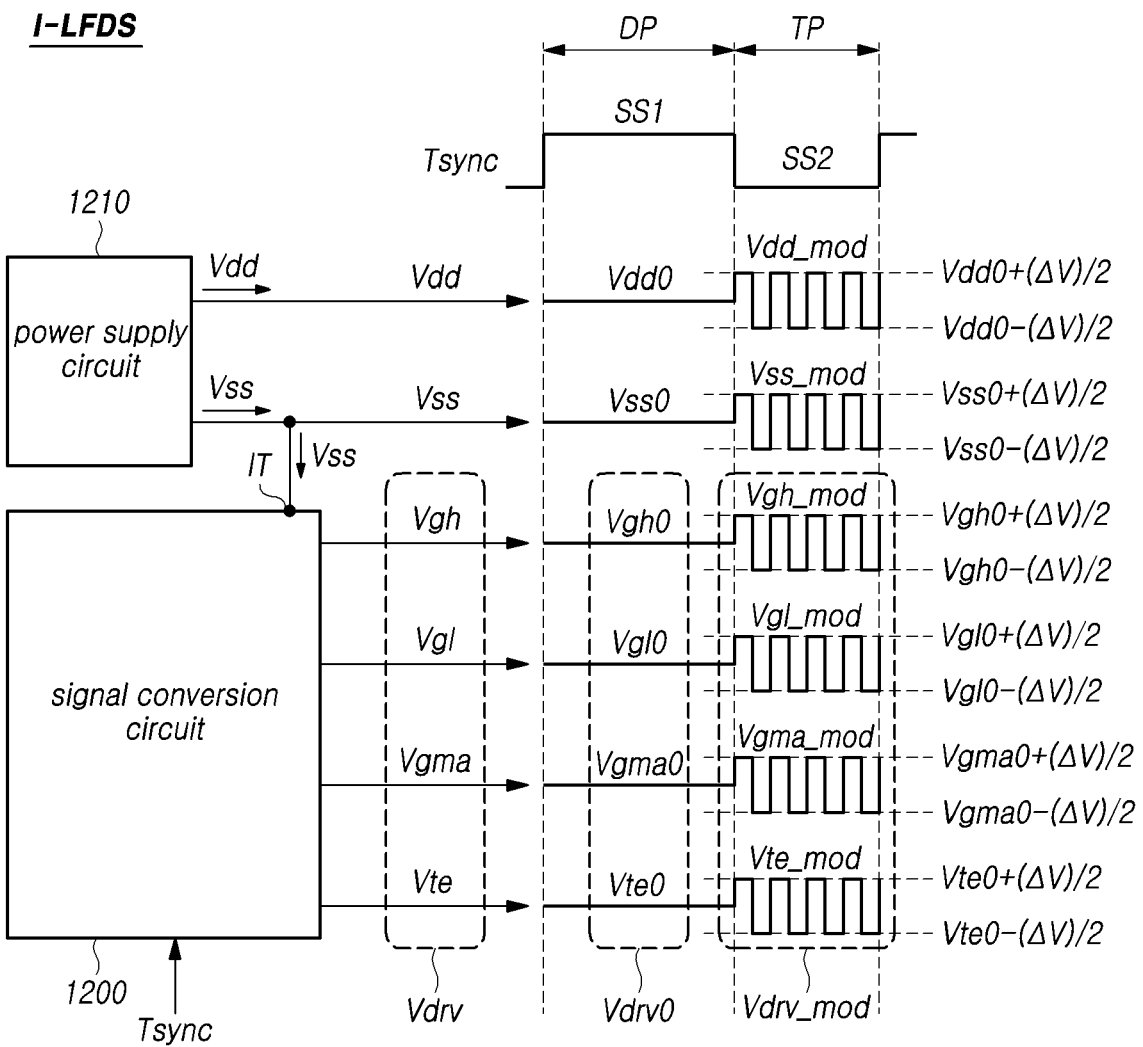
Figure 15:
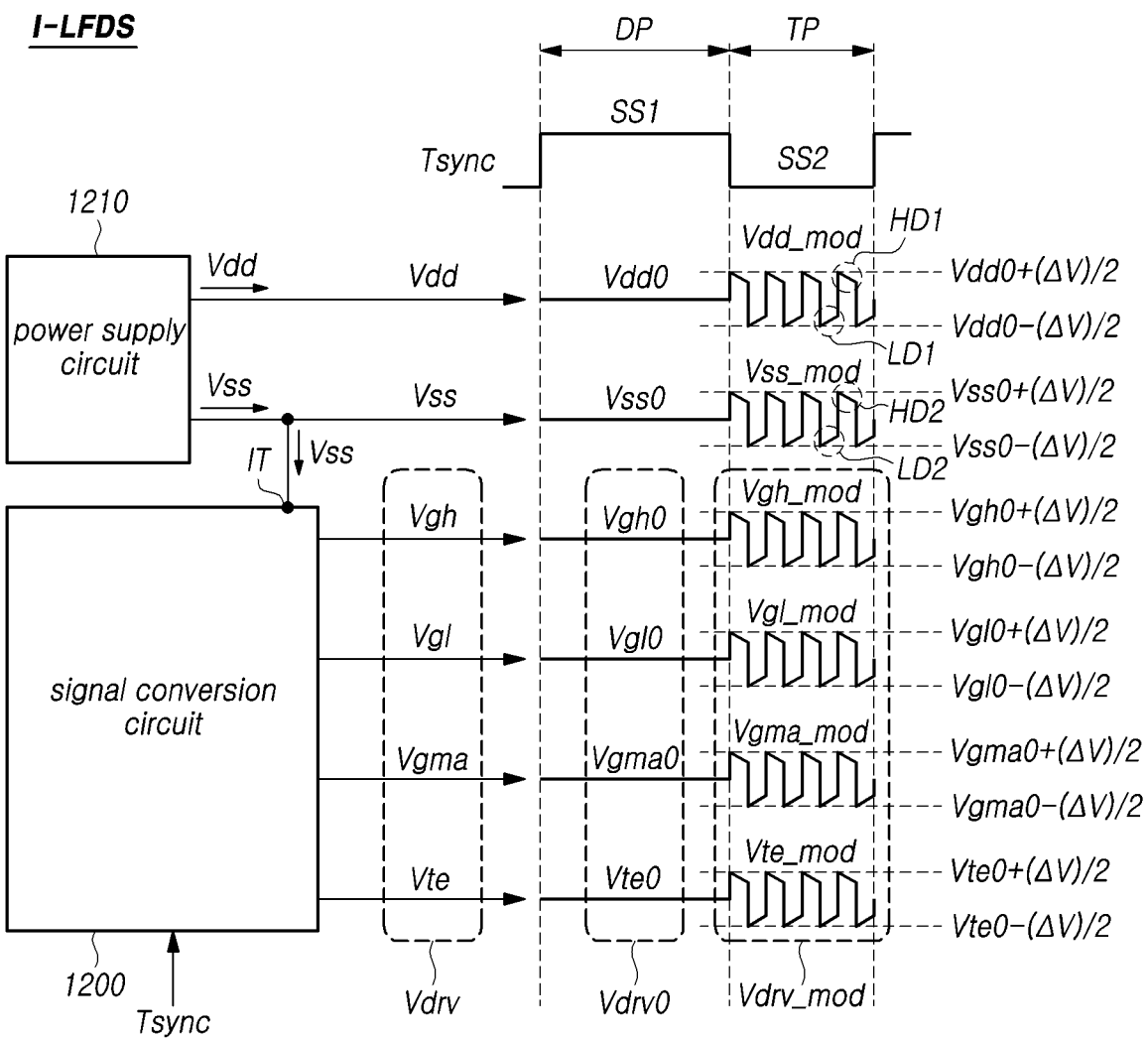

Referring to FIGS. 14 and 15, the signal conversion circuit 1200 can be configured to receive the second power signal Vss through the input terminal IT to generate and output a driving signal Vdrv suitable for the driving mode.

Referring to FIGS. 12 to 15, the current-based load-free driving system I-LFDS of the touch display device 100 according to embodiments of the disclosure can further include a power supply circuit 1210 configured to output a first power signal Vdd and a second power signal Vss.

Referring to FIGS. 12 to 15, during the display driving period DP, the power supply circuit 1210 can be configured to output a first reference power voltage Vdd0 having a constant first voltage level as a first power signal Vdd and output a second reference power voltage Vss0 having a constant second voltage level as a second power signal Vss.

Referring to FIGS. 12 to 15, during the touch driving period TP, the power supply circuit 1210 can be configured to output, as the first power signal Vdd, a first modulation power signal Vdd_mod of which a voltage level is varied with respect to the first reference power voltage Vdd0, and output, as the second power signal Vss, a second modulation power signal Vss_mod of which a voltage level is varied with respect to the second reference power voltage Vss0.

Referring to FIGS. 12 to 15, during the display driving period DP, the signal conversion circuit 1200 can be configured to output a reference driving voltage Vdrv0 having a constant voltage level as a driving signal Vdrv.

Referring to FIGS. 12 to 15, during the touch driving period TP, the signal conversion circuit 1200 can be configured to output, as the driving signal Vdrv, a modulation driving signal Vdrv_mod of which a voltage level is varied with respect to the reference driving voltage Vdrv0.

Referring to FIGS. 12 to 15, the amplitude of the modulated driving signal Vdrv_mod, which is the driving signal Vdrv during the touch driving period TP, can correspond to the amplitude of one of the first modulation power signal Vdd_mod, which is the first power signal Vdd during the touch driving period TP, and the second modulation power signal Vss_mod, which is the second power signal Vss during the touch driving period TP.

Referring to FIGS. 12 to 15, the amplitude of the modulated driving signal Vdrv_mod, which is the driving signal Vdrv during the touch driving period TP, can correspond to the amplitude of the modulation touch electrode driving signal Vte_mod, which is the touch electrode driving signal Vte applied to the touch electrode TE during the touch driving period TP.

The modulation touch electrode driving signal Vte_mod, which is a touch electrode driving signal Vte applied to the touch electrode TE during the touch driving period TP, can be a touch driving signal Vtds applied to the touch electrode TE for touch sensing.

Referring to FIGS. 12 and 14, during the touch driving period TP, a signal distortion may not occur in the first modulation power signal Vdd_mod which is the first power signal Vdd, and a signal distortion may not occur in the second modulation power signal Vss_mod which is the second power signal Vss.

Accordingly, during the touch driving period TP, the voltage level of each high-level signal section included in the first modulation power signal Vdd_mod, which is the first power signal Vdd, can have a constant first high-level voltage Vdd0+($\Delta$V)/2, and the voltage level of each low-level signal section included in the first modulation power signal Vdd_mod, which is the first power signal Vdd, can have a constant first low-level voltage Vdd0−($\Delta$V)/2.

During the touch driving period TP, the voltage level of each high-level signal section included in the second modulation power signal Vss_mod, which is the second power signal Vss, can have a constant second high-level voltage Vss0+($\Delta$V)/2, and the voltage level of each low-level signal section included in the second modulation power signal Vss_mod, which is the second power signal Vss, can have a constant second low-level voltage Vss0−($\Delta$V)/2.

Since the signal conversion circuit 1200 generates the driving signal Vdrv having a signal waveform corresponding to the signal waveform of the first power signal Vdd or the second power signal Vss, the voltage level of each high-level signal section included in the modulation driving signal Vdrv_mod which is the driving signal Vdrv during the touch driving period TP can be constant, and the voltage level of each low-level signal section included in the modulation driving signal Vdrv_mod which is the driving signal Vdrv during the touch driving period TP can be constant.

For example, referring to FIGS. 12 and 14, during the touch driving period TP, in the first modulation gate voltage Vgh_mod which is the first gate voltage Vgh, the voltage level of each high-level signal section can be maintained at a constant high-level voltage Vgh0+($\Delta$V)/2 which is higher than the first reference gate voltage Vgh0 by a constant voltage ($\Delta$V)/2, and the voltage level of each low-level signal section can be maintained at a constant low-level voltage Vgh0−($\Delta$V)/2 which is lower than the first reference gate voltage Vgh0 by a constant voltage ($\Delta$V)/2.

For example, referring to FIGS. 12 and 14, during the touch driving period TP, in the second modulation gate voltage Vgl_mod which is the second gate voltage Vgl, the voltage level of each high-level signal section can be maintained at a constant high-level voltage Vgl0+($\Delta$V)/2 which is higher than the second reference gate voltage Vgl0 by a constant voltage ($\Delta$V)/2, and the voltage level of each low-level signal section can be maintained at a constant low-level voltage Vgl0−($\Delta$V)/2 which is lower than the second reference gate voltage Vgl0 by a constant voltage ($\Delta$V)/2.

For example, referring to FIGS. 12 and 14, during the touch driving period TP, in the modulation gamma voltage Vgma_mod which is the gamma voltage Vgma, the voltage level of each high-level signal section can be maintained at a constant high-level voltage Vgma0+($\Delta$V)/2 which is higher than the reference gamma voltage Vgma0 by a predetermined voltage ($\Delta$V)/2, and the voltage level of each low-level signal section can be maintained at a constant low-level voltage Vgma0−($\Delta$V)/2 which is lower than the reference gamma voltage Vgma0 by a predetermined voltage ($\Delta$V)/2.

For example, referring to FIGS. 12 and 14, during the touch driving period TP, in the modulation touch electrode driving signal Vte_mod which is the touch electrode driving signal Vte, the voltage level of each high-level signal section can be maintained at a constant high-level voltage Vte0+($\Delta$V)/2 which is higher than the reference touch electrode driving voltage Vte0 by a predetermined voltage ($\Delta$V)/2, and the voltage level of each low-level signal section can be maintained at a constant low-level voltage Vte0−($\Delta$V)/2 which is lower than the reference touch electrode driving voltage Vte0 by a predetermined voltage ($\Delta$V)/2.

Referring to FIGS. 13 and 15, during the touch driving period TP, the first modulation power signal Vdd_mod, which is the first power signal Vdd, can have signal distortions HD1 and LD1, and the second modulation power signal Vss_mod, which is the second power signal Vss, can have signal distortions HD2 and LD2.

Accordingly, during the touch driving period TP, the voltage level of each high-level signal section included in the first modulation power signal Vdd_mod which is the first power signal Vdd can be changed (HD1), and the voltage level of each low-level signal section included in the first modulation power signal Vdd_mod which is the first power signal Vdd can be changed (LD1).

Further, during the touch driving period TP, the voltage level of each high-level signal section included in the second modulation power signal Vss_mod which is the second power signal Vss can be changed (HD2), and the voltage level of each low-level signal section included in the second modulation power signal Vss_mod which is the second power signal Vss can be changed (LD2).

Since the signal conversion circuit 1200 generates the driving signal Vdrv having a signal waveform corresponding to the signal waveform of the first power signal Vdd or the second power signal Vss, the voltage level of each high-level signal section included in the modulation driving signal Vdrv_mod which is the driving signal Vdrv during the touch driving period TP can be changed, and the voltage level of each low-level signal section included in the modulation driving signal Vdrv_mod which is the driving signal Vdrv during the touch driving period TP can be changed, in order to correspond to the signal waveform of the first power signal Vdd.

Referring to FIGS. 13 and 15, during the touch driving period TP, the voltage level in each high-level signal section included in the first modulation power signal Vdd_mod, which is the first power signal Vdd, can change within a first high-level voltage variation range. The voltage level variation in the high-level signal section corresponds to the signal distortion HD1.

Here, the first high-level voltage variation range can exceed the first reference power supply voltage Vdd0 and be equal to or less than the first maximum high-level voltage Vdd0+($\Delta$V)/2.

Referring to FIGS. 13 and 15, during the touch driving period TP, the voltage level in each low-level signal section included in the first modulation power signal Vdd_mod, which is the first power signal Vdd, can change within the first low-level voltage variation range. The voltage level variation phenomenon in the low-level signal section corresponds to the signal distortion LD1.

Here, the first low-level voltage variation range can be less than the first reference power supply voltage Vdd0 and can be larger than or equal to the first minimum low-level voltage Vdd0−($\Delta$V)/2.

Referring to FIGS. 13 and 15, during the touch driving period TP, the voltage level in each high-level signal section included in the second modulation power signal Vss_mod, which is the second power signal Vss, can change within a second high-level voltage variation range. The voltage level variation in the high-level signal section corresponds to the signal distortion HD2.

Here, the second high-level voltage variation range can exceed the second reference power supply voltage Vss0 and be equal to or less than the second maximum high-level voltage Vss0+($\Delta$V)/2.

Referring to FIGS. 13 and 15, during the touch driving period TP, the voltage level in each low-level signal section included in the second modulation power signal Vss_mod, which is the second power signal Vss, can change within a second low-level voltage variation range. The voltage level variation phenomenon in the low-level signal section corresponds to the signal distortion LD2.

Here, the second low-level voltage variation range can be less than the second reference power supply voltage Vss0 and can be larger than or equal to the second minimum low-level voltage Vss0−($\Delta$V)/2.

For example, referring to FIGS. 13 and 15, during the touch driving period TP, in the first modulation gate voltage Vgh_mod which is the first gate voltage Vgh, the voltage level of each high-level signal section can change within the first high-level gate voltage variation range.

Here, the first high-level gate voltage variation range can exceed the first reference gate voltage Vgh0 and be less than or equal to the first maximum high-level gate voltage Vgh0+($\Delta$V)/2.

During the touch driving period TP, in the first modulation gate voltage Vgh_mod which is the first gate voltage Vgh, the voltage level of each low-level signal section can change within the first low-level gate voltage variation range.

Here, the first low-level gate voltage variation range can be less than the first reference gate voltage Vgh0 and can be larger than or equal to the first minimum low-level gate voltage Vgh0−($\Delta$V)/2.

For example, referring to FIGS. 13 and 15, during the touch driving period TP, in the second modulation gate voltage Vgl_mod which is the second gate voltage Vgl, the voltage level of each high-level signal section can vary within the second high-level gate voltage variation range.

Here, the second high-level gate voltage variation range can exceed the second reference gate voltage Vgl0 and be less than or equal to the second maximum high-level gate voltage Vgl0+($\Delta$V)/2.

During the touch driving period TP, in the second modulation gate voltage Vgl_mod which is the second gate voltage Vgl, the voltage level of each low-level signal section can vary within the second low-level gate voltage variation range.

Here, the second low-level gate voltage variation range can be less than the second reference gate voltage Vgl0 and can be larger than or equal to the second minimum low-level gate voltage Vgl0−($\Delta$V)/2.

For example, referring to FIGS. 13 and 15, during the touch driving period TP, in the modulation gamma voltage Vgma_mod which is the gamma voltage Vgma, the voltage level of each high-level signal section can change within the high-level gamma voltage variation range.

Here, the high-level gamma voltage variation range can exceed the reference gamma voltage Vgma0 and be equal to or less than the maximum gamma voltage Vgma0+($\Delta$V)/2.

During the touch driving period TP, in the modulation gamma voltage Vgma_mod, which is the gamma voltage Vgma, the voltage level of each low-level signal section can vary within the low-level gamma voltage variation range.

Here, the low-level gamma voltage variation range can be less than the reference gamma voltage Vgma0 and can be larger than or equal to the minimum gamma voltage Vgma0−($\Delta$V)/2.

For example, referring to FIGS. 13 and 15, during the touch driving period TP, in the modulation touch electrode driving signal Vte_mod, which is the touch electrode driving signal Vte, the voltage level of each high-level signal section can change within the high-level touch electrode driving voltage variation range.

Here, the high-level touch electrode driving voltage variation range can exceed the reference touch electrode driving voltage Vte0 and can be less than or equal to the maximum touch electrode driving voltage Vte0+($\Delta$V)/2.

During the touch driving period TP, in the modulation touch electrode driving signal Vte_mod, which is the touch electrode driving signal Vte, the voltage level of each low-level signal section can change within the low-level touch electrode driving voltage variation range.

Here, the low-level touch electrode driving voltage range can be less than the reference touch electrode driving voltage Vte0 and can be larger than or equal to the minimum touch electrode driving variation voltage Vte0−($\Delta$V)/2.

Referring to FIGS. 13 and 15, when signal distortion occurs in the first power signal Vdd or the second power signal Vss during the touch driving period TP, the same signal distortion can occur in the modulation driving signal Vdrv_mod, which is the driving signal Vdrv during the touch driving period TP, by the signal conversion processing of the signal conversion circuit 1200. In other words, the same type of signal distortion occurs in the first power signal Vdd or the second power signal Vss during the touch driving period TP can be uniformly applied to the other driving signals Vdrv during the touch driving period TP, since these signals are generated based on the first power signal Vdd or the second power signal Vss.

As the signal distortion (a phenomenon in which the high-level voltage and the low-level voltage are not constant) is intentionally created so that it is the same as the signal distortion (a phenomenon in which the high-level voltage and the low-level voltage are not constant) in the first power signal Vdd or the second power signal Vss by the signal conversion processing even in the modulation driving signal Vdrv_mod, no signal difference is made between the first and second power signals Vdd and Vss and the driving signal Vdrv during the touch driving period TP, thereby preventing a decrease in touch sensitivity and distortion of the display screen. In other words, the modulation driving signals Vdrv_mod can have intentionally have distortions added to them, in order to effectively match any distortions in the first power signal Vdd or the second power signal. Thus, any differences in signals can be prevented, touch sensing accuracy can be improved, and image quality can be improved.

During the touch driving period TP, the voltage variation range of the high-level signal section in the driving signal Vdrv (e.g., the high-level voltage variation magnitude due to the signal distortion) can correspond to the voltage variation range of the high-level signal section in the first power signal Vdd or the second power signal Vss (e.g., the high-level voltage variation magnitude due to the signal distortion).

The voltage variation range of the high-level signal section in the first power signal Vdd can be the first high-level voltage variation range, and the voltage variation range of the high-level signal section in the second power signal Vss can be the second high-level voltage variation range.

For example, the voltage variation range of the high-level signal section in the driving signal Vdrv can include a first high-level gate voltage variation range, a second high-level gate voltage variation range, a high-level gamma voltage variation range, and a high-level touch electrode driving voltage variation range.

During the touch driving period TP, the voltage variation range of the low-level signal section in the driving signal Vdrv (e.g., the low-level voltage variation magnitude due to the signal distortion) can correspond to the voltage variation range of the low-level signal section in the first power signal Vdd or the second power signal Vss (e.g., the low-level voltage variation magnitude due to the signal distortion).

The voltage variation range of the low-level signal section in the first power signal Vdd can be the first low-level voltage variation range, and the voltage variation range of the low-level signal section in the second power signal Vss can be the second low-level voltage variation range.

For example, the voltage variation range of the low-level signal section in the driving signal Vdrv can include a first low-level gate voltage variation range, a second low-level gate voltage variation range, a low-level gamma voltage variation range, and a low-level touch electrode driving voltage variation range.

Referring to FIGS. 12 to 15, during the touch driving period TP, the maximum voltage (e.g., the first maximum high-level voltage) of each high-level signal section included in the first modulation power signal Vdd_mod, which is the first power signal Vdd, can be a value (Vdd0+($\Delta$V)/2) obtained by adding half of the specific amplitude $\Delta$V from the first reference power voltage Vdd0. Here, the specific amplitude $\Delta$V can be the amplitude $\Delta$V of the touch driving signal Vtds.

Referring to FIGS. 12 to 15, during the touch driving period TP, the minimum voltage (e.g., the first minimum low-level voltage) of each low-level signal section included in the first modulation power signal Vdd_mod, which is the first power signal Vdd, can be a value Vdd0−($\Delta$V)/2 obtained by subtracting half of the specific amplitude $\Delta$V from the first reference power voltage Vdd0. Here, the specific amplitude $\Delta$V can be the amplitude $\Delta$V of the touch driving signal Vtds.

Referring to FIGS. 12 to 15, during the touch driving period TP, the maximum voltage (e.g., the second maximum high-level voltage) of each high-level signal section included in the second modulation power signal Vss_mod, which is the second power signal Vss, can be a value Vss0+($\Delta$V)/2 obtained by adding half of the specific amplitude $\Delta$V to the second reference power voltage Vss0. Here, the specific amplitude $\Delta$V can be the amplitude $\Delta$V of the touch driving signal Vtds.

Referring to FIGS. 12 to 15, during the touch driving period TP, the minimum voltage (e.g., the second minimum low-level voltage) of each low-level signal section included in the second modulation power signal Vss_mod, which is the second power signal Vss, can be a value Vss0−($\Delta$V)/2 obtained by subtracting half of the specific amplitude $\Delta$V from the second reference power voltage Vss0. Here, the specific amplitude $\Delta$V can be the amplitude $\Delta$V of the touch driving signal Vtds.

Referring to FIGS. 12 to 15, the driving signal Vdrv can alternately include a high-level signal section and a low-level signal section.

Referring to FIGS. 12 to 15, the voltage pattern in each high-level signal section included in the driving signal Vdrv can correspond to the voltage pattern in each high-level signal section included in the first modulation power signal Vdd_mod or the second modulation power signal Vss_mod.

As illustrated in FIGS. 12 and 14, the voltage pattern in each high-level signal section included in the driving signal Vdrv can be a constant voltage maintaining pattern, and the voltage pattern in each high-level signal section included in the first modulation power signal Vdd_mod or the second modulation power signal Vss_mod can be a constant voltage maintaining pattern.

As illustrated in FIGS. 13 and 15, the voltage pattern in each high-level signal section included in the driving signal Vdrv can be a voltage variation pattern, and the voltage pattern in each high-level signal section included in the first modulation power signal Vdd_mod or the second modulation power signal Vss_mod can be a voltage variation pattern.

Accordingly, the voltage variation pattern in each high-level signal section included in the driving signal Vdrv can correspond to the voltage variation pattern in each high-level signal section included in the first modulation power signal Vdd_mod or the second modulation power signal Vss_mod.

For example, the voltage variation pattern in each high-level signal section included in the driving signal Vdrv can include a pattern in which the voltage drops, a pattern in which the voltage rises, a pattern in which the voltage drops and rises are mixed, or the like.

The voltage variation pattern in each high-level signal section included in the first modulation power signal Vdd_mod or the second modulation power signal Vss_mod can include a pattern in which the voltage drops, a pattern in which the voltage rises, a pattern in which the voltage drops and rises are mixed, or the like.

Referring to FIGS. 12 to 15, the voltage pattern in each low-level signal section included in the driving signal Vdrv can correspond to the voltage pattern in each low-level signal section included in the first modulation power signal Vdd_mod or the second modulation power signal Vss_mod.

As illustrated in FIGS. 12 and 14, the voltage pattern in each low-level signal section included in the driving signal Vdrv can be a constant voltage maintaining pattern, and the voltage pattern in each low-level signal section included in the first modulation power signal Vdd_mod or the second modulation power signal Vss_mod can be a constant voltage maintaining pattern.

As illustrated in FIGS. 13 and 15, the voltage pattern in each low-level signal section included in the driving signal Vdrv can be a voltage variation pattern, and the voltage pattern in each low-level signal section included in the first modulation power signal Vdd_mod or the second modulation power signal Vss_mod can be a voltage variation pattern.

Accordingly, the voltage variation pattern in each low-level signal section included in the driving signal Vdrv can correspond to the voltage variation pattern in each low-level signal section included in the first modulation power signal Vdd_mod or the second modulation power signal Vss_mod.

For example, the voltage variation pattern in each low-level signal section included in the driving signal Vdrv can include a pattern in which the voltage drops, a pattern in which the voltage rises, a pattern in which the voltage drops and rises are mixed, or the like.

The voltage variation pattern in each low-level signal section included in the first modulation power signal Vdd_mod or the second modulation power signal Vss_mod can include a pattern in which the voltage rises, a pattern in which the voltage drops, a pattern in which the voltage rises and drops are mixed, or the like.

For example, referring to FIGS. 13 and 15, when each high-level signal section included in the first modulation power signal Vdd_mod or the second modulation power signal Vss_mod has a voltage variation pattern in which the voltage level drops during the touch driving period TP, each high-level signal section included in the driving signal Vdrv can have a voltage variation pattern in which the voltage level drops.

For example, referring to FIGS. 13 and 15, when each low-level signal section included in the first modulation power signal Vdd_mod or the second modulation power signal Vss_mod has a voltage variation pattern in which a voltage level rises, each high-level signal section included in the driving signal Vdrv can have a voltage variation pattern in which a voltage level rises as well. For example, in this way, the modulation power signals can have correspondence with the driving signals Vdrv, in order to reduce noise and avoid unwanted parasitic capacitance.

For example, the signal conversion circuit 1200 can be disposed on the printed circuit board PCB. The power supply circuit 1210 can be disposed on the printed circuit board PCB and can include a level shifter. The power supply circuit 1210 can be composed of one electronic component or can include several electronic components. The power supply circuit 1210 can be configured separately from the touch power integrated circuit TPIC and the power management integrated circuit PMIC or can be included in one of the touch power integrated circuit TPIC and the power management integrated circuit PMIC.

Figure 16:
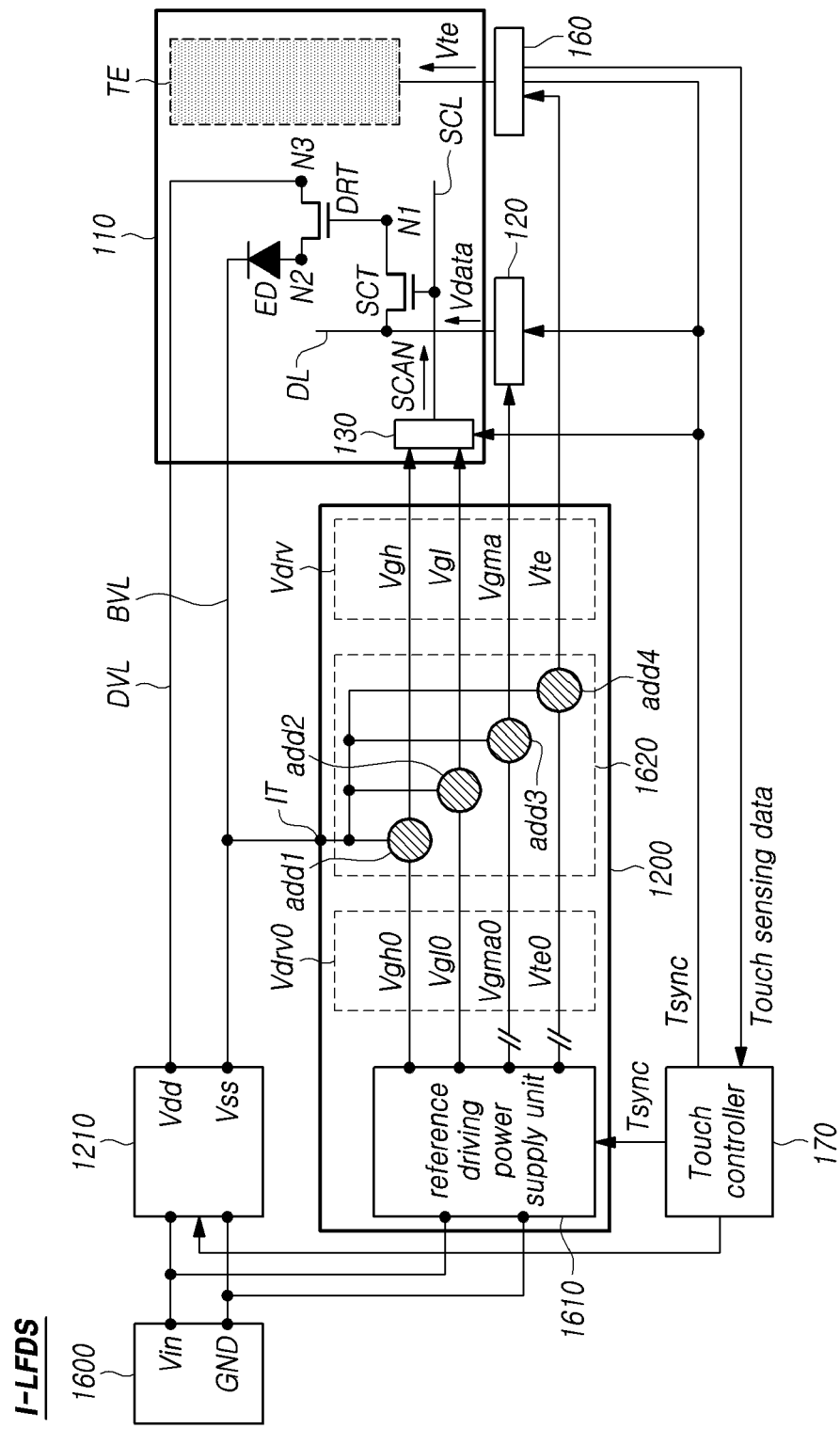
FIG. 16 illustrates, in more detail, a current-based load-free driving system of a touch display device according to embodiments of the disclosure.

FIG. 16 illustrates, in more detail, a current-based load-free driving system I-LFDS of a touch display device 100 according to embodiments of the disclosure.

Referring to FIG. 16, the display panel 110 of the touch display device 100 according to embodiments of the disclosure can include a light emitting element ED including a first electrode E1, a second electrode E2, and a light emitting layer EL between the first electrode E1 and the second electrode E2, a driving transistor DRT for driving the light emitting element ED, and a scanning transistor SCT that is turned on or off by the scanning gate signal SCAN.

Referring to FIG. 16, the display panel 110 of the touch display device 100 according to embodiments of the disclosure can include a first power line DVL electrically connected to a third node N3 which is the drain node or source node of the driving transistor DRT and to which a first power signal Vdd is applied, and a second power line BVL electrically connected to a second electrode E2 of the light emitting device ED and to which a second power signal Vss is applied.

Referring to FIG. 16, the touch display device 100 according to embodiments of the disclosure can include a current-based load-free driving system (I-LFDS).

Referring to FIG. 16, the current-based load-free driving system I-LFDS according to embodiments of the disclosure can include a power supply circuit 1210, a signal conversion circuit 1200, a basic power input circuit 1600, and a touch controller 170.

Referring to FIG. 16, the current-based load-free driving system I-LFDS according to embodiments of the disclosure can further include a data driving circuit 120, a gate driving circuit 130, and a touch driving circuit 160.

Referring to FIG. 16, the touch controller 170 can provide a touch synchronization signal Tsync to the signal conversion circuit 1200 and the power supply circuit 1210, and can further provide the touch synchronization signal Tsync to the driving circuit including the data driving circuit 120, the gate driving circuit 130, and the touch driving circuit 160.

During the touch driving period TP, the touch driving circuit 160 can generate touch sensing data by driving and sensing at least one of a plurality of touch electrodes using the touch electrode driving signal Vte, and can transmit the generated touch sensing data to the touch controller 170.

The touch controller 170 can receive touch sensing data from the touch driving circuit 160 and determine whether there is a touch and/or touch coordinates based on the touch sensing data.

Referring to FIG. 16, the basic power input circuit 1600 can supply the input power Vin and the ground power GND, which are basic for generating various signals, to the power supply circuit 1210 and the signal conversion circuit 1200.

Referring to FIG. 16, the power supply circuit 1210 can identify whether the driving period is the display driving period DP or the touch driving period TP, based on the touch synchronization signal Tsync.

Referring to FIG. 16, the power supply circuit 1210 can supply the first power signal Vdd and the second power signal Vss corresponding to one of the display driving period DP and the touch driving period TP to the display panel 110, based on the touch synchronization signal Tsync.

The first power signal Vdd and the second power signal Vss corresponding to the display driving period DP can be of a type having a constant voltage level (e.g., a constant DC voltage).

The first power signal Vdd and the second power signal Vss corresponding to the touch driving period TP can be of a type in which a voltage level swings (e.g., an AC voltage).

The first power signal Vdd output from the power supply circuit 1210 can be supplied to the first power line DVL disposed on the display panel 110. The second power signal Vss output from the power supply circuit 1210 can be supplied to the second power line BVL disposed on the display panel 110.

At least one of the first power signal Vdd and the second power signal Vss output from the power supply circuit 1210 can be supplied to the signal conversion circuit 1200. For example, in FIG. 16, the second power signal Vss having a lower voltage level than the first power signal Vdd of the first power signal Vdd and the second power signal Vss output from the power supply circuit 1210 can be supplied to the signal conversion circuit 1200.

Referring to FIG. 16, the signal conversion circuit 1200 can supply the driving signal Vdrv corresponding to one of the display driving period DP and the touch driving period TP to the display panel 110 or the driving circuit connected to the display panel 110, based on the touch synchronization signal Tsync or based on the power signal input through the input terminal IT of the first power signal Vdd and the second power signal Vss. Hereinafter, for convenience of description, it is assumed that the second power signal Vss is input to the signal conversion circuit 1200.

Referring to FIG. 16, the driving circuit connected to the display panel 110 can include a data driving circuit 120 and a touch driving circuit 160.

Referring to FIG. 16, the driving circuit connected to the display panel 110 can further include a gate driving circuit 130. The gate driving circuit 130 can be positioned outside the display panel 110, or can be a circuit embedded in the display panel 110.

Referring to FIG. 16, for example, the driving signal Vdrv can include a first gate voltage Vgh, a second gate voltage Vgl, a gamma voltage Vgma, and a touch electrode driving signal Vte.

Referring to FIG. 16, the signal conversion circuit 1200 can output a driving signal Vdrv including a first gate voltage Vgh and a second gate voltage Vgl to the gate driving circuit 130.

The first gate voltage Vgh and the second gate voltage Vgl can have a signal waveform corresponding to one of the first power signal Vdd and the second power signal Vss. For example, any variations on the first power signal Vdd and the second power signal Vss can be equally applied to the first gate voltage Vgh and the second gate voltage Vgl, but embodiments are not limited thereto.

The gate driving circuit 130 can be configured to generate the scanning gate signal SCAN based on the first gate voltage Vgh and/or the second gate voltage Vgl and output the generated scanning gate signal SCAN to the scanning gate line SCL.

Referring to FIG. 16, the signal conversion circuit 1200 can output a driving signal Vdrv including a gamma voltage Vgma to the data driving circuit 120.

The gamma voltage Vgma can have a signal waveform corresponding to one of the first power signal Vdd and the second power signal Vss.

The data driving circuit 120 can generate a data signal Vdata in the form of an analog voltage based on the gamma voltage Vgma and output the data signal Vdata to the data line DL.

Referring to FIG. 16, the signal conversion circuit 1200 can output a driving signal Vdrv including a touch electrode driving signal Vte to the touch driving circuit 160. Alternatively, in the situation of the touch electrode driving signal Vte, the touch controller 170 can output the reference touch electrode driving voltage Vte0 or the modulation touch electrode driving signal Vte_mod, as the touch electrode driving signal, to the touch driving circuit 160 Vte according to the driving mode (e.g., display driving mode or touch driving mode).

The touch electrode driving signal Vte can have a signal waveform corresponding to one of the first power signal Vdd and the second power signal Vss. For example, the touch electrode driving signal Vte can vary similar to or the same as the first power signal Vdd or the second power signal Vss.

The touch driving circuit 160 can supply the touch electrode driving signal Vte to the touch electrode TE.

During the display driving period DP, each of the first gate voltage Vgh, the second gate voltage Vgl, the gamma voltage Vgma, and the touch electrode driving signal Vte can be of a type (DC voltage type) having a constant voltage level.

During the touch driving period TP, each of the first gate voltage Vgh, the second gate voltage Vgl, the gamma voltage Vgma, and the touch electrode driving signal Vte can be of a type in which a voltage level swings (e.g., AC voltage).

Referring to FIG. 16, the signal conversion circuit 1200 can receive the second power signal Vss output from the power supply circuit 1210 through the input terminal IT.

Referring to FIG. 16, when the current driving period is identified as the display driving period DP based on the touch synchronization signal Tsync, or when the second power signal Vss is of a DC voltage type, the signal conversion circuit 1200 can output the first gate voltage Vgh, the second gate voltage Vgl, the gamma voltage Vgma, and the touch electrode driving signal Vte included in the driving signal Vdrv as the DC voltage type.

Referring to FIG. 16, when the current driving period is identified as the touch driving period TP based on the touch synchronization signal Tsync, or when the second power signal Vss is of a AC voltage type, the signal conversion circuit 1200 can output the first gate voltage Vgh, the second gate voltage Vgl, the gamma voltage Vgma, and the touch electrode driving signal Vte included in the driving signal Vdrv as the AC voltage type.

Referring to FIG. 16, the signal waveforms of the first power signal Vdd and the second power signal Vss can vary according to the driving timing of the light emitting element ED.

When the driving timing of the light emitting element ED is the active period, each of the first power signal Vdd and the second power signal Vss can have a signal waveform having a constant voltage level (e.g., a signal waveform of a DC voltage type). Here, when the driving timing of the light emitting element ED is the active period, it can mean the display driving period DP.

When the driving timing of the light emitting element ED is the blank period, each of the first power signal Vdd and the second power signal Vss can have a signal waveform in which a voltage level varies over time (e.g., an AC voltage type signal waveform). Here, when the driving timing of the light emitting element ED is the blank period, it can mean the touch driving period TP.

Referring to FIG. 16, the scanning gate signal SCAN can include a section having a first gate voltage Vgh and/or a section having a second gate voltage Vgl.

The signal waveform of the first gate voltage Vgh and the second gate voltage Vgl (e.g., the signal waveform of the DC voltage type or the signal waveform of the AC voltage type) can correspond to the signal waveform of one of the first power signal Vdd and the second power signal Vss (e.g., the signal waveform of the DC voltage type or the signal waveform of the AC voltage type).

That the signal waveform of the first gate voltage Vgh and the second gate voltage Vgl corresponds to the signal waveform of one of the first power signal Vdd and the second power signal Vss can mean that the frequency, amplitude, and/or voltage variation type (e.g., voltage variation shape) between the first gate voltage Vgh and the second gate voltage Vgl and one of the first power signal Vdd and the second power signal Vss is the same, or that there is only a slight difference within an allowable error range (e.g., ±1%, ±2%, ±3%, ±5%, etc.) but is substantially the same. In other words, signal waveforms of the first gate voltage Vgh, the second gate voltage Vgl and at least one of the first power signal Vdd and the second power signal Vss can substantially correspond to each other.

The signal waveform of the gamma voltage Vgma (e.g., the signal waveform of the DC voltage type or the signal waveform of the AC voltage type) can correspond to the signal waveform of one of the first power signal Vdd and the second power signal Vss (e.g., the signal waveform of the DC voltage type or the signal waveform of the AC voltage type).

That the signal waveform of the gamma voltage Vgma corresponds to the signal waveform of one of the first power signal Vdd and the second power signal Vss can mean that the frequency, amplitude, or voltage variation type (e.g., voltage variation shape) between the gamma voltage Vgma and one of the first power signal Vdd and the second power signal Vss is the same, or there is only a slight difference within an allowable error range (e.g., ±1%, ±2%, ±3%, ±5%, etc.) but is substantially the same. In other words, signal waveforms of the gamma voltage Vgma and at least one of the first power signal Vdd and the second power signal Vss can substantially correspond to each other.

The signal waveform of the touch electrode driving signal Vte (e.g., the signal waveform of the DC voltage type or the signal waveform of the AC voltage type) can correspond to the signal waveform of one of the first power signal Vdd and the second power signal Vss (e.g., the signal waveform of the DC voltage type or the signal waveform of the AC voltage type).

That the signal waveform of the touch electrode driving signal Vte corresponds to the signal waveform of one of the first power signal Vdd and the second power signal Vss can mean that the frequency, amplitude, or voltage variation type (e.g., voltage variation shape) between the touch electrode driving signal Vte and one of the first power signal Vdd and the second power signal Vss is the same, or there is only a slight difference within an allowable error range (e.g., ±1%, ±2%, ±3%, ±5%, etc.) but is substantially the same. In other words, signal waveforms of the touch electrode driving signal Vte and at least one of the first power signal Vdd and the second power signal Vss can substantially correspond to each other.

Referring to FIG. 16, the signal conversion circuit 1200 according to embodiments of the disclosure can include an input terminal IT to receive one of a first power signal Vdd and a second power signal Vss applied to a plurality of subpixels SP disposed on the display panel 110, a reference driving power supply unit 1610 to output a reference driving voltage Vdrv0 having a constant voltage level, and an adder circuit 1620 configured to output a driving signal Vdrv.

The input terminal IT can be electrically connected to one of two output nodes of the power supply circuit 1210. For example, as illustrated in FIG. 16, the input terminal IT can be electrically connected to an output node to which the second power signal Vss is output of the two output nodes of the power supply circuit 1210.

Referring to FIG. 16, the signal waveform of the power signal Vss input to the input terminal IT can differ depending on the driving mode. The driving mode can be a display driving mode or a touch driving mode.

Referring to FIG. 16, the adder circuit 1620 can be configured to output a driving signal Vdrv having a signal waveform corresponding to a power signal input to the input terminal IT with respect to the voltage level of the reference driving voltage Vdrv0.

The adder circuit 1620 can be configured to receive, as a power signal input to the input terminal IT, one of the first power signal Vdd and the second power signal Vss as a first input signal, receive a reference driving voltage Vdrv0 as a second input signal, and output a driving signal Vdrv as an output signal.

Referring to FIG. 16, the adder circuit 1620 can include at least one of a first adder add1, a second adder add2, a third adder add3, and a fourth adder add4.

The first adder add1 can receive the second power signal Vss input to the input terminal IT and the first reference gate voltage Vgh0 included in the reference driving voltage Vdr0 as two input signals and output the first gate signal Vgh having a different signal waveform depending on the driving mode.

During the touch driving period TP, the first adder add1 can output the first modulation gate voltage Vgh_mod having the same signal waveform of the second power signal Vss input to the input terminal IT as the first gate voltage Vgh with respect to the voltage level of the first reference gate voltage Vgh0.

The second adder add2 can receive the second power signal Vss input to the input terminal IT and the second reference gate voltage Vgl0 included in the reference driving voltage Vdr0 as two input signals and output the second gate signal Vgl having a different signal waveform depending on the driving mode.

During the touch driving period TP, the second adder add2 can output the second modulation gate voltage Vgl_mod having the same signal waveform of the second power signal Vss input to the input terminal IT as the second gate voltage Vgl based on the second reference gate voltage Vgl0.

The third adder add3 can receive the second power signal Vss input to the input terminal IT and the reference gamma voltage Vgma0 included in the reference driving voltage Vdr0 as two input signals and output the gamma voltage Vgma having a different signal waveform depending on the driving mode.

During the touch driving period TP, the third adder add3 can output the modulation gamma voltage Vgma_mod having the same signal waveform of the second power signal Vss input to the input terminal IT as the gamma voltage Vgma with respect to the voltage level of the reference gamma voltage Vgma0.

The fourth adder add4 can receive the second power signal Vss input to the input terminal IT and the reference touch electrode driving voltage Vte0 included in the reference driving voltage Vdr0 as two input signals and output the touch electrode driving signal Vte having a different signal waveform depending on the driving mode.

During the touch driving period TP, the fourth adder add4 can output the modulation touch electrode driving signal Vte_mod having the same signal waveform of the second power signal Vss input to the input terminal IT as the touch electrode driving signal Vte with respect to the voltage level of the reference touch electrode driving voltage Vte0.

The display panel 110 according to embodiments of the disclosure can include a plurality of subpixels SP, a plurality of data lines DL connected to the plurality of subpixels SP, a plurality of scanning gate lines SCL connected to the plurality of subpixels SP, a first power line DVL for supplying a first power signal Vdd to the plurality of subpixels SP, a second power line BVL for supplying a second power signal Vss to the plurality of subpixels SP, and a plurality of touch electrodes TE.

While the touch electrode driving signal Vte, the voltage level of which varies, is supplied to at least one of the plurality of touch electrodes TE, in other words, during the touch driving period TP, the voltages of the first power signal Vdd and the second power signal Vss can vary.

The scanning gate signal SCAN supplied to at least one of the plurality of scanning gate lines SCL can have the same voltage variation pattern as the voltage variation pattern of the first power signal Vdd or the second power signal Vss, or the data signal Vdata supplied to at least one of the plurality of data lines DL can have the same voltage variation pattern as the voltage variation pattern of the first power signal Vdd or the second power signal Vss. In other words, all the signals can have a same or substantially same voltage variation pattern, in order to reduce interference, reduce noise and reduce parasitic capacitance, which can prevent image defects from occurring and improve touch sensing accuracy.

The first power signal Vdd can be supplied to the driving transistor DRT included in each of the plurality of subpixels SP, and the second power signal Vss can be supplied to the light emitting element ED included in each of the plurality of subpixels SP.

In order to drive the plurality of subpixels SP, respective signal waveforms of the first power signal Vdd and the second power signal Vss supplied to the plurality of subpixels SP can correspond to each other.

The touch electrode driving signal Vte can have the same voltage variation pattern as the voltage variation pattern of the first power signal Vdd or the second power signal Vss.

During the touch driving period, the data signal Vdata, the scanning gate signal SCAN, and the touch electrode driving signal Vte can have the same or substantially the same voltage variation pattern as the voltage variation pattern of the first power signal Vdd or the second power signal Vss.

For example, during the touch driving period, the first power signal Vdd or the second power signal Vss can have a voltage variation pattern in which a voltage drops in each high-level signal section and a voltage rises in each low-level signal section.

During the touch driving period, according to the voltage variation pattern of the first power signal Vdd or the second power signal Vss, the data signal Vdata, the scanning gate signal SCAN, and the touch electrode driving signal Vte can have a voltage variation pattern in which a voltage drops in each high-level signal section and a voltage rises in each low-level signal section.

Figure 17:
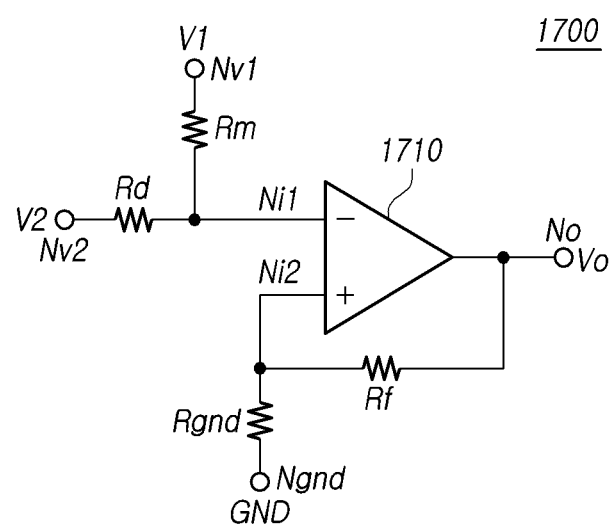
FIG. 17 is a circuit for implementing first to fourth adders included in an adder circuit of a signal conversion circuit in a current-based load-free driving system of a touch display device according to embodiments of the disclosure.

FIG. 17 is a circuit for implementing each of first to fourth adders add1, add2, add3, and add4 included in an adder circuit 1620 of a signal conversion circuit 1200 in a current-based load-free driving system of a touch display device 100 according to embodiments of the disclosure.

Referring to FIG. 17, each of the first to fourth adders add1, add2, add3, and add4 included in the adder circuit 1620 of the signal conversion circuit 1200 can include an analog adder 1700.

Referring to FIG. 17, the analog adder 1700 can receive two analog input signals V1 and V2 and output one analog output signal Vo, and the one analog output signal Vo can be a sum of the two analog input signals V1 and V2 or a sum obtained by applying a specific weight.

Referring to FIG. 17, the analog adder 1700 can include an operational amplifier 1710, a driving resistor Rd, a modulation resistor Rm, and the like.

Referring to FIG. 17, the analog adder 1700 can include a first input end Nv1 to which a first input signal V1 is input, a second input end Nv2 to which a second input signal V2 is input, an output end No from which an output signal Vo is output, and a ground end Ngnd to which a ground voltage GND is applied.

Referring to FIG. 17, the operational amplifier 1710 can include a first input node Ni1, a second input node Ni2, and an output node No. The first input node Ni1 of the operational amplifier 1710 can be a non-inverting input node, and the second input node Ni2 of the operational amplifier 1710 can be an inverting input node. The output node No of the operational amplifier 1710 can be the same as the output end No of the analog adder 1700.

Referring to FIG. 17, a feedback resistor Rf can be connected between the second input node Ni2 and the output node No of the operational amplifier 1710, and a ground resistor Rgnd can also be connected between the second input node Ni2 and the ground node Ngnd of the operational amplifier 1710. Here, the ground resistor Rgnd can have the same resistance value as the feedback resistor Rf.

Referring to FIG. 17, a modulation resistor Rm can be connected between the first input end Nv1 of the analog adder 1700 and the first input node Ni1 of the operational amplifier 1710, and a driving resistor Rd can be connected between the second input end Nv2 of the analog adder 1700 and the first input node Ni1 of the operational amplifier 1710.

Referring to FIG. 17, the first input end Nv1 can be the same as the input terminal IT of the signal conversion circuit 1200 or can be electrically connected to the input terminal IT of the signal conversion circuit 1200.

The first input signal V1 input to the first input end Nv1 can be one of the first power signal Vdd and the second power signal Vss. According to the example of FIG. 16, the first input signal V1 input to the first input end Nv1 can be a second power signal Vss.

Referring to FIG. 17, the second input signal V2 input to the second input end Nv2 can be a reference driving voltage Vdrv0, and the output signal Vo output from the output end No can be a driving signal Vdrv.

The output signal Vo of the analog adder 1700 can be expressed as Equation 1 below.

$$Vo = 2 \times \frac{Rd \times V1 + Rm \times V2}{Rd + Rm} \quad \text{[Equation 1]}$$

For example, when the driving resistor Rd and the modulation resistor Rm are the same, the output signal Vo becomes the sum V1+V2 of the first input signal V1 and the second input signal V2.

When the first input signal V1 is the second power signal Vss and the second input signal V2 is the reference driving voltage Vdrv0, the output signal Vo becomes the sum Vss+Vdrv0 of the second power signal Vss and the reference driving voltage Vdrv0.

In the touch driving period TP, the output signal Vo becomes the sum Vss_mod+Vdrv0 of the second modulation power signal Vss_mod, which is the second power signal Vss, and the reference driving voltage Vdrv0. In other words, in the touch driving period TP, the output signal Vo can be a modulated signal obtained by modulating the reference driving voltage Vdrv0 to the amplitude of the second modulation power signal Vss_mod.

In the touch driving period TP, the center value (center voltage) of the output signal Vo can be set to be a target reference driving voltage Vdrv0.

Figure 18:
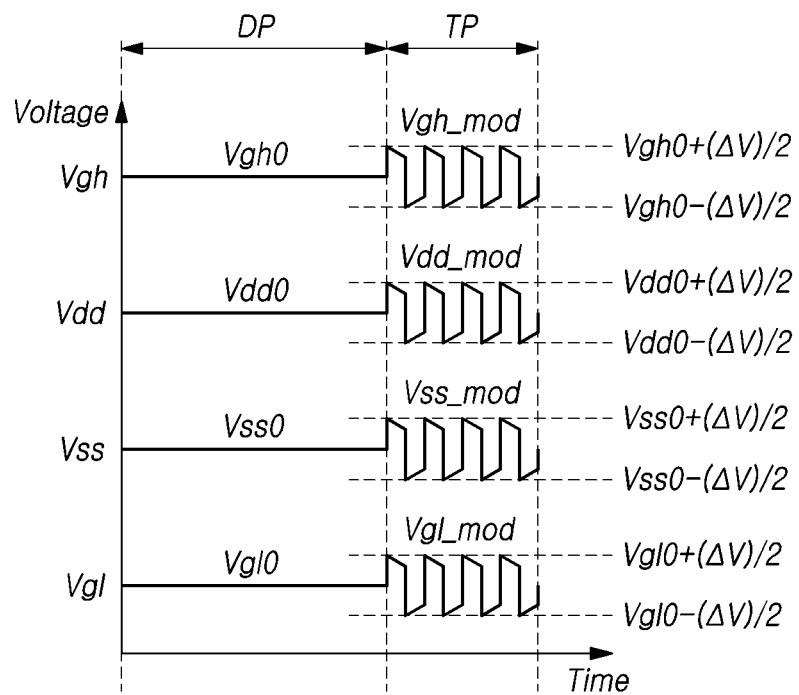
FIG. 18 illustrates a first power signal, a second power signal, a first gate voltage, and a second gate voltage according to current-based load-free driving according to embodiments of the disclosure.

FIG. 18 illustrates a first power signal Vdd, a second power signal Vss, a first gate voltage Vgh, and a second gate voltage Vgl according to current-based load-free driving according to embodiments of the disclosure.

In FIG. 18, the respective signal waveforms of the first power signal Vdd, the second power signal Vss, the first gate voltage Vgh, and the second gate voltage Vgl is the same as those in FIGS. 13 and 15.

However, what is illustrated in FIG. 18 is a voltage magnitude relationship between the first power signal Vdd, the second power signal Vss, the first gate voltage Vgh, and the second gate voltage Vgl.

Referring to FIG. 18, during the display driving period DP, among the four voltage signals Vdd, Vss, Vgh, and Vgl, the first reference gate voltage Vgh0 corresponding to the first gate voltage Vgh can be the highest, the second reference gate voltage Vgl0 corresponding to the second gate voltage Vgl can be the lowest, the first reference power voltage Vdd0 corresponding to the first power signal Vdd can be the second highest, and the second reference power voltage Vss0 corresponding to the second power signal Vss can be the second lowest (e.g., Vgh0>Vdd0>Vss0>Vgl0).

Referring to FIG. 18, during the touch driving period TP, among the four voltage signals Vdd, Vss, Vgh, and Vgl, the first modulation gate voltage Vgh_mod corresponding to the first gate voltage Vgh can be the highest, the second modulation gate voltage Vgl_mod corresponding to the second gate voltage Vgl can be the lowest, the first modulation power signal Vdd_mod corresponding to the first power signal Vdd can be the second highest, and the second modulation power signal Vss_mod corresponding to the second power signal Vss can be the second lowest (e.g., Vgh_mod>Vdd_mod>Vss_mod>Vgl_mod).

For example, the first minimum low-level voltage Vgh0−($\Delta$V)/2 of the first modulation gate voltage Vgh_mod can be higher than the maximum high-level voltage Vdd0+($\Delta$V)/2 of the first modulation power signal Vdd_mod.

For example, the minimum low-level voltage Vdd0−($\Delta$V)/2 of the first modulation power signal Vdd_mod can be higher than the maximum high-level voltage Vss0+($\Delta$V)/2 of the second modulation power signal Vss_mod.

For example, the minimum low-level voltage Vss0−($\Delta$V)/2 of the second modulation power signal Vss_mod can be higher than the maximum high-level voltage Vgl0+($\Delta$V)/2 of the second modulation gate voltage Vgl_mod. Alternatively, the minimum low-level voltage Vss0−($\Delta$V)/2 of the second modulation power signal Vss_mod can correspond to the maximum high-level voltage Vgl0+($\Delta$V)/2 of the second modulation gate voltage Vgl_mod or can be lower than the maximum high-level voltage Vgl0+($\Delta$V)/2 of the second modulation gate voltage Vgl_mod.

Figure 19:
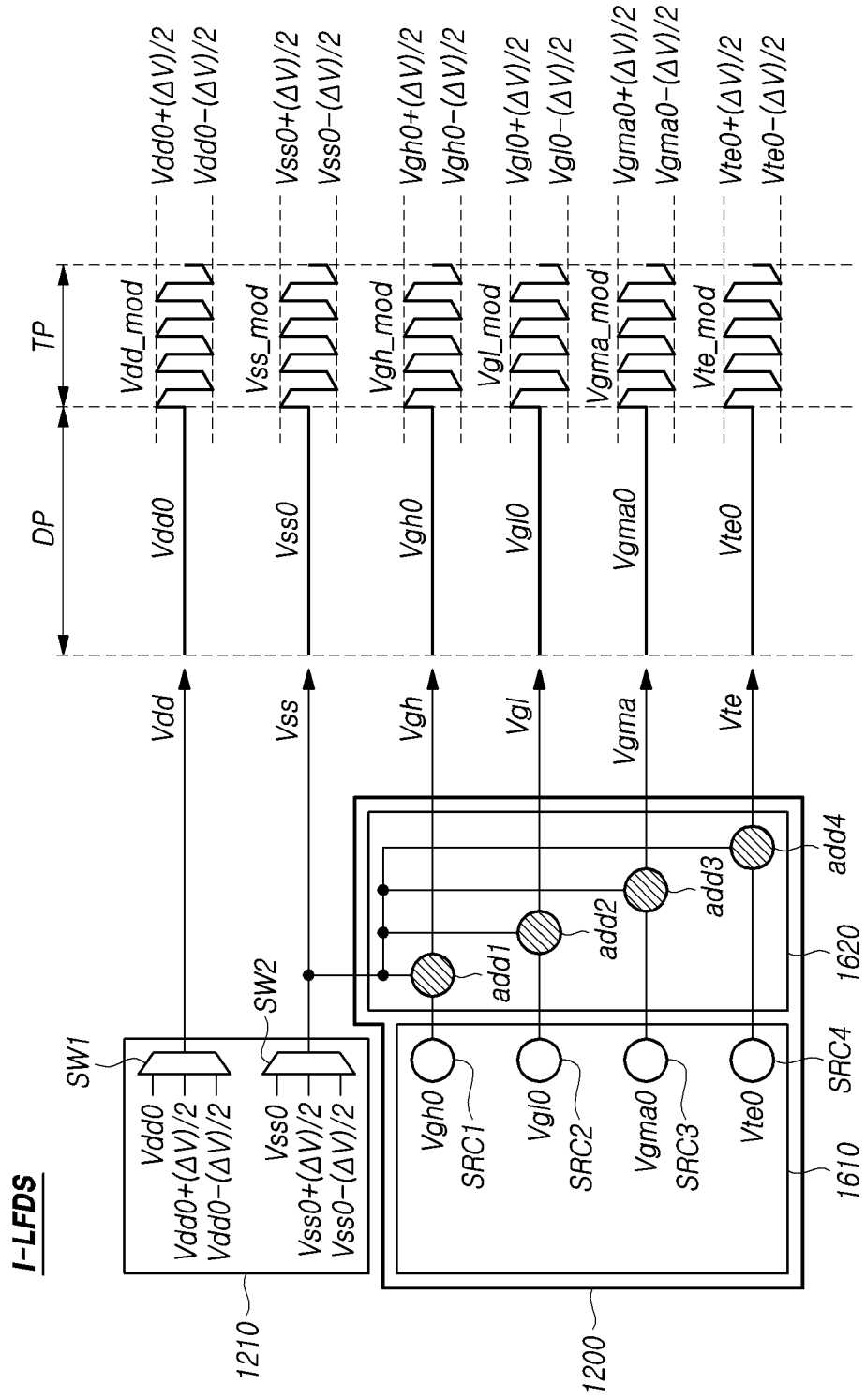
FIG. 19 illustrates a current-based load-free driving system including a switch-based power supply circuit in a touch display device according to embodiments of the disclosure.

FIG. 19 illustrates a current-based load-free driving system I-LFDS including a switch-based power supply circuit 1210 in a touch display device 100 according to embodiments of the disclosure.

Referring to FIG. 19, the power supply circuit 1210 can be configured as a switch-based circuit for supplying the first power signal Vdd and the second power signal Vss.

Referring to FIG. 19, the power supply circuit 1210 can include a first power conversion switch SW1 configured to output a first reference power voltage Vdd0 or a first modulation power signal Vdd_mod as a first power signal Vdd, and a second power conversion switch SW2 configured to output a second reference power voltage Vss0 or a second modulation power signal Vss_mod as a second power signal Vss.

Referring to FIG. 19, the first power conversion switch SW1 can be configured to receive a first reference power voltage Vdd0, a first high-level voltage Vdd0+($\Delta$V)/2 higher than the first reference power voltage Vdd0, and a first low-level voltage Vdd0−($\Delta$V)/2 lower than the first reference power voltage Vdd0.

During the display driving period DP, the first power conversion switch SW1 can be configured to select the first reference power voltage Vdd0 and output the first reference power voltage Vdd0 as the first power signal Vdd.

During the touch driving period TP, the first power conversion switch SW1 can be configured to alternately select and output the first high-level voltage Vdd0+($\Delta$V)/2 and the first low-level voltage Vdd0−($\Delta$V)/2.

During the touch driving period TP, as the first high-level voltage Vdd0+($\Delta$V)/2 and the first low-level voltage Vdd0−($\Delta$V)/2 are alternately output by the first power conversion switch SW1, the first modulation power signal Vdd_mod including the high-level signal section and the low-level signal section alternately can be output as the first power signal Vdd.

Referring to FIG. 19, the second power conversion switch SW2 can be configured to receive a second reference power voltage Vss0, a second high-level voltage Vss0+($\Delta$V)/2 higher than the second reference power voltage Vss0, and a second low-level voltage Vss0−($\Delta$V)/2 lower than the second reference power voltage Vss0.

During the display driving period DP, the second power conversion switch SW2 can be configured to select the second reference power voltage Vss0 and output the selected second reference power voltage Vss0 as the second power signal Vss.

During the touch driving period TP, the second power conversion switch SW2 can be configured to alternately select and output the second high-level voltage Vss0+($\Delta$V)/2 and the second low-level voltage Vss0−($\Delta$V)/2.

During the touch driving period TP, as the second high-level voltage Vss0+($\Delta$V)/2 and the second low-level voltage Vss0−($\Delta$V)/2 are alternately output by the second power conversion switch SW2, the second modulation power signal Vss_mod including the high-level signal section and the low-level signal section alternately can be output as the second power signal Vss.

Referring to FIG. 19, the reference driving power supply unit 1610 included in the signal conversion circuit 1200 can include a first power supply unit SRC1 for supplying a first reference gate voltage Vgh0, a second power supply unit SRC2 for supplying a second reference gate voltage Vgl0, a third power supply unit SRC3 for supplying a reference gamma voltage Vgma0, and a fourth power supply unit SRC4 for supplying a reference touch electrode driving voltage Vte0.

Figure 20:
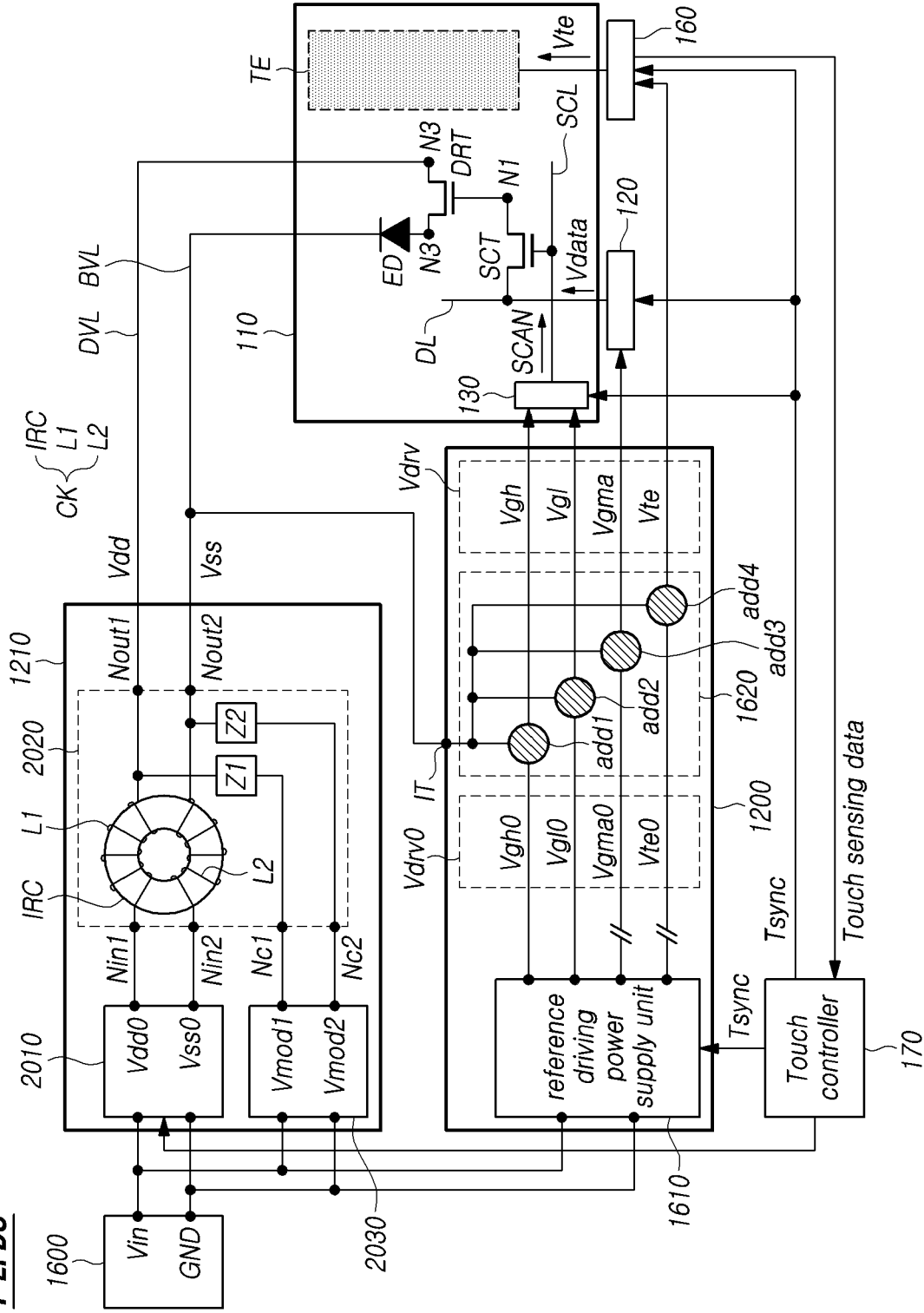
FIG. 20 illustrates a choke included in a power conversion circuit of a choke-based power supply circuit in a touch display device according to embodiments of the disclosure.
Figure 21:
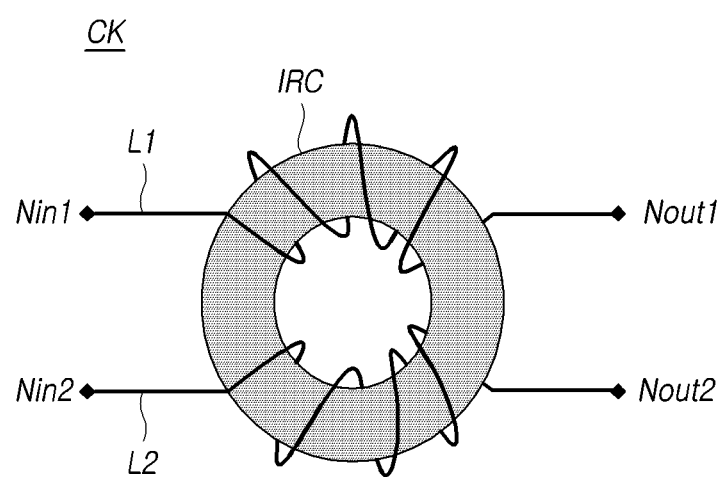
FIG. 21 is an enlarged view illustrating the choke of FIG. 20.

FIG. 20 illustrates a current-based load-free driving system I-LFDS including a choke-based power supply circuit 1210 in a touch display device 100 according to embodiments of the disclosure, and FIG. 21 is an enlarged view of the choke CK of FIG. 20.

The current-based load-free driving system I-LFDS of FIG. 20 is the same as the current-based load-free driving system I-LFDS of FIG. 19 except that the power supply circuit 1210 is a choke-based circuit. Accordingly, the following description focuses primarily on the choke-based power supply circuit 1210.

Referring to FIG. 20, the power supply circuit 1210 can include a reference power supply circuit 2010, a power conversion circuit 2020, and a modulation control circuit 2030.

The reference power supply circuit 2010 can be configured to output the first reference power voltage Vdd0 and the second reference power voltage Vss0.

The power conversion circuit 2020 can be configured to output the first power signal Vdd having a signal waveform corresponding to a signal waveform of a first modulation control signal Vmod1 with respect to a first voltage level of the first reference power voltage Vdd0 or output the second power signal Vss having a signal waveform corresponding to a signal waveform of a second modulation control signal Vmod2 with respect to a second voltage level of the second reference power voltage Vss0.

The modulation control circuit 2030 can be configured to supply the first modulation control signal Vmod1 and the second modulation control signal Vmod2 to the power conversion circuit 2020.

Referring to FIG. 20, the power conversion circuit 2020 can include a first input node Nin1 to which a first reference power voltage Vdd0 is input, a second input node Nin2 to which a second reference power voltage Vss0 is input, a first output node Nout1 from which a first power signal Vdd is output, and a second output node Nout2 from which a second power signal Vss is output.

The power conversion circuit 2020 can further include at least one control node of the first control node Nc1 to which the first modulation control signal Vmod1 is input and the second control node Nc2 to which the second modulation control signal Vmod2 is input.

Referring to FIGS. 20 and 21, the power conversion circuit 2020 can further include a choke CK including a first coil L1 connected between the first input node Non1 and the first output node Non1, and a second coil L2 connected between the second input node Non2 and the second output node Non2. For example, the choke CK can be a common mode choke. Also, according to an example, the first coil L1 and the second coil L2 can be wound around a magnetic core which can induce magnetic fields that oppose changes in current providing a degree of impedance, in order to filter or suppress electromagnetic interference.

Referring to FIG. 20, the power conversion circuit 2020 can be configured to convert the first power signal Vdd at the first output node Nout1 according to the first modulation control signal Vmod1 at the first control node Nc1, or to convert the second power signal Vss at the second output node Nout2 according to the second modulation control signal Vmod2 at the second control node Nc2.

The impedance of the choke CK during the touch driving period TP can be different from the impedance of the choke CK during the display driving period DP.

During the touch driving period TP in which the touch driving signal Vtds is applied to at least one of the plurality of touch electrodes TE, the impedance of the choke CK can have a value significantly larger than the impedance of the choke CK during the display driving period DP in which the touch driving signal Vtds is not applied to the plurality of touch electrodes TE (e.g., due to the changing signal).

Referring to FIGS. 20 and 21, the choke CK can further include a core IRC wound around the first coil L1 and the second coil L2.

In the choke CK, the first coil L1 and the second coil L2 can be wound around the core IRC in opposite directions. For example, the core IRC of the first coil L1 can be wound clockwise, and the core IRC of the second coil L2 can be wound counterclockwise.

Referring to FIGS. 20 and 21, when the current flowing through the first coil L1 and the current flowing through the second coil L2 are in the same direction, a magnetic field is formed in the core IRC in one direction so that the first coil L1 and the second coil L2 have high impedance. Accordingly, it can be difficult for current to flow through the first coil L1 and the second coil L2.

Referring to FIGS. 20 and 21, when the current flowing through the first coil L1 and the current flowing through the second coil L2 are opposite to each other, the magnetic field caused by the current flowing through the first coil L1 and the magnetic field caused by the current flowing through the second coil L2 can be formed in the core IRC in different directions, and the magnetic field caused by the current flowing through the first coil L1 and the magnetic field caused by the current flowing through the second coil L2 can be offset from each other. Accordingly, the impedances of the first coil L1 and the second coil L2 can be lowered, so that current can flow well through the first coil L1 and the second coil L2.

Referring to FIG. 20, the power conversion circuit 2020 can further include at least one of a first impedance element Z1 connected between the first control node Nc1 and the first output node Nout1 and a second impedance element Z2 connected between the second control node Nc2 and the second output node Nout2. For example, the first impedance element Z1 can be a capacitor or a resistor. The second impedance element Z2 can be a capacitor or a resistor.

Figure 22:
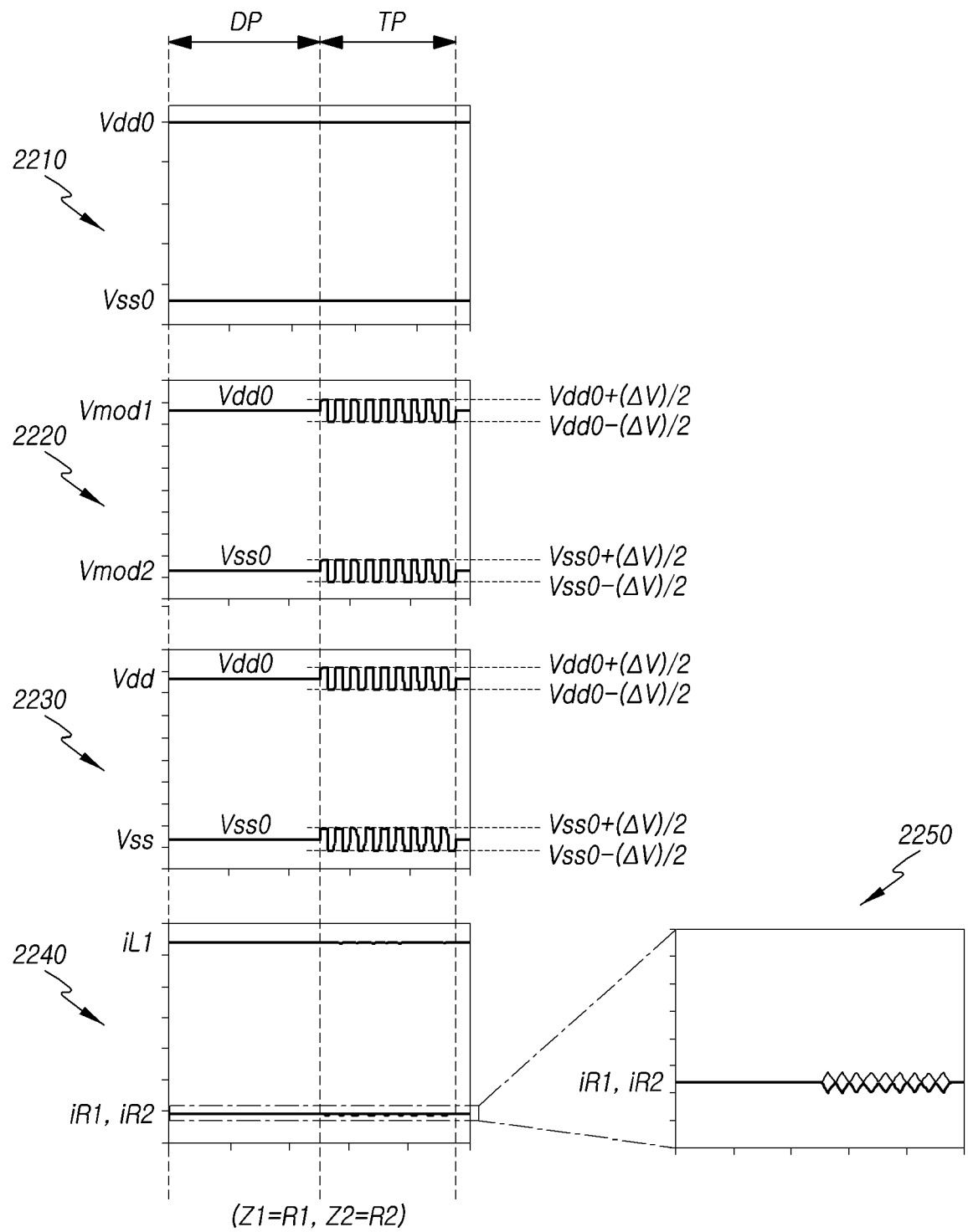
FIG. 22 illustrates simulation results of current-based load-free driving by a current-based load-free driving system including a choke-based power supply circuit in a touch display device according to embodiments of the disclosure.

FIG. 22 illustrates simulation results of current-based load-free driving by a current-based load-free driving system including a choke (CK)-based power supply circuit 1210 in a touch display device 100 according to embodiments of the disclosure. However, in the present simulation, the first impedance element Z1 is the first resistor R1, and the second impedance element Z2 is the second resistor R2.

FIG. 22 includes a first graph 2210 about a first reference power voltage Vdd0 and a second reference power voltage Vss0, a second graph 2220 about a first modulation control signal Vmod1 and a second modulation control signal Vmod2, a third graph 2230 about a first power signal Vdd and a second power signal Vss, a fourth graph 2240 about a current iL1 flowing through the first coil L1 and currents iR1 and iR2 flowing through a first resistor R1 and a second resistor R2, and a fifth graph 2250 in which a portion of the fourth graph 2240 is enlarged.

Referring to the first graph 2210 of FIG. 22, during the display driving period DP and the touch driving period TP, the first reference power voltage Vdd0 can maintain a constant first voltage level, and the second reference power voltage Vss0 can maintain a constant second voltage level. The first voltage level can be a voltage level higher than the second voltage level.

Referring to the second graph 2220 of FIG. 22, during the display driving period DP, the first modulation control signal Vmod1 can have a constant voltage level, and the second modulation control signal Vmod2 can have a constant voltage level.

During the display driving period DP, the voltage level of the first modulation control signal Vmod1 can be a voltage level higher than the voltage level of the second modulation control signal Vmod2.

During the display driving period DP, the voltage level of the first modulation control signal Vmod1 can correspond to the first voltage level of the first reference power supply voltage Vdd0. During the display driving period DP, the voltage level of the second modulation control signal Vmod2 can correspond to the second voltage level of the second reference power supply voltage Vss0.

Referring to the second graph 2220 of FIG. 22, during the touch driving period TP, the voltage level of the first modulation control signal Vmod1 can vary over time with respect to the first reference power voltage Vdd0, and the voltage level of the second modulation control signal Vmod2 can vary over time with respect to the second reference power voltage Vss0.

During the touch driving period TP, the first high-level voltage of the first modulation control signal Vmod1 can be a voltage value Vdd0+(ΔV)/2 that is increased by half the amplitude ΔV of the touch driving signal Vtds from the first reference power supply voltage Vdd0.

During the touch driving period TP, the first low-level voltage of the first modulation control signal Vmod1 can be a voltage value Vdd0−(ΔV)/2 which is reduced by half of the amplitude ΔV of the touch driving signal Vtds from the first reference power supply voltage Vdd0.

During the touch driving period TP, the amplitude of the first modulation control signal Vmod1 can correspond to the amplitude ΔV of the touch driving signal Vtds.

During the touch driving period TP, the second high-level voltage of the second modulation control signal Vmod2 can be a voltage value Vss0+(ΔV)/2 which is increased by half of the amplitude ΔV of the touch driving signal Vtds from the second reference power supply voltage Vss0.

During the touch driving period TP, the second low-level voltage of the second modulation control signal Vmod2 can be a voltage value Vss0−(ΔV)/2 which is reduced by half of the amplitude ΔV of the touch driving signal Vtds from the second reference power supply voltage Vss0.

During the touch driving period TP, the amplitude of the second modulation control signal Vmod2 can correspond to the amplitude ΔV of the touch driving signal Vtds.

Referring to the third graph 2230 of FIG. 22, during the display driving period DP, the first power signal Vdd and the second power signal Vss can have a constant voltage level.

During the display driving period DP, the voltage level of the first power signal Vdd can be higher than the voltage level of the second power signal Vss.

During the display driving period DP, the voltage level of the first power signal Vdd can correspond to the first voltage level of the first reference power voltage Vdd0, and the voltage level of the second power signal Vss can correspond to the second voltage level of the second reference power voltage Vss0.

Referring to the third graph 2230 of FIG. 22, during the touch driving period TP, the voltage level of the first power signal Vdd can vary over time with respect to the first reference power voltage Vdd0, and the voltage level of the second power signal Vss can vary over time with respect to the second reference power voltage Vss0.

During the touch driving period TP, the first high-level voltage of the first power signal Vdd can be a voltage value Vdd0+(ΔV)/2 that is increased by half the amplitude ΔV of the touch driving signal Vtds from the first reference power voltage Vdd0.

During the touch driving period TP, the first low-level voltage of the first power signal Vdd can be a voltage value Vdd0−(ΔV)/2 that is reduced by half the amplitude ΔV of the touch driving signal Vtds from the first reference power voltage Vdd0.

During the touch driving period TP, the amplitude of the first power signal Vdd can correspond to the amplitude ΔV of the touch driving signal Vtds.

During the touch driving period TP, the second high-level voltage of the second power signal Vss can be a voltage value Vss0+(ΔV)/2 which is increased by half of the amplitude ΔV of the touch driving signal Vtds from the second reference power voltage Vss0.

During the touch driving period TP, the second low-level voltage of the second power signal Vss can be a voltage value Vss0−(ΔV)/2 which is reduced by half of the amplitude ΔV of the touch driving signal Vtds from the second reference power voltage Vss0.

During the touch driving period TP, the amplitude of the second power signal Vss can correspond to the amplitude ΔV of the touch driving signal Vtds.

Referring to the fourth graph 2240 of FIG. 22, during the display driving period DP, the driving current supplied to the light emitting element ED to emit light through the light emitting element ED can flow through the choke CK.

Referring to the fourth graph 2240 of FIG. 22, when the light emitting element ED emits light during the display driving period DP, the current iL1 flowing through the first coil L1 in the choke CK can be equal to or larger than a predetermined current value for the light emitting element ED to emit light. Here, the current iL1 flowing through the first coil L1 and the current flowing through the second coil L2 can be opposite to each other and have the same magnitude.

Referring to the fourth graph 2240 of FIG. 22, even during the touch driving period TP after the display driving period DP, the light emitting element ED should emit light. Accordingly, even during the touch driving period TP after the display driving period DP, the current iL1 can continuously flow through the first coil L1 in the choke CK to maintain light emission of the light emitting element ED.

Referring to the fourth graph 2240 of FIGS. 20 and 22, the current iL1 flowing through the first coil L1 in the choke CK can be determined by the first power signal Vdd, the second power signal Vss, and the impedance magnitude of the load between the node to which the first power signal Vdd is applied and the node to which the second power signal Vss is applied.

Referring to the fourth graph 2240 of FIGS. 20 and 22, during the display driving period DP, a current for display driving (e.g., a driving current supplied from the driving transistor DRT to the light emitting element ED to emit light through the light emitting element ED) is a current required to display an image, and flows through the first coil L1 of the choke CK at an output point of the first reference power voltage Vdd0 of the reference power supply circuit 2010, flows through the driving transistor DRT and the light emitting element ED, flows through the second coil L2 of the choke CK, and flows to the output point of the second reference power voltage Vss0 of the reference power supply circuit 2010.

Accordingly, since currents in opposite directions flow through the first coil L1 and the second coil L2 of the choke CK, the impedance of the choke CK can have a low value, and current can smoothly be supplied to the display panel 110 which can maintain good image quality.

Referring to the first to third graphs 2210, 2220, and 2230 of FIGS. 20 and 22, during the display driving period DP, the first modulation control signal Vmod1 can correspond to the first reference power voltage Vdd0, and the first power signal Vdd can correspond to the first reference power voltage Vdd0. In other words, during the display driving period DP, the first modulation control signal Vmod1 and the first power signal Vdd can have the same constant voltage level. During the display driving period DP, the voltage level of the first modulation control signal Vmod1 and the voltage level of the first power signal Vdd can have the same first voltage level of the first reference power voltage Vdd0.

Accordingly, the first output node Nout1 and the first control node Nc1 can have the same voltage. Accordingly, as illustrated in the fourth graph 2240 and the fifth graph 2250 of FIG. 22, the current iR1 flowing through the first resistor R1 between the first output node Nout1 and the first control node Nc1 during the display driving period DP can be zero.

Referring to the first to third graphs 2210, 2220, and 2230 of FIGS. 20 and 22, during the display driving period DP, the second modulation control signal Vmod2 can correspond to the second reference power voltage Vss0, and the second power signal Vs can correspond to the second reference power voltage Vss0. In other words, during the display driving period DP, the second modulation control signal Vmod2 and the second power signal Vss can have the same constant voltage level. During the display driving period DP, the voltage level of the second modulation control signal Vmod2 and the voltage level of the second power signal Vss can have the same second voltage level of the second reference power voltage Vss0.

Accordingly, the second output node Nout2 and the second control node Nc2 can have the same voltage. Accordingly, as illustrated in the fourth graph 2240 and the fifth graph 2250 of FIG. 22, the current iR2 flowing through the second resistor R2 between the second output node Nout2 and the second control node Nc2 during the display driving period DP can be zero.

On the other hand, referring to the first to third graphs 2210, 2220, and 2230 of FIG. 22, during the touch driving period TP, the first reference power voltage Vdd0 at the first input node Nin1 can have a constant first voltage level, but the voltage level of the first modulation control signal Vmod1 can vary over time.

Further, referring to the first to third graphs 2210, 2220, and 2230 of FIG. 22, during the touch driving period TP, the second reference power supply voltage Vss0 at the second input node Nin2 can have a constant second voltage level, but the voltage level of the second modulation control signal Vmod2 can vary over time.

Because the voltage level variation of the first modulation control signal Vmod1 and the voltage level variation of the second modulation control signal Vmod2 identically occur during the touch driving period TP, the current flow generated by the first modulation control signal Vmod1 and the second modulation control signal Vmod2 can have the same direction in the first coil L1 and the second coil L2 of the choke CK.

Accordingly, during the touch driving period TP, the choke CK can have a high-impedance state, and thus the current flowing to the choke CK can be blocked by the first modulation control signal Vmod1 and the second modulation control signal Vmod2.

In this situation, the first modulation control signal Vmod1, the voltage level of which varies over time, can be applied to the first output node Nout1. Accordingly, the first power signal Vdd at the first output node Nout1 can be modulated in the form of a signal corresponding to the first modulation control signal Vmod1.

Similarly, the second modulation control signal Vmod2, the voltage level of which varies over time, can be applied to the second output node Nout2. Accordingly, the second power signal Vss at the second output node Nout2 can be modulated in the form of a signal corresponding to the second modulation control signal Vmod2.

Even if the current flowing to the choke CK is blocked by the first modulation control signal Vmod1 and the second modulation control signal Vmod2 during the touch driving period TP, the current flow flowing for the display driving during the display driving period DP (e.g., the flow of the driving current supplied from the driving transistor DRT to the light emitting element ED to emit light through the light emitting element ED) can remain the same during the touch driving period TP and uniform image display quality can be stably maintained during both of the display driving period DP and the touch driving period TP.

Referring to the fourth and fifth graphs 2240 and 2250 of FIG. 22, during the touch driving period TP, the choke CK has a high-impedance state, and thus the current flowing to the choke CK is blocked by the first modulation control signal Vmod1 and the second modulation control signal Vmod2, and thus, during the touch driving period TP, the current iR1 flowing through the first resistor R1 and the current iR2 flowing through the second resistor R2 can be almost zero or substantially the same as zero.

Referring to the fourth and fifth graphs 2240 and 2250 of FIG. 22, during the touch driving period TP, the current iL1 flowing through the first coil L1 can have a greater value than the current iR1 flowing through the first resistor R1 and the current iR2 flowing through the second resistor R2.

Referring to FIGS. 20 to 22, the supply of the first power signal Vdd and the second power signal Vss during the display driving period DP and the touch driving period TP described above, and in particular, the conversion of the first power signal Vdd and the second power signal Vss using the choke CK is described below in greater detail.

As described above, in the situation of the touch display device 100 in which the light emitting element ED emits light by current driving, such as an organic light emitting element (OLED) display, for normal image display, the light emitting element ED emitting light by supplying the driving current during the display driving period DP should continuously emit light to maintain the image state even during the touch driving period TP. Accordingly, during the display driving period DP and the touch driving period TP included in one display frame time, the flow of the current for the display driving (e.g., the driving current supplied from the driving transistor DRT to the light emitting element ED to emit light through the light emitting element ED for image display) can remain the same and good image quality can be maintained. Here, the current flow for display driving can refer to a flow that passes through the first coil L1 of the choke CK at the output point of the first reference power voltage Vdd0 of the reference power supply circuit 2010, passes through the driving transistor DRT and the light emitting element ED, passes through the second coil L2 of the choke CK, and flows to the output point of the second reference power voltage Vss0 of the reference power supply circuit 2010.

During the display driving period DP, as the first modulation control signal Vmod1 has a first reference power supply voltage Vdd0 having a constant voltage level, there is no potential difference between the first control node Nc1 to which the first modulation control signal Vmod1 is input and the first output node Nout1 to which the first reference power supply voltage Vdd0 is applied. Accordingly, no current flows between the first control node Nc1 and the first output node Nout1 through the first resistor R1.

Similarly, during the display driving period DP, as the second modulation control signal Vmod2 has a second reference power supply voltage Vss0 having a constant voltage level, there is no potential difference between the second control node Nc2 to which the second modulation control signal Vmod2 is input and the second output node Nout2 to which the second reference power supply voltage Vss0 is applied. Accordingly, no current flows between the second control node Nc2 and the second output node Nout2 through the second resistor R2.

As described above, because the current iR1 does not flow between the first control node Nc1 and the first output node Nout1 and the current iR2 does not flow between the second control node Nc2 and the second output node Nout2 during the display driving period DP, the amount of current in the current flow for display driving does not change and image quality remains stable.

The power conversion circuit 2020 can supply the first power signal Vdd and the second power signal Vss of a predetermined voltage level to the display panel 110 without changing the amount of current required for image display on the current flow for driving the display.

Meanwhile, during the touch driving period TP, as the voltage level of the first modulation control signal Vmod1 is changed up and down by ($\Delta V$)/2 with respect to the first reference power voltage Vdd0, a potential difference (+($\Delta V$)/2, −($\Delta V$)/2) between the first control node Nc1 to which the first modulation control signal Vmod1 whose voltage level is changed is input and the first output node Nout1 to which the first reference power voltage Vdd0 is applied can occur. Accordingly, the first current iR1 can flow slightly between the first control node Nc1 and the first output node Nout1 through the first resistor R1.

Similarly, during the touch driving period TP, as the voltage level of the second modulation control signal Vmod2 changes by up and down by ($\Delta V$)/2 with respect to the second reference power supply voltage Vss0, a potential difference (+($\Delta V$)/2, −($\Delta V$)/2) between the second control node Nc2 to which the second modulation control signal Vmod2 whose voltage level changes is input and the second output node Nout2 to which the second reference power supply voltage Vss0 is applied can occur. Accordingly, the second current iR2 can flow slightly between the second control node Nc2 and the second output node Nout2 through the second resistor R21.

As described above, even if the first current iR1 flowing through the first resistor R1 and the second current iR2 flowing through the second resistor R2 are slightly present during the touch driving period TP, because the first modulation control signal Vmod1 and the second modulation control signal Vmod2 are in phase relationship (e.g., Vmod1 and Vmod2 have a same phase), the first current iR1 and the second current iR2 have the same direction. When the first current iR1 and the second current iR2 in the same direction are input to the first coil L1 and the second coil L2, respectively, of the choke CK, the choke CK, by its nature, can be in a high-impedance state, and accordingly, the first current iR1 flowing through the first resistor R1 and the second current iR2 flowing through the second resistor R2 may not flow through the first coil L1 and the second coil L2, respectively, of the choke CK. In this situation, the basic current for maintaining the image display state flows through the choke CK.

Accordingly, as in the display driving period DP, the amount of current (e.g., the basic amount of current for maintaining the image display state) in the current flow for display driving does not change even during the touch driving period TP. In order words, stable current is provided during both of the display driving period DP and the touch driving period TP, which maintains good image quality during the two different types of driving periods.

During the touch driving period TP, the power conversion circuit 2020 can use the choke CK to supply the first power signal Vdd and the second power signal Vss whose voltage level is changed to the display panel 110 for load-free driving while hardly changing the amount of current required in the current flow for maintaining the image display state.

If the first input node Nin1 and the first output node Nout1 are connected and the second input node Nin2 and the second output node Nout2 are connected without the choke CK in the power conversion circuit 2020, the first current iR1 flowing through the first resistor R1 and the second current iR2 flowing through the second resistor R21 can be added to the current flow for maintaining the image display state, and the required amount of current can change. Thus, image distortion can be caused by such a change in current amount.

In other words, during the touch driving period TP, the first current iR1 and the second current iR2 generated by the first modulation control signal Vmod1 and the second modulation control signal Vmod2 of which voltage levels are changed can be blocked by the choke CL so that the current flowing to the subpixel SP can be maintained to maintain the image display state and provide good, stable image quality, and the voltage levels of the first power signal Vdd and the second power signal Vss can be changed by the first modulation control signal Vmod1 and the second modulation control signal Vmod2 of which voltage levels are changed. The supply, to the display panel 110, of the first power signal Vdd and the second power signal Vss, the voltage levels of which are changed according to the above-described method, during the touch driving period TP is referred to as current-based load-free driving (I-LFD).

Further, the current-based load-free driving system I-LFDS according to embodiments of the disclosure can generate various driving signals Vdrv having a signal waveform corresponding to one of the first power signal Vdd and the second power signal Vss converted according to the driving mode and supply the generated driving signals Vdrv to the display panel 110 or the driving circuit (e.g., the gate driving circuit 130, the data driving circuit 120, and the touch driving circuit 160).

The current-based load-free driving system I-LFDS according to embodiments of the disclosure can intentionally generate signal distortion, generated in each of the first power signal Vdd and the second power signal Vss requiring a large amount of current, in the driving signal Vdrv.

Accordingly, a signal difference between the first and second power signals Vdd and Vss and the driving signals Vdrv can occur. Accordingly, even though signal distortion of each of the first power signal Vdd and the second power signal Vss occurs, touch sensitivity deterioration and display screen distortion due to signal distortion can be prevented.

According to embodiments of the disclosure described above, it is possible to precisely and effectively prevent or reduce formation of a parasitic capacitance and noise between the driving pattern and the touch electrode TE embedded in the self-luminous display panel 110 in a current-based load-free driving (I-LFD) method suitable for the self-luminous display panel 110, thereby enhancing touch sensitivity. Here, for example, the driving pattern can include a display driving pattern DDP or a touch electrode TE that is not a sensing target.

According to embodiments of the disclosure, it is possible to maintain a constant signal difference (e.g., voltage difference) between various load-free driving signals Vlfd to prevent a parasitic capacitance between the touch electrode TE and the driving pattern, thereby enhancing touch sensitivity and preventing display screen distortion.

For example, the various load-free driving signals Vlfd can include the first modulation power signal Vdd_mod which is the first power signal Vdd during the touch driving period TP, the second modulation power signal Vss_mod which is the second power signal Vss during the touch driving period TP, the first modulation gate voltage Vgh_mod which is the first gate voltage Vgh during the touch driving period TP, the second modulation gate voltage Vgl_mod which is the second gate voltage Vgl during the touch driving period TP, the modulation gamma voltage Vgma_mod which is the gamma voltage Vgma during the touch driving period TP, and the modulation touch electrode driving signal Vte_mod which is the touch electrode driving signal Vte during the touch driving period TP.

According to embodiments of the disclosure, since various load-free driving signals Vlfd are generated using one of the first power signal Vdd and the second power signal Vss, even if signal distortion occurs in each of the first power signal Vdd and the second power signal Vss during the touch driving period TP, the same signal distortion can be intentionally generated in the other load-free driving signals Vlfd, thereby preventing a decrease in touch sensitivity and a distortion of the display screen due to the signal distortion.

According to embodiments of the disclosure, since various load-free driving signals Vlfd are generated using one of the first power signal Vdd and the second power signal Vss, various load-free driving signals Vlfd for preventing parasitic capacitance between the touch electrode TE and the driving pattern can be effectively and accurately generated without many various power sources.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A touch display device, comprising:
    a display panel including a plurality of data lines, a plurality of gate lines, a plurality of subpixels, and a plurality of touch electrodes, each of the plurality of subpixels including a light emitting element and a driving transistor; and
    a signal conversion circuit configured to supply a driving signal to the display panel or a driving circuit connected to the display panel,
    wherein the driving signal has a signal waveform corresponding to a signal waveform of a first power signal or a signal waveform of a second power signal, and the first power signal and the second power signal are applied to the plurality of subpixels,
    wherein the signal conversion circuit is configured to output a reference driving voltage having a constant voltage level, as the driving signal, during a display driving period and a modulation driving signal having a voltage level that varies with respect to the reference driving voltage, as the driving signal, during a touch driving period,
    wherein the signal conversion circuit includes an adder circuit configured to output the driving signal, and
    wherein the adder circuit is configured to:
    receive the first power signal or the second power signal as a first input signal,
    receive the reference driving voltage as a second input signal, and
    output the driving signal as an output signal based on the first input signal added to the reference driving voltage.

2. The touch display device of claim 1, wherein the signal waveform of the driving signal and the signal waveform of the first power signal have a same voltage variation pattern during a touch driving period, or
    wherein the signal waveform of the driving signal and the signal waveform of the second power signal have a same voltage variation pattern during the touch driving period.

3. The touch display device of claim 1, wherein the driving transistor or other transistor included in each of a plurality of sub-pixels is configured to receive the first power signal, and the light emitting element is configured to receive the second power signal, and
    wherein the signal waveform of the first power signal and the signal waveform of the second power signal correspond to each other.

4. The touch display device of claim 1, further comprising:
    a gate driving circuit configured to generate a scanning gate signal based on a first gate voltage or a second gate voltage and output the scanning gate signal to each of the plurality of gate lines,
    wherein the driving signal includes a plurality of signals including the first gate voltage and the second gate voltage, and the signal conversion circuit is configured to output the first gate voltage and the second gate voltage to the gate driving circuit, and
    wherein the first gate voltage and the second gate voltage have a signal waveform corresponding to the signal waveform of the first power signal or the signal waveform of the second power signal.

5. The touch display device of claim 1, further comprising a data driving circuit configured to generate a data signal based on a gamma voltage and output the data signal to the plurality of data lines,
    wherein the driving signal includes a plurality of signals including the gamma voltage, and the signal conversion circuit is configured to output the driving signal including the gamma voltage to the data driving circuit, and
    wherein the gamma voltage has a signal waveform corresponding to the signal waveform of the first power signal or the signal waveform of the second power signal.

6. The touch display device of claim 1, further comprising a touch driving circuit configured to supply a touch electrode driving signal to each of the plurality of touch electrodes,
    wherein the driving signal includes a plurality of signals including the touch electrode driving signal, and the signal conversion circuit is configured to output the driving signal including the touch electrode driving signal to the touch driving circuit, and
    wherein the touch electrode driving signal has a signal waveform corresponding to the signal waveform of the first power signal or the signal waveform of the second power signal.

7. The touch display device of claim 1, further comprising a power supply circuit configured to output the first power signal and the second power signal,
    wherein during a display driving period, the power supply circuit is configured to:
    output a first reference power voltage having a constant first voltage level as the first power signal, and
    output a second reference power voltage having a constant second voltage level as the second power signal, and wherein during a touch driving period, the power supply circuit is configured to:
output a first modulation power signal having a voltage level that varies with respect to the first reference power voltage, as the first power signal, and
output a second modulation power signal having a voltage level that varies with respect to the second reference power voltage, as the second power signal.

8. The touch display device of claim 7, wherein a voltage varies in each high-level signal section included in the first modulation power signal or the second modulation power signal, and a voltage varies in each low-level signal section included in the first modulation power signal or the second modulation power signal,
wherein a voltage variation pattern in each high-level signal section included in the driving signal corresponds to a voltage variation pattern included in each high-level signal section included in the first modulation power signal or the second modulation power signal, and
wherein a voltage variation pattern in each low-level signal section included in the driving signal corresponds to a voltage variation pattern included in each low-level signal section included in the first modulation power signal or the second modulation power signal.

9. The touch display device of claim 8, wherein the voltage variation pattern in each high-level signal section included in the first modulation power signal or the second modulation power signal is a voltage drop pattern in which the voltage drops, and
wherein the voltage variation pattern in each low-level signal section included in the first modulation power signal or the second modulation power signal is a voltage rise pattern in which the voltage rises.

10. The touch display device of claim 7,
wherein an amplitude of the modulation driving signal corresponds to an amplitude of the signal waveform of the first power signal or the signal waveform of the second power signal.

11. The touch display device of claim 7, wherein the power supply circuit includes:
a first power conversion switch configured to output a first reference power voltage or a first modulation power signal as the first power signal; and
a second power conversion switch configured to output a second reference power voltage or a second modulation power signal as the second power signal.

12. The touch display device of claim 11, wherein the first power conversion switch is configured to:
receive a first reference power voltage, a first high-level voltage higher than the first reference power voltage, and a first low-level voltage lower than the first reference power voltage;
select the first reference power voltage and output the first reference power voltage as the first power signal during the display driving period; and
alternately select and output the first high-level voltage and the first low-level voltage during the touch driving period,
wherein during the touch driving period, as the first high-level voltage and the first low-level voltage are alternately output by the first power conversion switch, a first modulation power signal alternately including the high-level signal section and the low-level signal section is output as the first power signal, and wherein the second power conversion switch is configured to:
receive a second reference power voltage, a second high-level voltage higher than the second reference power voltage, and a second low-level voltage lower than the second reference power voltage;
select the second reference power voltage and output the selected second reference power voltage as the second power signal during the display driving period; and
alternately select and output the second high-level voltage and the second low-level voltage during the touch driving period,
wherein during the touch driving period, as the second high-level voltage and the second low-level voltage are alternately output by the second power conversion switch, a second modulation power signal alternately including the high-level signal section and the low-level signal section is output as the second power signal.

13. The touch display device of claim 7, wherein the power supply circuit includes:
a reference power supply circuit configured to output the first reference power voltage and the second reference power voltage;
a power conversion circuit configured to:
output the first power signal having a signal waveform corresponding to a signal waveform of a first modulation control signal with respect to a first voltage level of the first reference power voltage, as the first power signal, or
output the second power signal having a signal waveform corresponding to a signal waveform of a second modulation control signal with respect to a second voltage level of the second reference power voltage; and
a modulation control circuit configured to supply the first modulation control signal and the second modulation control signal to the power conversion circuit.

14. The touch display device of claim 13, wherein the power conversion circuit includes:
a first input node configured to receive the first reference power voltage;
a second input node configured to receive the second reference power voltage;
a first output node configured to output the first power signal;
a second output node configured to output the second power signal;
at least one control node of a first control node configured to receive the first modulation control signal is input and a second control node configured to receive the second modulation control signal; and
a choke including:
a first coil connected between the first input node and the first output node, and
a second coil connected between the second input node and the second output node.

15. The touch display device of claim 14, wherein the choke further includes a core with the first coil and the second coil being wound around the core,
wherein the first coil and the second coil are wound around the core in opposite directions, and
wherein the power conversion circuit includes at least one of a first impedance element connected between the first control node and the first output node and a second impedance element connected between the second control node and the second output node.

16. A display panel, comprising:
a plurality of subpixels;
a plurality of data lines connected to the plurality of subpixels;
a plurality of scanning gate lines connected to the plurality of subpixels;
a first power line configured to supply a first power signal to the plurality of subpixels;
a second power line configured to supply a second power signal to the plurality of subpixels; and
a plurality of touch electrodes,
wherein while a touch electrode driving signal having a varying voltage level is supplied to at least one of the plurality of touch electrodes,
voltages of the first power signal and the second power signal vary, and
a scanning gate signal supplied to at least one of the plurality of scanning gate lines has a same voltage variation pattern as a voltage variation pattern of the first power signal or a voltage variation pattern of the second power signal, or a data signal supplied to at least one of the plurality of data lines has a same voltage variation pattern as a voltage variation pattern of the first power signal or a voltage variation pattern of the second power signal, or the touch electrode driving signal has a same voltage variation pattern as the voltage variation pattern of the first power signal or the voltage variation pattern of the second power signal,
wherein the signal conversion circuit is configured to output a reference driving voltage having a constant voltage level, as at least one of a driving signal, during a display driving period and a modulation driving signal having a voltage level that varies with respect to the reference driving voltage, as at least one of the scanning gate signal, the data signal and the touch electrode driving signal, during a touch driving period,
wherein the signal conversion circuit includes an adder circuit configured to output at least one of the scanning gate signal, the data signal and the touch electrode driving signal, and
wherein the adder circuit is configured to:
receive the first power signal or the second power signal as a first input signal,
receive the reference driving voltage as a second input signal, and
output at least one of the scanning gate signal, the data signal and the touch electrode driving signal as an output signal based on the first input signal added to the reference driving voltage.

17. The display panel of claim 16, wherein the first power signal is supplied to a driving transistor or other transistor included in each of the plurality of subpixels,
wherein the second power signal is supplied to a light emitting element included in each of the plurality of subpixels,
wherein a signal waveform of the first power signal and a signal wave form the second power signal correspond to each other, and
wherein the first power signal or the second power signal has a voltage variation pattern having a voltage drop in each high-level signal section and a voltage rise in each low-level signal section.

18. A touch display device, comprising:
a plurality of touch electrodes;
a plurality of subpixels configured to receive a first power signal and a second power signal; and
a signal conversion circuit configured to:
receive the first power signal or the second power signal,
modulate a voltage variation pattern of the first power signal or the second power signal on top of at least one reference driving signal to generate at least one modulated driving signal,
output the at least one modulated driving signal to at least one subpixel among the plurality of subpixels or at least one touch electrode among the plurality of touch electrodes,
output a constant driving signal having a constant voltage level to the at least one subpixel or the at least one touch electrode during a display driving period, and
output a varying driving signal having a varying voltage level to the at least one subpixel or the at least one touch electrode during a touch driving period,
wherein the signal conversion circuit includes an adder circuit configured to output the at least one modulated driving signal,
wherein the adder circuit is configured to:
receive the first power signal or the second power signal as a first input signal,
receive the constant driving signal as a second input signal, and
output the varying driving signal as an output signal based on the first input signal added to the constant driving voltage.

* * * * *